(12) United States Patent
Min et al.

(10) Patent No.: US 11,432,264 B2
(45) Date of Patent: Aug. 30, 2022

(54) DEVICE AND METHOD FOR DETERMINING RADIO RESOURCE IN WIRELESS COMMUNICATION SYSTEM

(71) Applicant: Samsung Electronics Co., Ltd., Suwon-si (KR)

(72) Inventors: Byoung Yoon Min, Suwon-si (KR); Hyun Jeong Kang, Suwon-si (KR); Young Joong Mok, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 16/764,651

(22) PCT Filed: Nov. 14, 2018

(86) PCT No.: PCT/KR2018/013871
§ 371 (c)(1),
(2) Date: May 15, 2020

(87) PCT Pub. No.: WO2019/098662
PCT Pub. Date: May 23, 2019

(65) Prior Publication Data
US 2020/0288432 A1    Sep. 10, 2020

(30) Foreign Application Priority Data

Nov. 15, 2017 (KR) .................. 10-2017-0152606
Jan. 11, 2018  (KR) .................. 10-2018-0004117
Feb. 23, 2018 (KR) .................. 10-2018-0022261

(51) Int. Cl.
*H04W 72/02*    (2009.01)
*H04W 4/40*     (2018.01)
(Continued)

(52) U.S. Cl.
CPC ............. *H04W 72/02* (2013.01); *H04W 4/40* (2018.02); *H04W 24/10* (2013.01); *H04W 74/0808* (2013.01); *H04W 92/18* (2013.01)

(58) Field of Classification Search
CPC .. H04L 43/06; H04W 4/40–48; H04W 8/005; H04W 24/02; H04W 24/10;
(Continued)

(56) References Cited

U.S. PATENT DOCUMENTS 10,694,497 B2 *  6/2020  Sundberg .......... H04W 52/0216
2016/0330728 A1 * 11/2016  Sorrentino .......... H04W 72/048
(Continued)

FOREIGN PATENT DOCUMENTS

CN    107079430 B  * 10/2020  ............ H04W 72/04
GB       2552792 A  *  2/2018  ............ H04W 72/02
(Continued)

OTHER PUBLICATIONS

Huawei Device et al.; Introduction of the overheating indication; 3GPP TSG-RAN WG2 Meeting #99bis; R2-1712053; Oct. 9-13, 2017; Prague, Czech Republic.
(Continued)

*Primary Examiner* — Thomas R Cairns
(74) *Attorney, Agent, or Firm* — Jefferson IP Law, LLP

(57) ABSTRACT

An operation method of a terminal in a wireless communication system includes receiving, from a base station, a message including information on a resource pool for vehicle communication and information for selecting a resource from the resource pool; determining candidate resources in the resource pool on the basis of the information for selecting the resource; and transmitting data by using at least one resource among the candidate resources.

16 Claims, 29 Drawing Sheets

(51) Int. Cl.
  *H04W 24/10*  (2009.01)
  *H04W 74/08*  (2009.01)
  *H04W 92/18*  (2009.01)

(58) Field of Classification Search
  CPC . H04W 28/12; H04W 36/00; H04W 36/0083; H04W 36/0088; H04W 40/24; H04W 52/365; H04W 72/02; H04W 72/042; H04W 72/0446; H04W 72/08; H04W 72/14; H04W 74/0808–0825; H04W 92/18
  See application file for complete search history.

(56) References Cited

U.S. PATENT DOCUMENTS

| | | |
|---|---|---|
| 2017/0041902 A1 | 2/2017 | Sheng |
| 2017/0188375 A1 | 6/2017 | Seo et al. |
| 2017/0289733 A1 | 10/2017 | Rajagopal et al. |

FOREIGN PATENT DOCUMENTS

| | | | | |
|---|---|---|---|---|
| WO | WO-2015140274 A1 * | 9/2015 | ............. | H04W 4/70 |
| WO | WO-2018010649 A1 * | 1/2018 | ............ | H04W 48/16 |

OTHER PUBLICATIONS

European Search Report dated Oct. 16, 2020; European Appln. No. 18879214.7-1215 / 3703457PCT/KR2018013871.
3GPP; 3rd Generation Partnership Project; Technical Specification Group Radio Access Network; Evolved Universal Terrestrial Radio Access (E-UTRA); Radio Resource Control (RRC); Protocol specification (Release 15); 3GPP TS 36.331; V15.6.0; Jun. 2019; Valbonne, FR.
3GPP; 3rd Generation Partnership Project; Technical Specification Group Radio Access Network; Evolved Universal Terrestrial Radio Access (E-UTRA); Physical layer procedures (Release 15); 3GPP TS 36.213; V15.3.0; Sep. 2018; Valbonne, FR.
3GPP; 3rd Generation Partnership Project; Technical Specification Group Services and System Aspects; Architecture enhancements for V2X services (Release 16); 3GPP TS 23.285; V16.2.0; Dec. 2019; Valbonne, FR.
LG Electronics; Discussion on other remaining issues for V2X Phase 2; 3GPP TSG RAN WG1 Meeting #90bis; R1-1717268; Oct. 9-13, 2017; Prague, Czech Republic.
3GPP; 3rd Generation Partnership Project; Technical Specification Group Radio Access Network; Evolved Universal Terrestrial Radio Access (E-UTRA); Radio Resource Control (RRC); Protocol specification (Release 14); 3GPP TS 36.331; V14.4.0; Sep. 2017; Valbonne, FR.
Qualcomm Incorporated; Resource reselection counter and triggering conditions; 3GPP TSG-RAN WG2 Meeting #97; R2-1701180; Feb. 13-17, 2017; Athens, Greece.
Intel Corporation; Resource pool sharing between mode 3 and 4; 3GPP TSG RAN WG2 Meeting #99bis; R2-1710652 (Revision of R2-1709049); Oct. 9-13, 2017; Prague, Czech Republic.
Korean Office Action dated Jan. 27, 2022; cited in a counterpart Korean Application No. 10-2018-0022261.
European Office Action dated Mar. 3, 2022; cited in a counterpart European Application No. 18 879 214.7-1215.
Indian Office Action dated Mar. 15, 2022; cited in a counterpart Indian Application No. 202037020807.
Huawei, HiSilicon; Consideration on latency related aspects in LTE eV2X; 3GPP TSG-RAN WG2 Meeting #99bis R2-1710090; Oct. 9, 2017, Prague, Czech Republic.
Samsung; Mode3/Mode 4 resource pool sharing on V2X phase 2; 3GPP TSG RAN WG2 Meeting #99bis R2-1711754 Oct. 9, 2017, Prague, Czech Republic.
Samsung; Latency reduction on V2X phase 2 for mode3/mode 4 resource pool sharing; 3GPP TSG RAN WG2 Meeting #99; R2-1709429; Aug. 21, 2017, Berlin, Germany.

\* cited by examiner (1) Fully-shared resource pool

DEVICE AND METHOD FOR DETERMINING RADIO RESOURCE IN WIRELESS COMMUNICATION SYSTEM

TECHNICAL FIELD

The disclosure generally relates to a wireless communication system, and more particularly to a device and a method for determining radio resources in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In 5G systems, various methods for determining radio resources are under discussion. For example, a method for determining radio resources for V2X (vehicle to everything) terminals has been proposed. Furthermore, various discussions are underway to more efficiently determine radio resources.

DISCLOSURE OF INVENTION

Technical Problem

Based on the above discussion, the disclosure provides a method for selecting radio resources by a terminal according to the operation of a shared resource pool between terminals in a vehicle communication system, thereby providing a device and a method for supporting vehicle communication services and transmission of data capable of satisfying requirements of high reliability and low latency.

Technical Solution

According to various embodiments of the disclosure, an operation method of a terminal in a wireless communication system may include: receiving, from a base station, a message including information on a resource pool for vehicle communication and information for selecting resources from the resource pool; determining candidate resources in the resource pool, based on the information for selecting resources; and transmitting data using at least one resource among the candidate resources.

According to various embodiments of the disclosure, a device of a terminal in a wireless communication system may include: a transceiver; and at least one processor operably connected to the transceiver. The transceiver may receive, from a base station, a message including information on a resource pool for vehicle communication and information for selecting resources from the resource pool. The at least one processor may determine candidate resources in the resource pool, based on the information for selecting resources. The transceiver may transmit data using at least one resource among the candidate resources.

According to various embodiments of the disclosure, an operation method of a base station in a wireless communication system may include transmitting, to a terminal, a message including information on a resource pool for vehicle communication and information for selecting resources from the resource pool, wherein the terminal may determine candidate resources in the resource pool, based on the information for selecting resources, and wherein the terminal may transmit data using at least one resource among the candidate resources.

According to various embodiments of the disclosure, a device of a base station in a wireless communication system may include: a transceiver; and at least one processor operably connected to the transceiver. The transceiver may transmit, to a terminal, a message including information on a resource pool for vehicle communication and information for selecting resources from the resource pool. The terminal may determine candidate resources in the resource pool, based on the information for selecting resources. The terminal may transmit data using at least one resource among the candidate resources.

Advantageous Effects

A device and a method according to various embodiments of the disclosure prevent resource selection collision, which may occur when operating a shared radio resource pool in a vehicle communication system, thereby satisfying requirements of high reliability and low latency in vehicle communication and attaining efficient management of resources in a network.

Effects which can be acquired by the disclosure are not limited to the above described effects, and other effects that have not been mentioned may be clearly understood by those skilled in the art from the following description.

BEST MODE FOR CARRYING OUT THE INVENTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software and thus, the various embodiments of the disclosure may not exclude the perspective of software.

Hereinafter, the disclosure relates to a device and a method for determining radio resources in a wireless communication system. Specifically, the disclosure provides a technique for ensuring successful transmission with higher performance by preventing a collision of selecting resources between terminals, based on a method for selecting radio resources for the operation of a shared resource pool between V2X (vehicle to everything) terminals in a wireless communication system. The resource selection may correspond to a direct communication interface between a mode 3 terminal and a mode 4 terminal.

In the following description, terms referring to signals, terms referring to channels, terms referring to control information, terms referring to network entities, terms referring to components of a device, and the like are illustrative words for the convenience of explanation. Accordingly, the disclosure is not limited to the terms described below, and other terms having equivalent technical meanings may be used.

In addition, although the disclosure will be described using terms used in some communication standards (e.g., $3^{rd}$-generation partnership project (3GPP)), this in only an example for the convenience of explanation. Various embodiments of the disclosure may be applied to other communication systems through simple modification.

Figure 1:
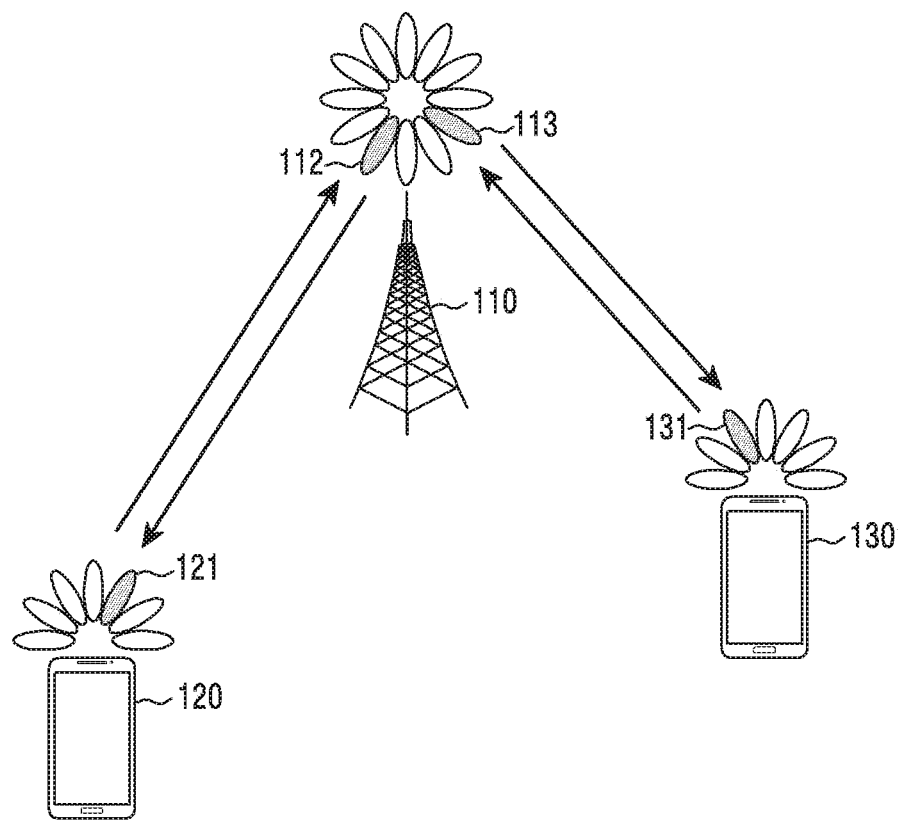
FIG. 1 illustrates a wireless communication system according to various embodiments of the disclosure.

FIG. 1 illustrates a wireless communication system according to various embodiments of the disclosure. FIG. 1 illustrates a base station 110, a terminal 120, and a terminal 130 as parts of nodes using wireless channels in a wireless communication system. Although a single base station is illustrated in FIG. 1, other base stations identical or similar to the base station 110 may be further included. Although two terminals are illustrated in FIG. 1, other terminals identical or similar to the terminal 120 and the terminal 130 may be further included.

The base station 110 is network infrastructure that provides radio access to the terminals 120 and 130. The base station 110 has a coverage defined as a certain geographic area based on the distance over which signals can be transmitted. The base station 110 may be referred to as an "access point (AP)", an "eNodeB (eNB)", a "5G node (5th generation node)", a "wireless point", a "transmission/reception point (TRP)", or other terms having equivalent technical meanings, as well as "base station".

Each of the terminal 120 and the terminal 130 is a device used by a user and communicates with the base station 110 via a wireless channel. In some cases, at least one of the terminal 120 and the terminal 130 may be operated without user involvement. That is, at least one of the terminal 120 and the terminal 130 may be a device for performing machine-type communication (MTC), and may not be carried by a user. Each of the terminal 120 and the terminal 130 may be referred to as "user equipment (UE)", a "mobile station", a "subscriber station", a "remote terminal", a "wireless terminal", a "user device", or other terms having equivalent technical meanings, as well as "terminal".

The base station 110, the terminal 120, and the terminal 130 may transmit and receive radio signals in an mmWave band (e.g., 28 GHz, 30 GHz, 38 GHz, or 60 GHz). In this case, in order to improve the channel gain, the base station 110, the terminal 120, and the terminal 130 may perform beamforming. Here, the beamforming may include transmission beamforming and reception beamforming. That is, the base station 110, the terminal 120, and the terminal 130 may provide directivity to a transmission signal or a reception signal. To this end, the base station 110 and the terminals 120 and 130 may select the serving beams 112, 113, 121, and 131 through a beam searching or beam management procedure. After the serving beams 112, 113, 121, and 131 are selected, subsequent communication may be performed through a resource in a QCL (quasi co-located) relationship with the resource that transmitted the serving beams 112, 113, 121, and 131.

If the large-scale characteristics of the channel that transmits the symbol in a first antenna port can be inferred from the channel that transmits the symbol in a second antenna port, the first antenna port and second antenna port may be regarded as being in a QCL relationship. For example, the large-scale characteristics may include at least one of delay spread, Doppler spread, Doppler shift, average gain, average delay, and a spatial receiver parameter.

Figure 2:
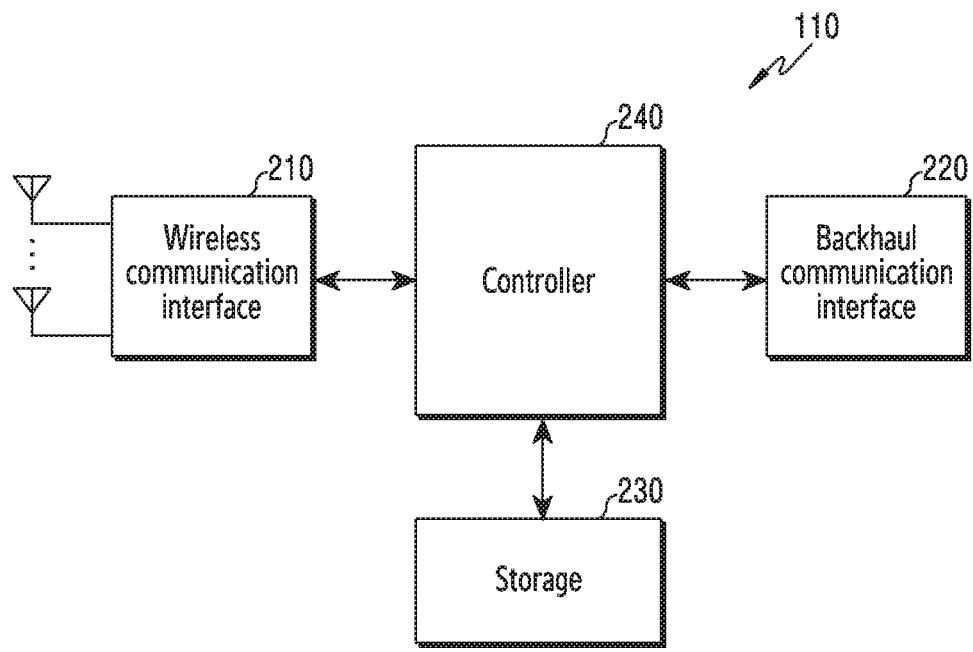
FIG. 2 illustrates the configuration of a base station in a wireless communication system according to various embodiments of the disclosure.

FIG. 2 illustrates the configuration of a base station in a wireless communication system according to various embodiments of the disclosure. The configuration illustrated in FIG. 2 may be regarded as the configuration of the base station 110. Hereinafter, the term "-unit", "-or (er)", or the like denotes a unit for processing at least one function or operation, and may be implemented as hardware, software, or a combination thereof.

Referring to FIG. 2, the base station includes a wireless communication unit 210, a backhaul communication unit 220, a storage 230, and a controller 240.

The wireless communication unit 210 performs functions of transmitting and receiving signals via a wireless channel. For example, the wireless communication unit 210 performs a function of transformation between a baseband signal and a bit stream according to the physical layer standard of a system. For example, when transmitting data, the wireless communication unit 210 produces complex symbols by encoding and modulating a transmission bit stream. When receiving data, the wireless communication unit 210 restores a reception bit stream by demodulating and decoding a baseband signal.

In addition, the wireless communication unit 210 up-converts a baseband signal to a radio frequency (RF) band signal to thus transmit the same via an antenna, and down-converts an RF band signal received via the antenna to a baseband signal. To this end, the wireless communication unit 210 may include a transmitting filter, a receiving filter, an amplifier, a mixer, an oscillator, a digital-to-analog convertor (DAC), an analog-to-digital convertor (ADC), and the like. In addition, the wireless communication unit 210 may include a plurality of transmission/reception paths. Further, the wireless communication unit 210 may include at least one antenna array including a plurality of antenna elements.

In terms of hardware, the wireless communication unit 210 may include a digital unit and an analog unit, and the analog unit may include a plurality of sub-units depending on the operation power, operation frequency, or the like. The digital unit may include at least one processor (e.g., DSP (digital signal processor)).

The wireless communication unit 210 transmits and receives signals as described above. Accordingly, all or part of the wireless communication unit 210 may be referred to as a "transmitter", a "receiver", or a "transceiver". In the following description, the transmission and reception performed via a wireless channel will have a meaning encompassing the execution of the process by the wireless communication unit 210 as described above.

The backhaul communication unit 220 provides an interface for communication with other nodes in the network. That is, the backhaul communication unit 220 converts a bit stream, transmitted from the base station to another node, such as another access node, another base station, an upper node, or a core network, into a physical signal, and converts a physical signal received from another node into a bit stream.

The storage 230 stores data such as fundamental programs, application programs, and configuration information for the operation of the base station. The storage 230 may be configured as volatile memory, nonvolatile memory, or a combination thereof. In addition, the storage 230 provides the stored data in response to a request from the controller 240.

The controller 240 controls the overall operation of the base station. For example, the controller 240 transmits and receives signals via the wireless communication unit 210 or the backhaul communication unit 220. The controller 240 writes or reads data to or from the storage 230. In addition, the controller 240 may perform the functions of a protocol stack required for the communication standard. According to another implementation, the protocol stack may be included in the wireless communication unit 210. To this end, the controller 240 may include at least one processor.

According to various embodiments, the controller 240 may transmit RRC (radio resource control) configuration information to the terminal 110. For example, the controller 240 may control the base station so as to perform operations according to various embodiments described below.

Figure 3:
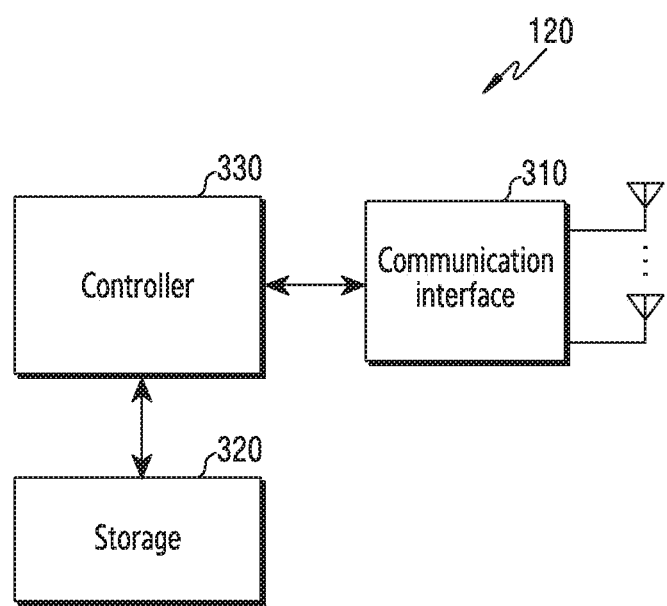
FIG. 3 illustrates the configuration of a terminal in a wireless communication system according to various embodiments of the disclosure.

FIG. 3 illustrates the configuration of a terminal in a wireless communication system according to various embodiments of the disclosure. The configuration illustrated in FIG. 3 may be regarded as the configuration of the terminal 120 or the terminal 130. Hereinafter, the term "-unit", "-or (er)", or the like denotes a unit for processing at least one function or operation, and may be implemented by hardware, software, or a combination thereof.

Referring to FIG. 3, the terminal includes a communication unit 310, a storage 320, and a controller 330.

The communication unit 310 performs functions of transmitting and receiving signals via a wireless channel. For example, the communication unit 310 performs a function of transformation between a baseband signal and a bit stream according to the physical layer standard of a system. For example, when transmitting data, the communication unit 310 produces complex symbols by encoding and modulating a transmission bit stream. When receiving data, the communication unit 310 restores a reception bit stream by demodulating and decoding a baseband signal. In addition, the communication unit 310 up-converts a baseband signal to an RF band signal to thus transmit the same via an antenna, and down-converts an RF band signal received via the antenna to a baseband signal. For example, the communication unit 310 may include a transmitting filter, a receiving filter, an amplifier, a mixer, an oscillator, a DAC, an ADC, and the like.

In addition, the communication unit 310 may include a plurality of transmission/reception paths. Further, the communication unit 310 may include at least one antenna array including a plurality of antenna elements. In terms of hardware, the communication unit 310 may include a digital circuit and an analog circuit (e.g., an RFIC (radio frequency integrated circuit)). The digital circuit and the analog circuit may be implemented as a single package. In addition, the communication unit 310 may include a plurality of RF chains. Further, the communication unit 310 may perform beamforming.

In addition, the communication unit 310 may include different communication modules for processing signals in different frequency bands. Further, the communication unit 310 may include a plurality of communication modules to support a plurality of different wireless access technologies. For example, the different wireless access technologies may include Bluetooth low energy (BLE), Wi-Fi (Wireless Fidelity), WiGig (Wi-Fi Gigabyte), cellular networks (e.g., LTE (Long-Term Evolution)), and the like. In addition, different frequency bands may include a super-high frequency (SHF) (e.g., 2.5 GHz or 5 GHz) band and a millimeter wave (e.g., 60 GHz) band.

The communication unit 310 transmits and receives signals as described above. Accordingly, all or some of the communication unit 310 may be referred to as a "transmitter", a "receiver", or a "transceiver". In the following description, transmission and reception performed via a wireless channel will have a meaning encompassing execution of the process by the communication unit 310 as described above.

The storage 320 stores data such as fundamental programs for the operation of the terminal, application programs, and data such as configuration information. The storage 320 may be configured as volatile memory, nonvolatile memory, or a combination thereof. In addition, the storage 320 provides the stored data in response to a request from the controller 330.

The controller 330 controls the overall operation of the terminal. For example, the controller 330 transmits and receives signals via the communication unit 310. In addition, the controller 330 writes or reads data to or from the storage 320. The controller 330 also performs the functions of a protocol stack required for the communication standard. To this end, the controller 330 may include at least one processor or microprocessor, or may be a part of a processor. In addition, a part of the communication unit 310 and the controller 330 may be referred to as a "CP (communication processor)".

According to various embodiments, the controller 330 may perform: if the terminal 120 does not belong to a resource pool shared with another terminal, transmitting first data using a first sidelink grant; if the terminal 120 belongs to a resource pool shared with another terminal, determining a second sidelink grant, based on RRC configuration information received from the base station 110; and transmitting second data using the second sidelink grant. For example, the controller 330 may control the terminal so as to perform operations according to various embodiments described below.

Figure 4A:
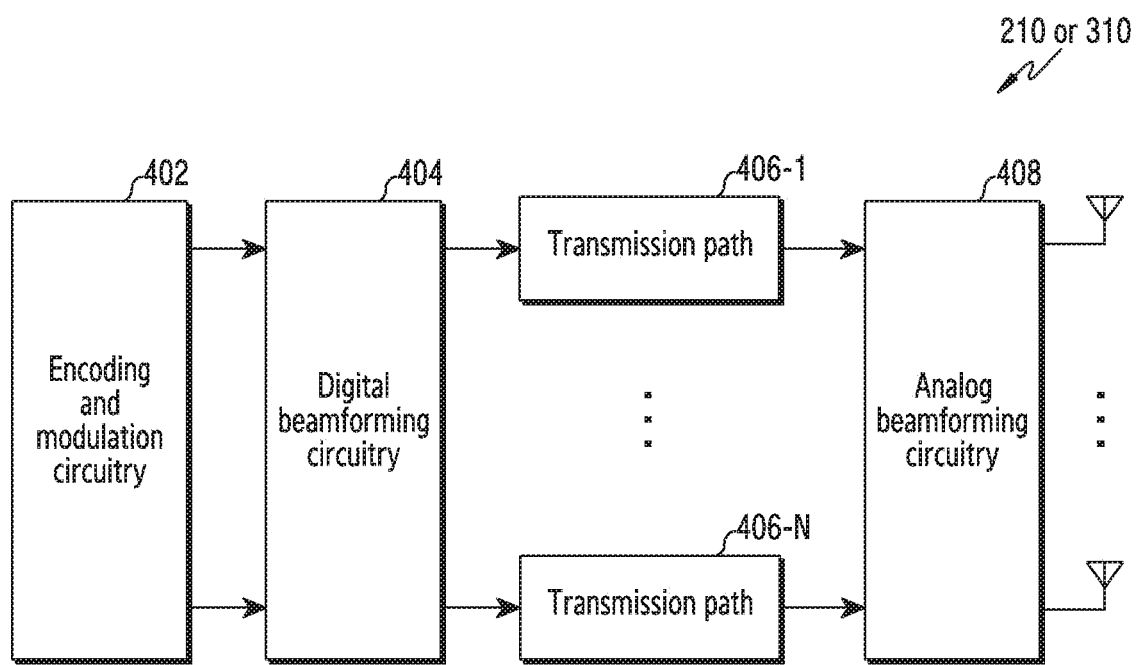
FIGS. 4A to 4C illustrate the configuration of a communication unit in a wireless communication system according to various embodiments of the disclosure.
Figure 4B:
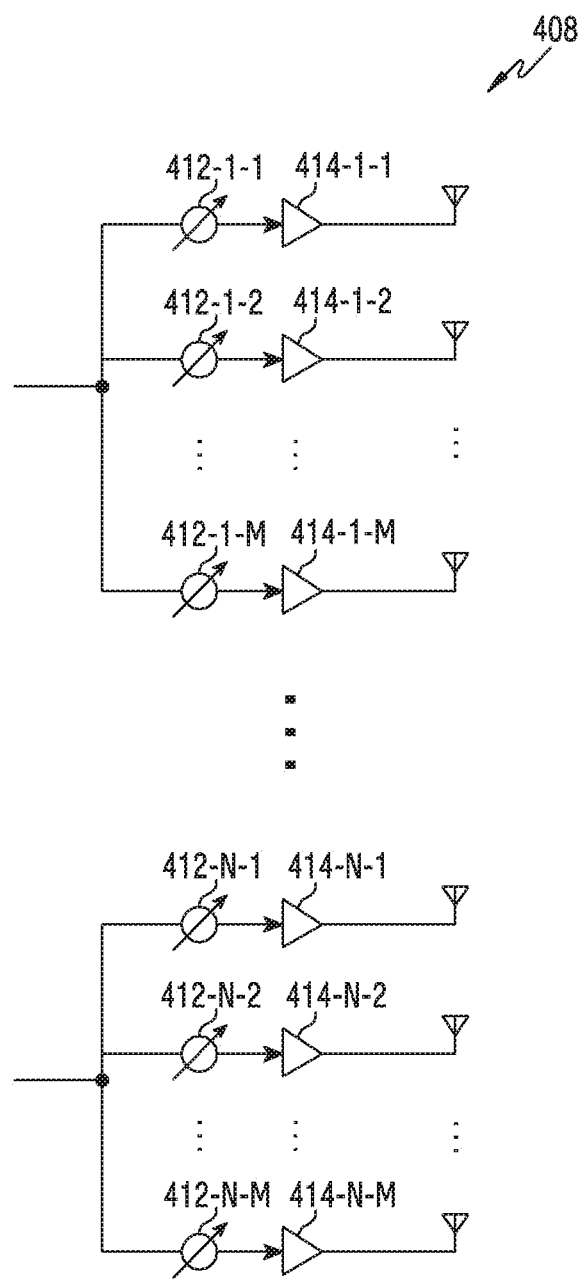
Figure 4C:
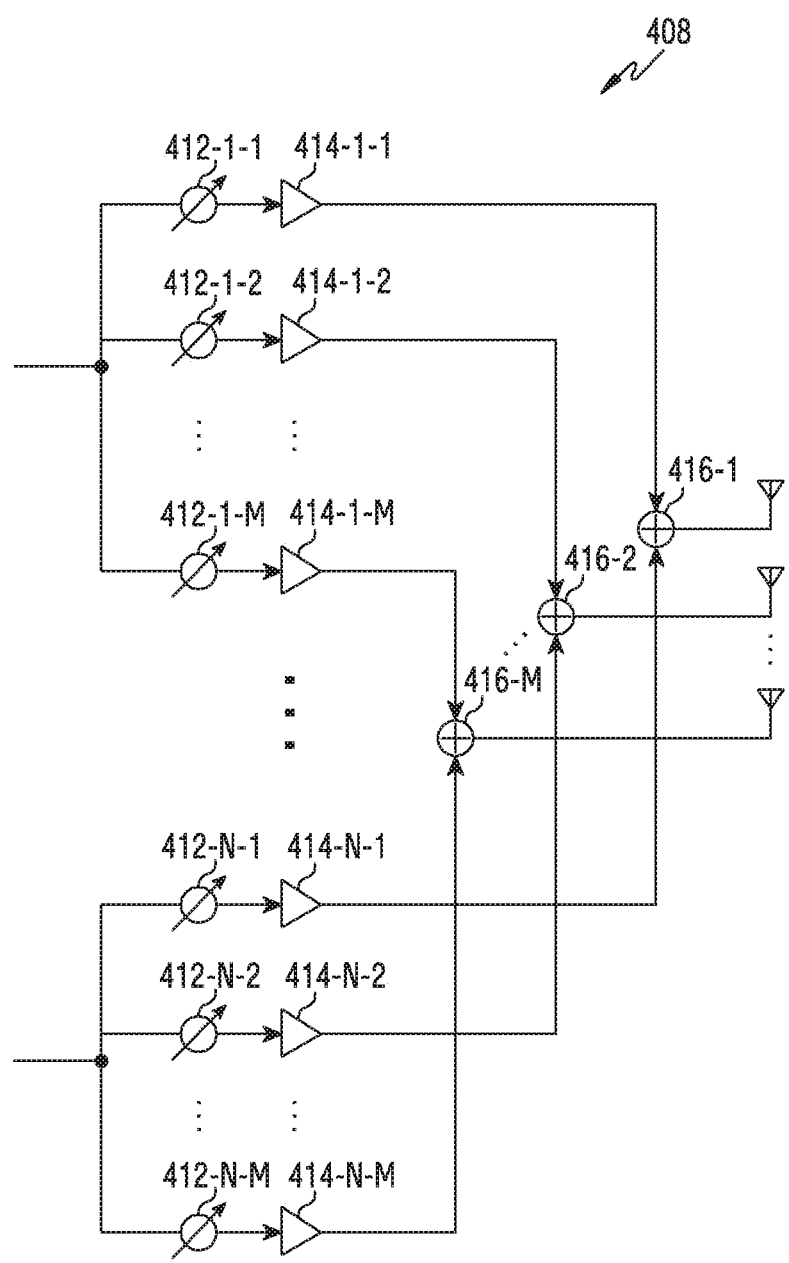

FIGS. 4A to 4C illustrate the configuration of a communication unit in a wireless communication system according to various embodiments of the disclosure. FIGS. 4A to 4C illustrate an example of the detailed configuration of the wireless communication unit 210 in FIG. 2 or the communication unit 310 in FIG. 3. Specifically, FIGS. 4A to 4C illustrate components for performing beamforming as parts of the wireless communication unit 210 in FIG. 2 or the communication unit 310 in FIG. 3.

Referring to FIG. 4A, the wireless communication unit 210 or the communication unit 310 includes an encoder/modulator 402, a digital beamformer 404, a plurality of transmission paths 406-1 to 406-N, and an analog beamformer 408.

The encoder/modulator 402 performs channel encoding. For channel encoding, at least one of LDPC (low density parity check) code, convolution code, and polar code may be used. The encoder/modulator 402 performs constellation mapping, thereby producing modulation symbols.

The digital beamformer 404 performs beamforming on digital signals (e.g., modulation symbols). To this end, the digital beamformer 404 multiplies the modulation symbols by beamforming weights. Here, the beamforming weight is used to change the magnitude and phase of a signal, and may be referred to as a "precoding matrix", a "precoder", or the like. The digital beamformer 404 outputs the digitally-beamformed modulation symbols to the plurality of transmission paths 406-1 through 406-N. In this case, according to a multiple-input multiple-output (MIMO) transmission scheme, modulation symbols may be multiplexed, or the same modulation symbols may be provided to the plurality of transmission paths 406-1 to 406-N.

The plurality of transmission paths 406-1 to 406-N converts the digitally-beamformed digital signals into analog signals. To this end, each of the plurality of transmission paths 406-1 to 406-N may include an IFFT (inverse fast Fourier transform) operator, a CP (cyclic prefix) inserter, a DAC, and an up-converter. The CP inserter is intended for an OFDM (orthogonal frequency division multiplexing) scheme, and may be excluded in the case where other physical layer schemes (e.g., FBMC (filter bank multi-carrier)) are applied. That is, the plurality of transmission paths 406-1 to 406-N provides an independent signal processing process to multiple streams produced through digital beamforming. However, depending on the manner of implementation, some of the components of the plurality of transmission paths 406-1 to 406-N may be used in common.

The analog beamformer 408 performs beamforming on the analog signals. To this end, the analog beamformer 408 multiplies the analog signals by beamforming weights. Here, the beamforming weight is used to change the magnitude and phase of a signal. Specifically, the analog beamformer 408 may be configured as shown in FIG. 4B or 4C depending on the connection structure between the plurality of transmission paths 406-1 to 406-N and antennas.

Referring to FIG. 4B, signals input to the analog beamformer 408 are processed to convert the phase/magnitude and amplification thereof, and then transmitted through antennas. At this time, the signals of the respective paths are transmitted through different antenna sets, that is, antenna arrays. As to the process of a signal input through a first path, the signal is converted into a signal stream having the same or different phases/amplitudes by the phase/amplitude converters 412-1-1 to 412-1-M, amplified by amplifiers 414-1-1 to 414-1-M, and then transmitted through antennas.

Referring to FIG. 4C, signals input to the analog beamformer 408 are processed to convert the phase/magnitude and amplification thereof, and are then transmitted through antennas. At this time, the signals of the respective paths are transmitted through the same antenna sets, that is, antenna arrays. As to the process of a signal input through a first path, the signal is converted into a signal stream having the same or different phases/amplitudes by the phase/amplitude converters 412-1-1 to 412-1-M, amplified by amplifiers 414-1-1 to 414-1-M, and then transmitted through antennas. The amplified signals are then summed by summators 416-1-1 to 416-1-M, based on the antenna elements, so as to transmit the same through a single antenna array, and are then transmitted through the antennas.

FIG. 4B illustrates an example in which respective transmission paths use antenna arrays independently, and FIG. 4C illustrates an example in which transmission paths share a single antenna array. However, according to another embodiment, some transmission paths may use antenna arrays independently, and other transmission paths may share a single antenna array. Furthermore, according to another embodiment, by applying a structure capable of switching between the transmission paths and the antenna arrays, a structure that can be adaptively changed according to the situation may be used.

Figure 5:
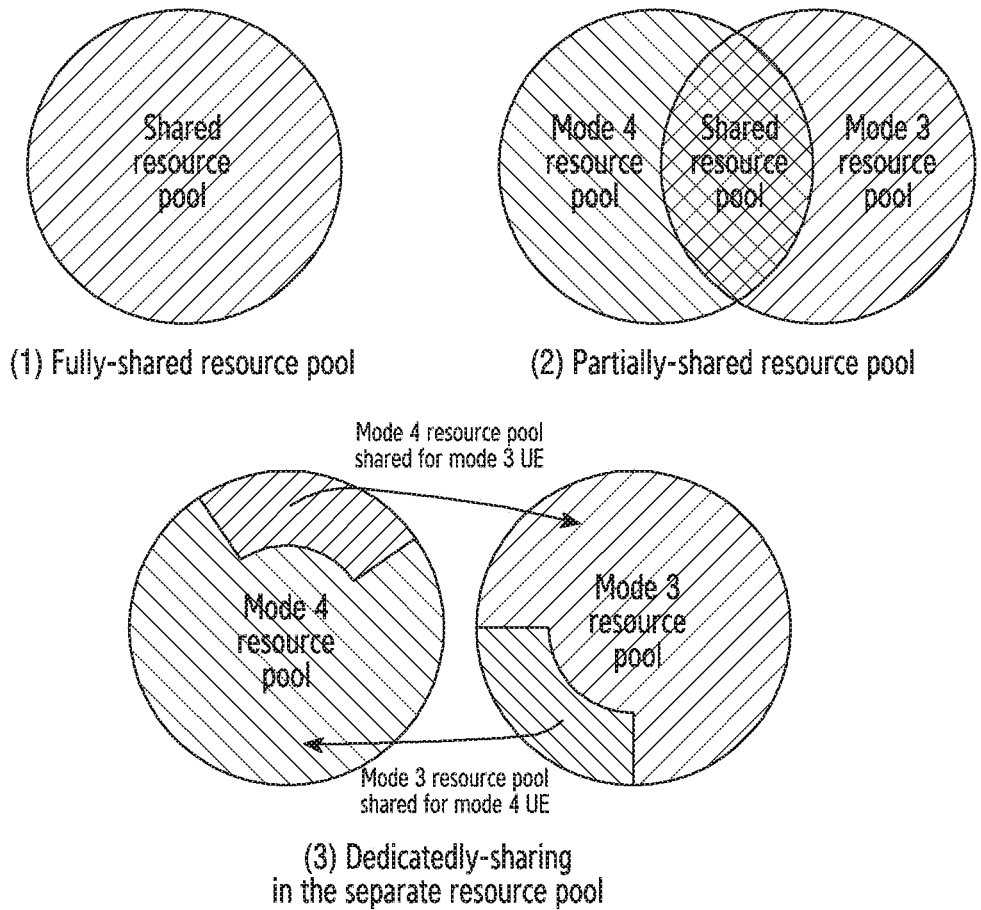
FIG. 5 illustrates a situation in which a shared resource pool used in transmitting a V2X (vehicle to everything) packet is dynamically operated according to various embodiments of the disclosure.

FIG. 5 illustrates the situation in which a shared resource pool used in transmitting a V2X packet is dynamically operated according to various embodiments of the disclosure.

Referring to FIG. 5, the resources to be shared when transmitting a V2X packet considered in the disclosure may be scheduled resources or UE-autonomously selected resources in sidelink. The scheduled resource is a resource to be used for V2X communication, which is directly scheduled for the terminal by the base station. The UE-autonomous selection resource is directly and autonomously selected and used by the terminal from a resource pool allocated for V2X communication.

The embodiment of the disclosure is applicable to the case in which a terminal is to operate two modes for using sidelink radio resources for V2X communication, that is, mode 3 (the mode in which a resource scheduled by a base station is used) and mode 4 (the mode in which a UE-autonomously selected resource is used), in a shared resource pool. According to various embodiments of the disclosure, the shared resource pool used when transmitting a V2X packet may be configured such that all resources in the shared resource pool may be used in common in mode 3 and in mode 4 as shown in part (1) of FIG. 5 (fully-shared resource pool); such that only some resources in the shared resource pool may be used in common in mode 3 and mode 4 while maintaining independent resource pools as shown in part (2) of FIG. 5 (partially-shared resource pool); or such that the resource pool allocated for mode 4, among resource pools that are independently operated in mode 3 and in mode 4, is allowed to mode 3 and thus dynamically shared by mode 3 (see the arrow to the right) or the resource pool allocated for mode 3 is allowed to mode 4 and thus dynamically shared by mode 4 (see the arrow to the left) as shown in part (3) of FIG. 5 (dedicatedly-sharing in the separate resource pool).

According to an embodiment of operating a shared resource pool of the disclosure, in the case where the resource pool of a V2X terminal in mode 3 is to be shared with a V2X terminal in mode 4, the mode 4 terminal may use resources while minimizing interference with the V2X communication performed in mode 3. As another example, in the case where the resource pool of a V2X terminal in mode 4 is to be shared with a V2X terminal in mode 3, the mode 3 terminal may use resources while minimizing interference with the V2X communication performed in mode 4. The operation of a shared resource pool aims at efficient utilization of frequency bands for V2X, and may be used universally for a service for satisfying a required transmission delay of the mode 3 and mode 4 V2X terminals by avoiding a collision when selecting radio resources.

A terminal operating in mode 4 in LTE (long term evolution)-V2X of Release 14 autonomously senses the resource pool to which the terminal belongs, and competitively selects and uses idle resources, based on the result of sensing (contention-based resource selection).

Prior to the process of (re)selecting a transmission resource by the mode 4 terminal in Release 14, a MAC (medium access control) entity of the terminal sets a resource reservation interval to a value obtained by multiplying a "restrictResourceReservationPeriod" value set by RRC by 100, selects any integer from the range [5,15] if the set interval value is greater than or equal to 100 ms, selects any integer from the range [10,30] if the set interval value is 50 ms, and selects any integer from the range [25,75] if the set interval value is 20 ms, thereby configuring the same as a "SL_RESOURCE_RESELECTION_COUNTER" value.

The configured "SL_RESOURCE_RESELECTION_COUNTER" value is decremented by 1 each time a MAC PDU (protocol data unit) to be sent is transmitted. If the "SL_RESOUR CE_RESELECTION_COUNTER" value reaches 0, the mode 4 terminal may determine whether to continue to use the grant for the radio resource previously selected from the resource pool to which the terminal belongs or to initialize and reselect the same depending on "probResourceKeep" defined in "SL-CommTxPoolSensingConfig" among the RRC sidelink information elements (e.g., RRC standards in Release 14 as shown in Table 1 ("SL-CommTxPoolSensingConfig" information elements) below).

TABLE 1

-ASN1START
SL-CommTxPoolSensingConfig-r14 :: = SEQUENCE {
   pssch-TxConfigList-r14 SL-PSSCH-TxConfigList-r14,
   thresPSSCH-RSRP-List-r14 SL-ThresPSSCH-RSRP-List-r14,
   restrictResourceReservationPeriod-r14 SL-
RestrictResourceReservationPeriodList-r14
   OPTIONAL, --Need OR
   probResourceKeep-r14 ENUMERATED {v0, v0dot2, v0dot4, v0dot6, v0dot8, spare3, spare2, spare1}, TABLE 1-continued

```
   p2x-SensingConfig-r14 SEQUENCE {
      minNumCandidateSF-r14 INTEGER (1..13),
      gapCandidateSensing-r14 BIT STRING (SIZE(10))
   } OPTIONAL, --Need OR
   sl-ReselectAfter-r14 ENUMERATED {n1, n2, n3, n4, n5, n6, n7,
n8, n9, spare7, spare6, spare5, spare4, spare3, spare2, spare1}
OPTIONAL --Need OR
}
-ASN1STOP
```

"probResourceKeep" value is determined to be a threshold as RRC configuration information by implementation of the base station, and the mode 4 terminal operates as follows. If any value selected from the range [0,1] by the mode 4 terminal is less than the "probResourceKeep" value, the terminal selects any integer from the range [5,15] if the previously set interval value is greater than or equal to 100 ms, selects any integer from the range [10,30] if the set interval value is 50 ms, or selects any integer from the range [25,75] if the set interval value is 20 ms, thereby configuring the same as the "SL_RESOURCE_RESELECTION_CO-UNTER" value and then performing sidelink transmission utilizing the previous SL grant.

On the other hand, if any value selected from the range [0,1] by the mode 4 terminal is greater than the "probResourceKeep" value, the terminal may release the previously set sidelink grant, may autonomously sense the resource pool to which the terminal belongs, and may then competitively select and use idle resources, based on the result of sensing (contention-based resource selection). At this time, the MAC entity of the terminal sets a resource reservation interval to a value obtained by multiplying the "restrictResourceReservationPeriod" value configured by RRC by 100, selects any integer from the range [5,15] if the set interval value is greater than or equal to 100 ms, selects any integer from the range [10,30] if the set interval value is 50 ms, and selects any integer from the range [25,75] if the set interval value is 20 ms, thereby configuring the same as the "SL_RESOURCE_RESELECTION_COUNTER" value.

In addition, in the case where the number of retransmissions of HARQ (hybrid automatic repeat request) of a terminal operating in mode 4 in LTE-V2X of Release 14 is set to 1, any one transmission opportunity may be selected among available frequency-time resources, and a radio resource set reflecting the resource reservation interval and the number of transmissions may be configured based on the selected resources. The number of retransmissions is determined based on a sidelink PSSCH (physical sidelink shared channel) transmission parameter in the RRC. The mode 4 terminal is allowed to perform only initial transmission or is able to perform retransmission once. If "both" is configured, the terminal may autonomously select the initial transmission or the one-time retransmission (e.g., Release 14 RRC standards as shown in Table 2 ("SL-PSSCH-TxConfigList" information element) below).

TABLE 2

```
-ASN1START
SL-PSSCH-TxConfigList-r14 :: = SEQUENCE (SIZE (1..maxPSSCH-
TxConfig-r14)) OF SL-PSSCH-TxConfig-r14
SL-PSSCH-TxConfig-r14 :: = SEQUENCE {
   typeTxSync-r14 SL-TypeTxSync-r14 OPTIONAL, -Need OR
   thresUE-Speed-r14 ENUMERATED {kmph60, kmph80, kmph100,
kmph120, kmph140, kmph160, kmph180, kmph200},
   parametersAboveThres-r14 SL-PSSCH-TxParameters-r14,
   parametersBelowThres-r14 SL-PSSCH-TxParameters-r14,
   ...
}
```

TABLE 2-continued

```
SL-PSSCH-TxParameters-r14 :: = SEQUENCE {
   minMCS-PSSCH-r14 INTEGER (0..31),
   maxMCS-PSSCH-r14 INTEGER (0..31),
   minSubChannel-NumberPSSCH-r14 INTEGER (1..20),
   maxSubchannel-NumberPSSCH-r14 INTEGER (1..20),
   allowedRetxNumberPSSCH-r14 ENUMERATED {n0, n1, both,
spare1},
   maxTxPower-r14 SL-TxPower-r14 OPTIONAL --Cond CBR
}
-ASN1STOP
```

Figure 6:
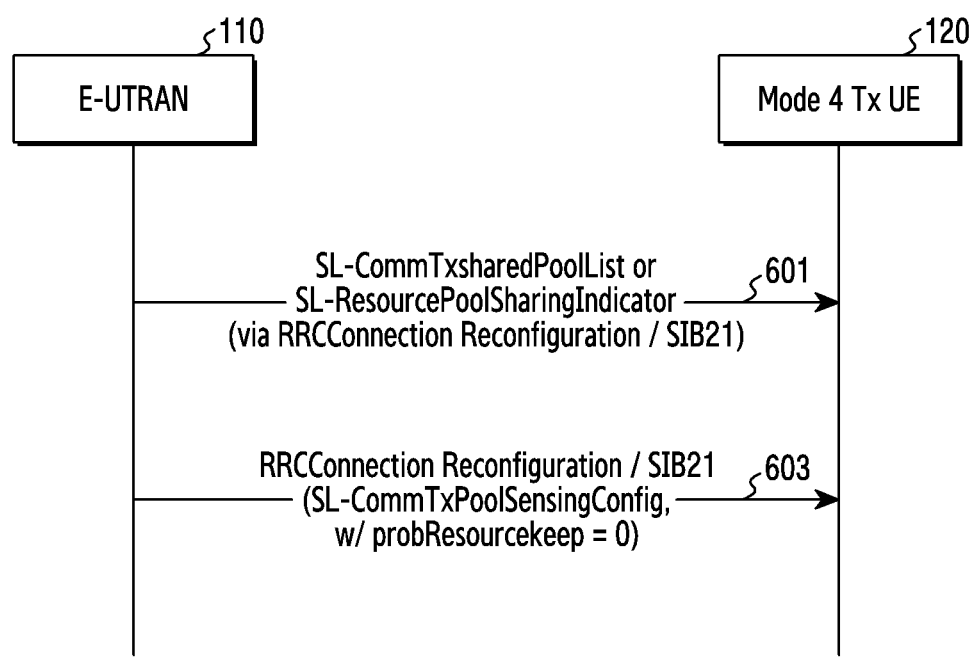
FIG. 6 illustrates signal exchange for additional configuration in which a base station limits a resource keeping probability (probResourceKeep) threshold of a mode 4 terminal when operating a shared resource pool according to various embodiments of the disclosure.

FIG. 6 illustrates signal exchange for additional configuration in which a base station limits a resource keeping probability (probResourceKeep) threshold of a mode 4 terminal when operating a shared resource pool according to various embodiments of the disclosure. FIG. 6 illustrates signal exchange between a base station 110 and a terminal 120.

Referring to FIG. 6, in step 601, the base station (e.g., E-UTRAN (evolved-UNITS (universal mobile telecommunication system) terrestrial radio access network) may manage a shared resource pool, based on a resource sharing pool list and a resource non-sharing pool list (e.g., SL-CommTxSharedPoolList), or may manage a shared resource pool using an indication message indicating whether or not each resource pool is shared (e.g. SL-ResourcePoolSharingIndicator). The base station may provide transmission resource pool information to the mode 3 terminal and the mode 4 terminal using a "RRCConnectionReconfiguration" message, SIB (system information block) 21, or another RRC message.

In step 603, in the case where the mode 4 terminal belongs to the shared resource pool, the base station may directly provide an additional configuration for limiting a "probResourceKeep" value to 0 using the "RRCConnectionReconfiguration" message, an SIB-21 message, or another RRC message.

Embodiment of "SL-CommTxPoolSensingConfig" for the "probResourceKeep" operation
probResourceKeep-r15={0} (If "probResourceKeep-r15" is configured, the existing "probResourceKeep-r14" is ignored.)

In another embodiment, if the "probResourceKeep" value is configured, the "probResourceKeep" value may be defined as follows by adding a condition in consideration of the situation of operating a shared resource pool.

Embodiment of "SL-CommTxPoolSensingConfig" for "probResourceKeep" operation
probResourceKeep-r14    probResourceKeep-r15
   OPTIONAL—Cond SharedPool (configuration for the
   "probResourceKeep" value can be selected in RRC of
   the base station depending on whether or not a shared
   resource pool is operated)

In some embodiments, in the case where the mode 4 terminal still has data to transmit and completes the sidelink transmission by the number of transmissions according to "SL_RESOURCE_RESELECTION_COUNTER" using the preemptive resource, if the "probResourceKeep" value received from the base station is 0, the mode 4 terminal sets the "probResourceKeep" value managed by the mode 4 terminal to 0 and performs an operation of sensing the usage status of the shared resource pool in order to select resources for data to be transmitted by the mode 4 terminal in the buffer. The above operation of the mode 4 terminal may be applied to the case where the mode 4 terminal utilizes a preconfigured shared resource pool or utilizes some of the independent resource pools for mode 4 as the shared resource pool. In other embodiments, in the case where the "probResourceKeep" value for the shared resource pool is set to 0 by default, if the mode 4 terminal has data to transmit and completes the sidelink transmission by the number of transmissions according to "SL_RESOURCE_RESELECTION_COUNTER" using the preemptive resources, and if an indication indicating that the terminal belongs to the shared resource pool is received from the base station, the mode 4 terminal may sense the usage status of the shared resource pool in order to select resources for data to be transmitted in the buffer. The additional configuration in which the base station limits the "probResourceKeep" threshold to 0 for the mode 4 terminal may prevent a collision with the mode 3 terminal by decoding SA (scheduling assignment) information of the mode 3 terminal, compared to the operation of maintaining the resources without sensing the resource usage status of the shared resource pool.

Figure 7:
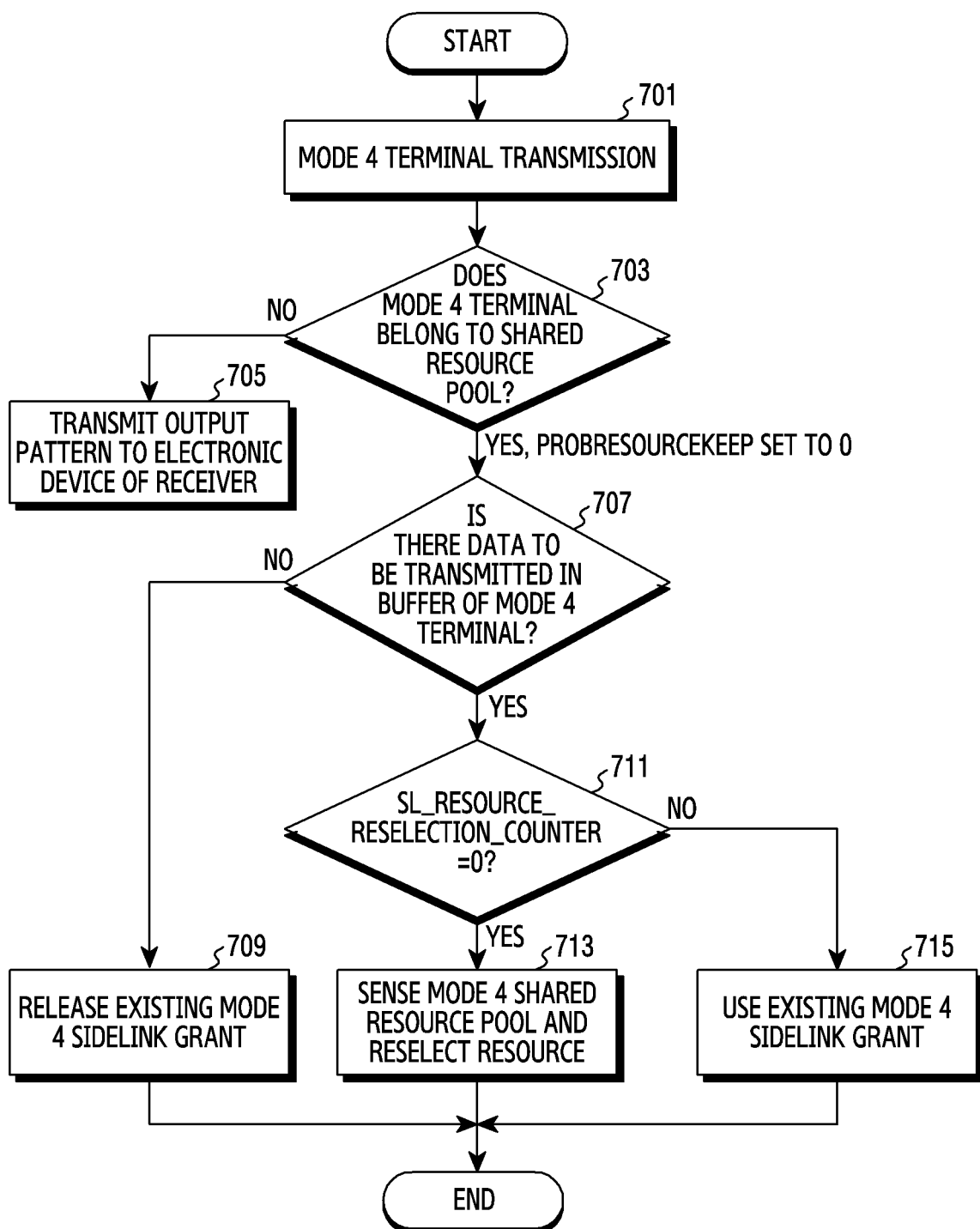
FIG. 7 is a flowchart illustrating the operation of a mode 4 terminal when a resource keeping probability (probResourceKeep) threshold is limited and set to 0 by a base station according to various embodiments of the disclosure.

FIG. 7 is a flowchart illustrating the operation of a mode 4 terminal when a resource keeping probability (probResourceKeep) threshold is set to 0 by a base station according to various embodiments of the disclosure. FIG. 7 illustrates a method of operating the terminal 120.

Referring to FIG. 7, in step 701, the mode 4 terminal performs sidelink transmission using a sidelink grant. In step 703, the mode 4 terminal determines whether or not the mode 4 terminal belongs to a shared resource pool.

If the mode 4 terminal does not belong to the shared resource pool previously configured by the RRC configuration (i.e., if the mode 4 terminal belongs to a mode 4 independent resource pool), the mode 4 terminal performs a mode 4 operation based on Release 14 in step 705.

If the mode 4 terminal belongs to the shared resource pool, the mode 4 terminal identifies whether or not there is data to be transmitted in the buffer in step 707. If there is no data to be transmitted in the buffer, the mode 4 terminal may release sidelink grants formed in the MAC layer and the physical layer in step 709.

If there is data to be transmitted in the buffer, the mode 4 terminal identifies whether or not the "SL_RESOURCE_RESELECTION_COUNTER" value reaches 0 in step 711. If the "SL_RESOURCE_RESELECTION_COUNTER" value reaches 0, the mode 4 terminal senses and reselects a shared resource pool, instead of maintaining the previously used resources according to the condition "probResourceKeep=0" configured by the RRC configuration, thereby configuring a new sidelink grant in step 713. If the "SL_RESOURCE_RESELECTION_COUNTER" value does not reach 0, the mode 4 terminal maintains the existing sidelink grant and performs sidelink transmission in step 715. In the above embodiment, if the mode 4 terminal belongs to the shared resource pool, the condition "probResourceKeep=0" received from the base station may be applied to the RRC of the terminal.

According to various embodiments of the disclosure, the respective steps shown FIG. 7 may be performed by a MAC entity, except for setting the RRC "probResourceKeep" value.

Figure 8:
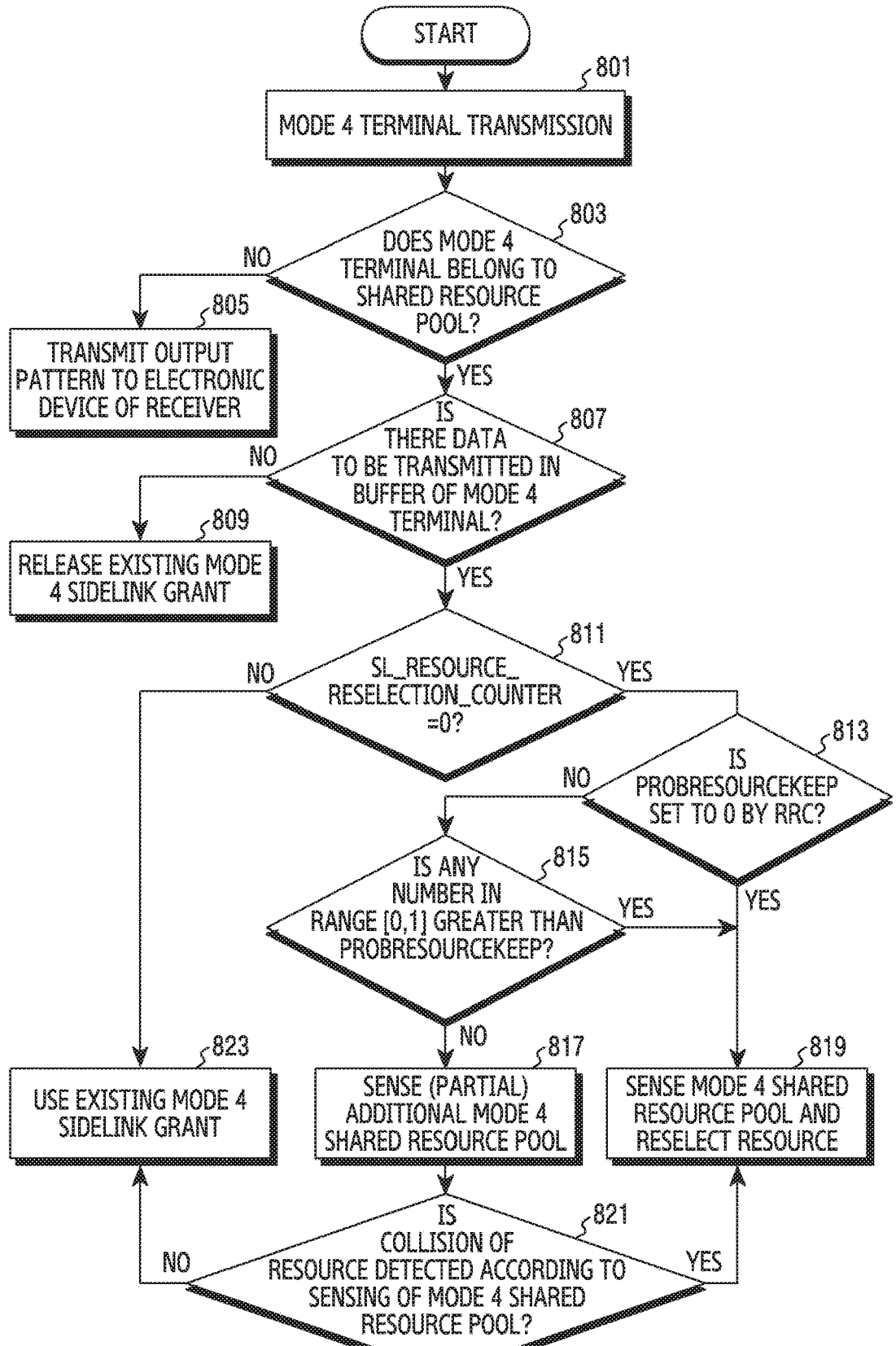
FIG. 8 is a flowchart illustrating an operation in which a mode 4 terminal senses additional resource collisions in a shared resource pool and determines whether or not to maintain resources according to various embodiments of the disclosure.

FIG. 8 is a flowchart illustrating an operation in which a mode 4 terminal senses additional resource collisions in a shared resource pool and determines whether or not to maintain resources according to various embodiments of the disclosure. FIG. 8 illustrates a method of operating the terminal 120.

Referring to FIG. 8, in step 801, a mode 4 terminal performs sidelink transmission using a sidelink grant. In step 803, the mode 4 terminal determines whether or not the mode 4 terminal belongs to a shared resource pool previously configured by RRC configuration.

If the mode 4 terminal does not belong to the shared resource pool (i.e., if the mode 4 terminal belongs to a mode 4 independent resource pool), the mode 4 terminal performs a mode 4 operation, based on Release 14 in step 805.

If the mode 4 terminal belongs to the shared resource pool, the mode 4 terminal identifies whether or not there is data to be transmitted in the buffer in step 807. If there is no data to be transmitted in the buffer, the mode 4 terminal may release the sidelink grant configured in the MAC layer and the physical layer in step 809.

If there is data to be transmitted in the buffer, the mode 4 terminal identifies whether or not an "SL_RESOURCE_RESELECTION_COUNTER" value reaches 0 in step 811. If the "SL_RESOURCE_RESELECTION_COUNTER" value does not reach 0, the mode 4 terminal maintains the existing sidelink grant and performs sidelink transmission in step 823.

If "SL_RESOURCE_RESELECTION_COUNTER" value reaches 0, the mode 4 terminal identifies whether or not a "probResourceKeep" value set by the RRC configuration is 0 in step 813. If the "probResourceKeep" value set by the RRC configuration is 0, the mode 4 terminal senses and reselects a shared resource pool, instead of maintaining the previously used resources, thereby configuring a new sidelink grant in step 819. If the "probResourceKeep" value preset by the RRC configuration is not 0, the mode 4 terminal selects any real number from the range [0,1] and identifies whether or not the selected real number is greater than the "probResourceKeep" value in step 815.

If any selected real number is less than the "probResourceKeep" value, the mode 4 terminal further performs partial sensing for the shared resource pool to which the mode 4 terminal belongs before maintaining and using the previously used resources in step 817.

If any selected real number is greater than the "probResourceKeep" value, the mode 4 terminal determines not to maintain the previously used resources, and senses and reselects a shared resource pool, thereby configuring a new sidelink grant in step 819.

In step 821, the mode 4 terminal determines whether or not resource selection collision occurs by the additional sensing for the shared resource pool. If no collision of resource selection occurs while the previously used resources are maintained, the mode 4 terminal maintains the previously used resource, thereby performing sidelink transmission in step 823. If resource selection collision occurs while the previously used resources are maintained, the mode 4 terminal performs a process of sensing for and reselecting a shared resource pool, thereby configuring a new sidelink grant in step 819.

In some embodiments, the embodiment of partial sensing, which is further performed by the mode 4 terminal in order to maintain the previously used resources, may include the following operations.

- In the case of additional sensing, the sensing range of the mode 4 terminal is maintained to be the same as the existing range (for example, performing sensing until 1000 ms before the present time)
- In the case of additional sensing, the sensing range of the mode 4 terminal is set to be less than the existing range (for example, performing sensing until XXX ms before the present time, where XXX<1000)

In the case of additional sensing, a resource to be actually sensed is arbitrarily selected within the sensing range of the mode 4 terminal (for example, sensing only the resources of subframes corresponding to multiples of 3 from sensing target resources until 1000 ms before the present time)

In the case of additional sensing, unlike existing sensing, only some information necessary for collision is extracted and determined (for example, sensing only resource preemption indication information of other terminals in SA (scheduling assignment) information, excluding a sensing process based on RSRP (reference signal received power), when performing sensing until 1000 ms before the present time).

In the case of additional sensing, the sensing range is set to a range until immediately before the initial transmission by the mode 4 terminal, excluding the sensing range performed in the resource preemption for the previous transmission (in the case where the time difference from the selection of a resource to the initial transmission by the mode 4 terminal is large, the embodiment may be further performed in addition to the process of sensing for the resource pool by the mode 4 terminal).

In some embodiments, if the value arbitrarily selected by the mode 4 terminal from the shared resource pool is greater than the "probResourceKeep" value, the resource usage status of the mode 3 terminal and the mode 4 terminal, which is provided in the shared resource pool, may be searched for every time the sidelink transmission is completed by the number of transmissions using the preemptive resources, thereby avoiding resource selection collision. In other embodiments, if the value arbitrarily selected by the mode 4 terminal from the shared resource pool is less than the "probResourceKeep" value, the mode 4 terminal may maintain the existing sidelink grant, and may perform an additional (partial) sensing operation before performing sidelink transmission using the preemptive resources, thereby preventing a collision with the mode 3 terminal scheduled by the base station.

According to various embodiments of the disclosure, in FIG. 8, the mode 4 terminal may search for additional resource collisions in the shared resource pool, based on the resource keeping probability (probResourceKeep) threshold set by the base station, thereby determining whether or not to maintain the resources. According to various embodiments of the disclosure, the respective steps shown FIG. 8 may be performed by a MAC entity, except for setting the RRC "probResourceKeep" value.

Figure 9:
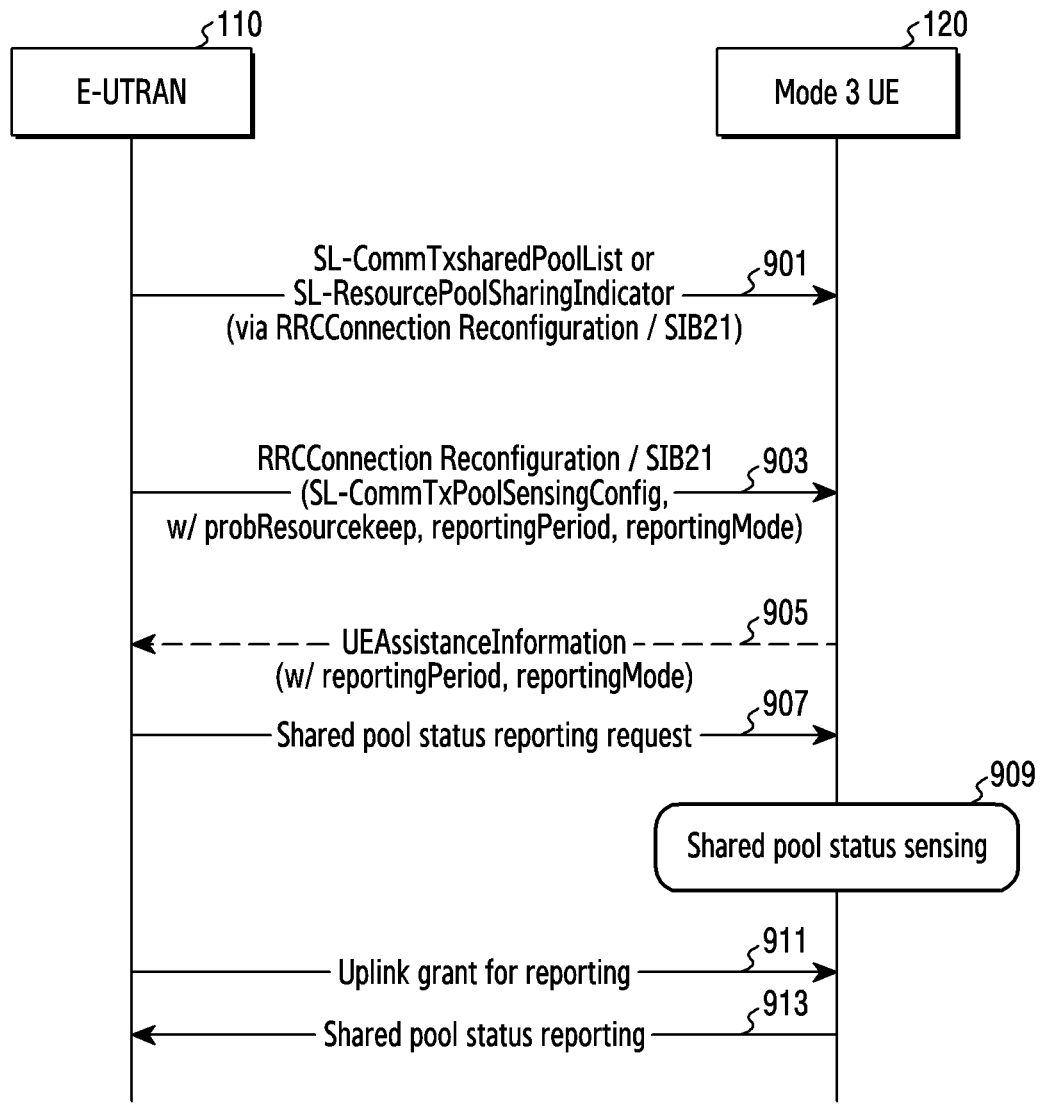
FIG. 9 illustrates signal exchange for configuring a period for a mode 3 terminal to sense a shared resource pool and report the same to a base station and for reporting a sensing result in the case where the shared resource pool is configured according to various embodiments of the disclosure.

FIG. 9 illustrates signal exchange for configuring a period for a mode 3 terminal to sense a shared resource pool and report the same to a base station and for reporting a sensing result in the case where a shared resource pool is configured according to various embodiments of the disclosure. FIG. 9 illustrates signal exchange between a base station 110 and a terminal 120.

Referring to FIG. 9, in step 901, the base station may manage a shared resource pool 1) using a resource sharing pool list and a resource non-sharing pool list, or 2) using an indication message indicating whether or not each resource pool is shared. The base station may provide transmission resource pool information to the mode 3 terminal using the "RRCConnectionReconfiguration" message, a SIB (system information block) 21, or another RRC message.

In step 903, if the mode 3 terminal operates in the shared resource pool, the base station may provide the mode 3 terminal with the "probResourceKeep" value and configuration of a period for reporting to the base station after sensing the shared resource pool using an RRC message or an SIB 21 message. At this time, the "probResourceKeep" value, "reportingPeriod" value, and the "reportingMode" value may be preconfigured by the RRC configuration, or may be selected through implementation of the base station.

In step 905, after receiving the "probResourceKeep" value and "reportingPeriod" value from the base station in the shared resource pool, the mode 3 terminal may change the reporting period value or change the reporting mode value through an RRC message such as "UEAssistanceInformation" or the like. In some embodiments, if the sidelink communication service for the mode 3 terminal is not guaranteed in the shared resource pool, if the set "probResourceKeep" value is small, or if a measured CBR (channel busy ratio) value is determined to be greater than a predetermined reference value, the mode 3 terminal may reduce the "reportingPeriod" value, thereby increasing the frequency of reporting. In other embodiments, if the set "probResourceKeep" value is great, if the sidelink communication service for the mode 3 terminal is guaranteed in the shared resource pool, or if a measured CBR value is determined to be less than a predetermined reference value, the mode 3 terminal may increase the "reportingPeriod" value, thereby reducing the frequency of reporting. In still other embodiments, if the mode 3 terminal no longer performs sensing of the shared resource pool, the mode 3 terminal may stop the sensing by changing the "reportingMode" value.

In step 907, in the case where the reporting period value and the reporting mode for the result of sensing the shared resource pool by the mode 3 terminal are determined through an RRC message by the base station or the terminal, the base station makes a request to the mode 3 terminal for sensing the shared resource pool.

In step 909, the mode 3 terminal performs sensing of a shared resource pool. In step 911, the base station provides the mode 3 terminal with an uplink grant to report a result of sensing the shared resource pool.

In operation 913, the mode 3 terminal may repeatedly perform sensing and reporting according to a preconfigured shared resource pool sensing reporting period value.

According to various embodiments of the disclosure, the mode 3 terminal may adjust the frequency of sensing and reporting the shared resource pool, based on the "probResourceKeep" and "reportingPeriod" values in the shared resource pool, thereby avoiding a collision with the mode 4 terminal. For example, although the mode 3 terminal senses the status of a resource pool of the mode 4 terminal, decodes SA information of the resources in use, and reports the same to the base station, if the reporting result is not valid due to subsequent failure to reflecting recently changed preempted resource information of the mode 4 terminal, the mode 3 terminal may perform the above operation to reduce the reporting period after sensing the SA information of the mode 4 terminal, thereby preventing a collision. As another example, if there is a low probability of the mode 4 terminal maintaining the existing resources because the "probResourceKeep" value is small, the mode 4 terminal may reduce the reporting period after sensing SA information, in order to quickly reflect information on newly used resources, thereby preventing a collision. As another example, if there is a high probability of the mode 4 terminal maintaining the existing resources because the "probResourceKeep" value is high, the mode 4 terminal may increase the reporting period after sensing SA information of the mode 4 terminal, thereby enhancing the efficiency of reporting.

Figure 10:
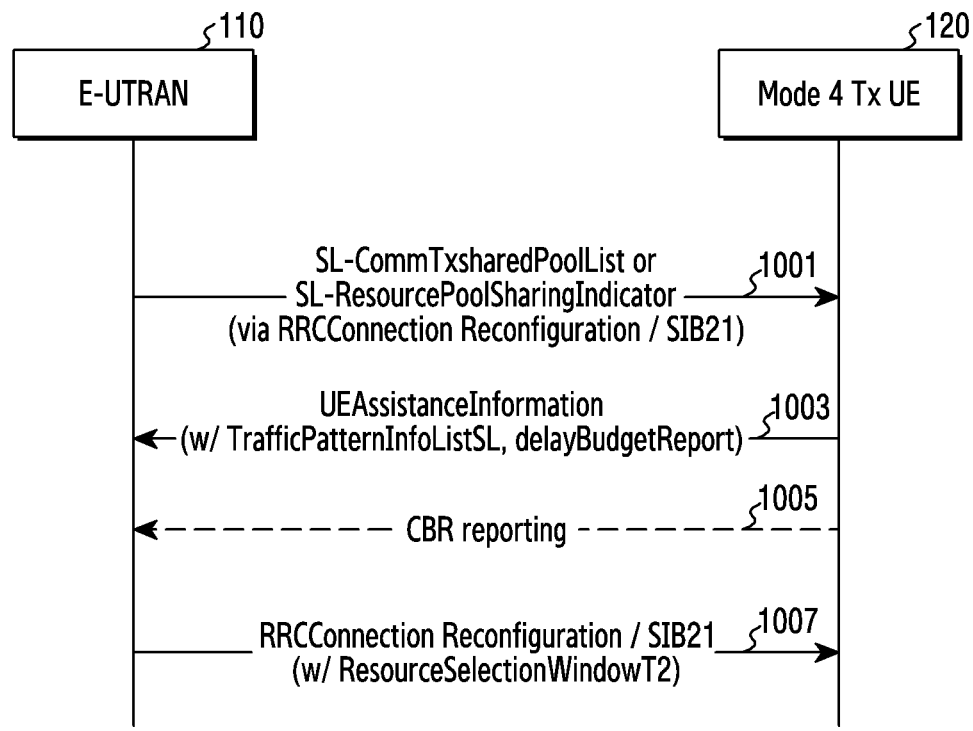
FIG. 10 illustrates signal exchange for configuring the maximum value T2 of a resource selection window when a mode 4 terminal selects resources after UE-autonomous sensing in a shared resource pool in the case where the shared resource pool is configured according to various embodiments of the disclosure.

FIG. 10 illustrates signal exchange for configuring the maximum value T2 of a resource selection window when a mode 4 terminal selects resources after UE-autonomous sensing in a shared resource pool in the case where a shared resource pool is configured according to various embodiments of the disclosure. FIG. 10 illustrates signal exchange between a base station 110 and a terminal 120.

Referring to FIG. 10, in step 1001, the base station may manage a shared resource pool 1) using a resource sharing pool list and a resource non-sharing pool list or 2) using an indication message indicating whether or not each resource pool is shared. The base station may provide transmission resource pool information to the mode 4 terminal using "RRCConnectionReconfiguration" message, SIB 21, or another RRC message.

In step 1003, the mode 4 terminal may inform the base station of sidelink traffic pattern information (TrafficPatternInfoListSL) or a transmission delay budget report (delayBudgetReport) through a "UEAssistanceInformation" message or the like.

In step 1005, the mode 4 terminal reports measured CBR values to the base station.

In step 1007, the base station may configure the maximum value T2 of a resource selection window in the shared resource pool for the mode 4 terminal by reflecting the information. In this case, the configuration value T2 may be transmitted through the "RRCConnectionReconfiguration" message, an SIB 21 message, or another RRC message.

In some embodiments, if the mode 4 terminal still has data to be transmitted, and if the "ResourceSelectionWindowT2" value received from the base station is changed, the mode 4 terminal may maintain the grant currently being used for sidelink transmission until performing selection of resources after sensing the next shared resource pool, may sense a shared resource pool to be performed subsequently, and may then transmit a V2X packet using a resource selected by applying the changed value T2 when selecting the resources. In other embodiments, if the mode 4 terminal still has data to be transmitted, and if the "ResourceSelectionWindowT2" value received from the base station is changed, the mode 4 terminal may perform reconfiguration, instead of maintaining the grant being used for sidelink transmission. In this case, the mode 4 terminal may transmit a V2X packet using a resource selected by applying the changed value T2 when selecting the resources after sensing the shared resource pool to be performed.

In some embodiments, the mode 4 terminal may configure the maximum value T2 of the UE-autonomous resource selection window to be short in the shared resource pool in order to satisfy the low-latency requirement of the V2X sidelink transmission. In other embodiments, since there may be an interval in which the mode 4 terminal does not perform sidelink transmission while waiting to perform initial transmission in the preempted resource, another terminal may be allocated with a resource in the time difference, thereby causing a collision. In this case, the mode 4 terminal may shorten the time difference until the initial transmission by shortening the maximum value T2 of the resource selection window in the shared resource pool, and may thus prevent a collision.

A "UEAssistanceInformation" message transmitted in step 1003 is intended to inform the base station of information on the terminal, and is transmitted when the terminal is connected to the base station. Therefore, according to other embodiments of the disclosure, step 1003 may be omitted.

In addition, step 1005, in which the terminal reports measured CBR values, is a process in which the terminal receiving SIB 21, "RRCConnectionReconfiguration" message, or another RRC message reports the channel usage status to the base station, and is performed separately from the operation for selecting resources, based on the value T2. Therefore, according to other embodiments of the disclosure, step 1005 may be performed independently of steps 1003 and 1007.

Figure 11:
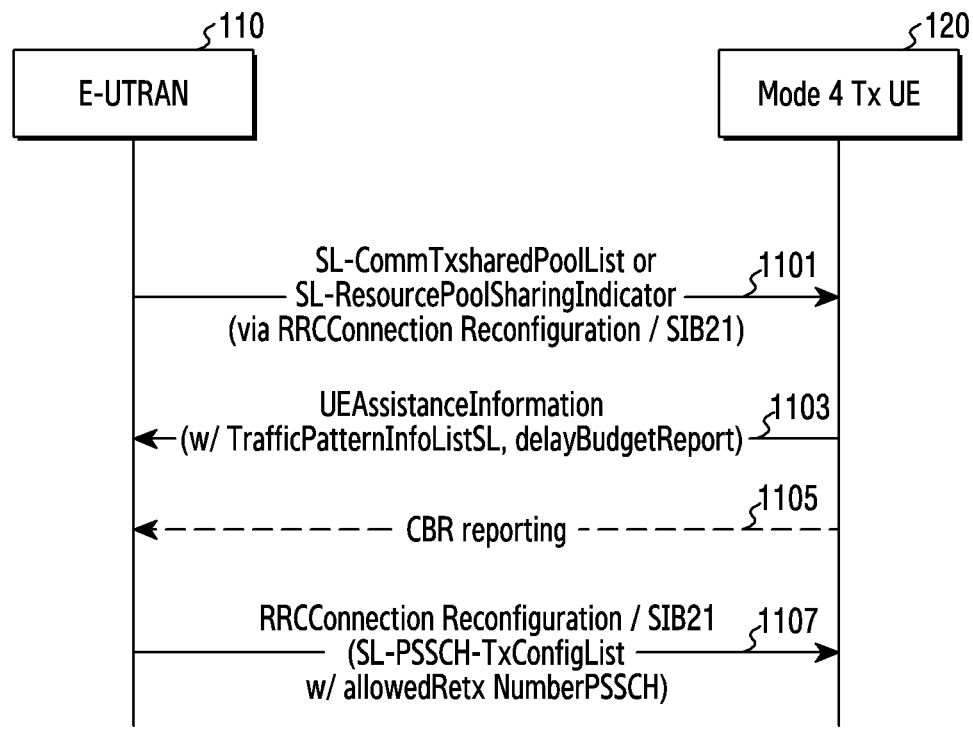
FIG. 11 illustrates signal exchange for configuring the number of retransmissions of HARQ (hybrid automatic repeat request) when a mode 4 terminal selects resources after UE-autonomous sensing in a shared resource pool in the case where the shared resource pool is provided according to various embodiments of the disclosure.

FIG. 11 illustrates signal exchange for configuring the number of retransmissions of HARQ (hybrid automatic repeat request) when a mode 4 terminal selects resources after UE-autonomous sensing in a shared resource pool in the case where a shared resource pool is provided according to various embodiments of the disclosure. FIG. 11 illustrates signal exchange between a base station 110 and a terminal 120.

Referring to FIG. 11, in step 1101, the base station may manage a shared resource pool 1) using a resource sharing pool list and a resource non-sharing pool list or 2) using an indication message indicating whether or not each resource pool is shared. The base station may provide transmission resource pool information to the mode 4 terminal using the "RRCConnectionReconfiguration" message, SIB 21, or another RRC message.

In step 1103, the mode 4 terminal may inform the base station of a transmission delay budget report (delayBudgetReport), a reliability budget report (reliabilityBudgetReport), or the like through the "UEAssistanceInformation" message.

In step 1105, the mode 4 terminal may report measured CBR values to the base station. In step 1107, the base station may configure the number of retransmissions of HARQ in the shared resource pool for the mode 4 terminal by reflecting the information. In this case, the configuration of the number of retransmissions of HARQ may be transmitted through the "RRCConnectionReconfiguration" message, SIB 21 message, or another RRC message.

In some embodiments, if the mode 4 terminal belongs to a shared resource pool, the base station may directly set the "allowedRetxNumberPSSCH" value to 0 through the "RRCConnectionReconfiguration" message, an SIB 21 message, or another RRC message, thereby adding HARQ retransmission restriction configuration in the shared resource pool. The embodiment may be expressed as shown below in RRC.

Embodiment of "SL-PSSCH-TxConfig" for the sidelink HARQ retransmission operation
    allowedRetxNumberPSSCH-r15={0}
    allowedRetxNumberPSSCH-r14    allowedRetxNumberPSSCH-r15 OPTIONAL

[147]—In some embodiments, if the mode 4 terminal still has data to be transmitted, and if the "allowedRetxNumberPSSCH" value received from the base station is changed to 0, the mode 4 terminal maintains the grant currently being used for sidelink transmission until performing selection of resources after sensing the shared resource pool, senses the shared resource pool to be performed, and then transmits a V2X packet only once using a resource selected by applying the changed number of retransmissions when selecting the resources.

[148]—In other embodiments, if the mode 4 terminal still has data to be transmitted, and if the "allowedRetxNumberPSSCH" value received from the base station is changed to 0, the mode 4 terminal may perform reconfiguration, instead of maintaining the grant being used for sidelink transmission. In this case, the mode 4 terminal may transmit a V2X packet only once using a resource selected by applying the changed number of retransmissions when selecting the resources after sensing the shared resource pool to be performed.

In some embodiments, if the mode 4 terminal still has data to be transmitted, and if the "allowedRetxNumberPSSCH" value received from the base station is changed to 0, the mode 4 terminal releases the existing resources preempted for the retransmission and the grant, instead of maintaining the grant currently being used in sidelink transmission after sensing the next shared resource pool until performing selection of a resource, and transmits a V2X packet only once using the preempted resource by applying the changed number of retransmissions to the next transmission.

In other embodiments, if the mode 4 terminal belongs to a shared resource pool, the base station may directly set the "allowedRetxNumberPSSCH" value to "both" through an "RRCConnectionReconfiguration" message, an SIB 21 message, or another RRC message, and may change the number of retransmissions of HARQ in the shared resource pool using a MAC CE message or an SCI format 1 message, based on the reliability for sidelink transmission of the mode 4 terminal, a preference thereof, a transmission delay, and CBRs measured by the mode 4 terminal. The embodiment may be expressed as follows in RRC.

Embodiment of "SL-PSSCH-TxConfig" for the sidelink HARQ retransmission operation
allowedRetxNumberPSSCH-r15={both}
allowedRetxNumberPSSCH-r14    allowedRetxNumberPSSCH-r15 OPTIONAL In some embodiments, if the mode 4 terminal still has data to be transmitted, and if the "allowedRetxNumberPSSCH" value received from the base station is changed to "both", the mode 4 terminal maintains the grant currently being used for sidelink transmission after sensing the next shared resource pool until performing selection of resources, senses the shared resource pool to be performed subsequently, and then transmits a V2X packet using a resource selected by changing and applying the number of retransmissions of HARQ to the selection of the resource through a MAC CE message or an SCI format 1 message, based on CBRs measured by the mode 4 terminal (including the configured retransmission).

In other examples, if the mode 4 terminal still has data to be transmitted, and if the "allowedRetxNumberPSSCH" value received from the base station is changed to "both", the mode 4 terminal may perform reconfiguration, instead of maintaining the grant being used for sidelink transmission. In this case, the mode 4 terminal transmits a V2X packet using a resource selected by changing and applying the number of retransmissions of HARQ to the selection of the resource after sensing the shared resource pool to be performed through a MAC CE message or an SCI format 1 message, based on CBRs measured by the mode 4 terminal (including the configured retransmission).

In other embodiments, if the mode 4 terminal belongs to a shared resource pool, the base station may directly add configuration of the number of retransmissions of HARQ in the shared resource pool on the condition of reflecting the CBR using the "RRCConnectionReconfiguration" message, an SIB 21 message, or another RRC message when configuring the "allowedRetxNumberPSSCH" value. At this time, the number of retransmissions of HARQ used in the shared resource pool (SharedallowedRetxNumberPSSCH) may be further configured by the base station. This embodiment may be expressed as follows in the RRC.

Embodiment of "SL-PSSCH-TxConfig" for sidelink HARQ retransmission operation
SharedallowedRetxNumberPSSCH
allowedRetxNumberPSSCH-r14    SharedallowedRetxNumberPSSCH OPTIONAL—Cond CBR In some embodiments, if the mode 4 terminal still has data to be transmitted, and if the terminal receives "allowedRetxNumberPSSCH" or "SharedallowedRetxNumberPSSCH" from the base station, based on the CBRs reported to the base station, the mode 4 terminal maintains the grant currently being used for sidelink transmission after sensing the next shared resource pool until performing selection of resources, senses the shared resource pool to be performed subsequently, and then transmits a V2X packet using a resource selected by applying the changed number of retransmissions of HARQ when selecting the resources (including the configured retransmission).

In other embodiments, if the mode 4 terminal still has data to be transmitted, and if the terminal receives "allowedRetxNumberPSSCH" or "SharedallowedRetxNumberPSSCH" from the base station, based on the CBRs reported to the base station, the mode 4 terminal may perform reconfiguration, instead of maintaining the grant being used for sidelink transmission. In this case, the mode 4 terminal transmits a V2X packet using a resource selected by applying the changed number of retransmissions of HARQ when selecting the resources after sensing the shared resource pool to be performed (including the configured retransmission).

Figure 12:
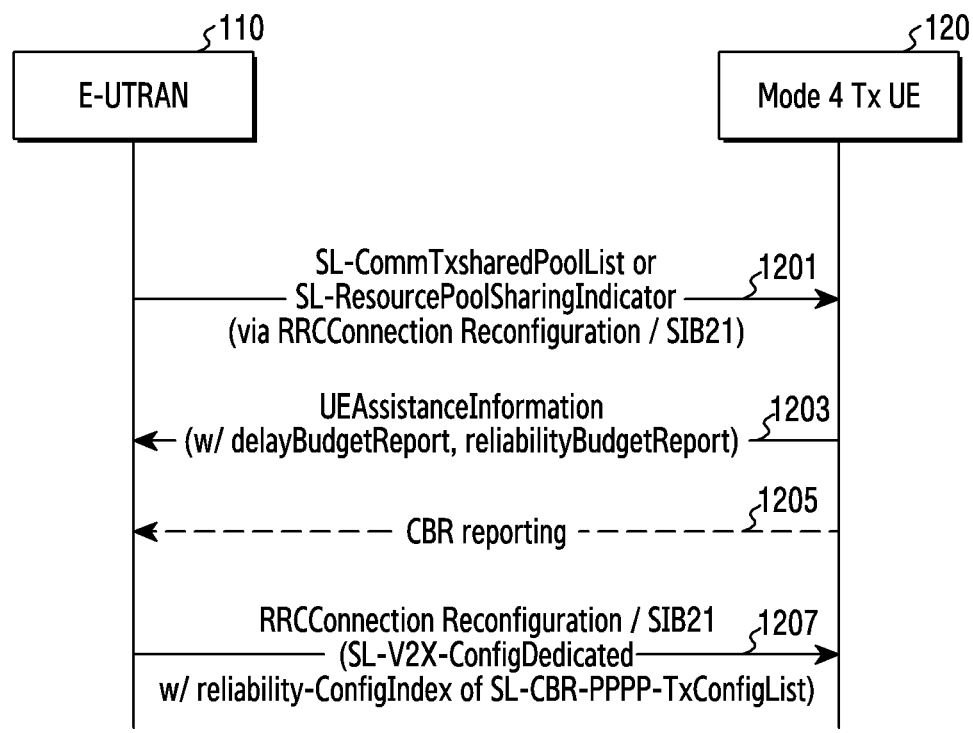
FIG. 12 illustrates signal exchange for configuring a transmission parameter for sidelink transmission in a shared resource pool by a mode 4 terminal in the case where the shared resource pool is provided according to various embodiments of the disclosure.

FIG. 12 illustrates signal exchange for configuring a transmission parameter for sidelink transmission in a shared resource pool by a mode 4 terminal in the case where the shared resource pool is provided according to various embodiments of the disclosure. FIG. 12 illustrates signal exchange between a base station 110 and a terminal 120.

Referring to FIG. 12, in step 1201, the base station may manage a shared resource pool 1) using a resource sharing pool list and a resource non-sharing pool list or 2) using an indication message indicating whether or not each resource pool is shared. The base station may provide transmission resource pool information to the mode 4 terminal using the "RRCConnectionReconfiguration" message, SIB 21, or another RRC message.

In step 1203, the mode 4 terminal may inform the base station of a transmission delay budget report (delayBudgetReport), a reliability budget report (reliabilityBudgetReport), or the like through the "UEAssistanceInformation" message.

In step 1205, the mode 4 terminal reports measured CBR values to the base station. In step 1207, the base station may configure a transmission parameter to be used in sidelink transmission in the shared resource pool by reflecting the information, and may inform the mode 4 terminal of the same through the "RRCConnectionReconfiguration" message, an SIB 21 message, or another RRC message.

In some embodiments, the base station may configure transmission parameters reflecting the CBR, the packet delay budget, and the reliability budget using a "UEAssistanceInformation" message of the terminal.

Embodiment of "SL-CBR-PPPP-TxConfigList" for configuring transmission parameters Additional definition with "SL-CBR-PPPP-Reliability-TxConfigList-r15" so as to conform to Release 15 or releases subsequent thereto Definition of "reliability-ConfigIndex" added to an information element in existing "SL-CBR-PPPP-TxConfigList" (for example, see RRC standards of Release 14 as shown in Table 3 ("SL-CBR-PPPP-TxConfigList" information elements) below)

TABLE 3

```
-- ASN1START
SL-CBR-PPPP-TxConfigList-r14 ::= SEQUENCE (SIZE (1..8)) OF SL-
PPPP-
TxConfigIndex-r14
SL-PPPP-TxConfigIndex-r14 ::= SEQUENCE {
  priorityThreshold-r14 SL-Priority-r13,
  defaultTxConfigIndex-r14 INTEGER (0..maxCBR-Level-1-r14),
  cbr-ConfigIndex-r14 INTEGER (0..maxSL-V2X-CBRConfig-1-r14),
  tx-ConfigIndexList-r14 SEQUENCE (SIZE (1..maxCBR-Level-r14)) OF
Tx-ConfigIndex-r14
}
Tx-ConfigIndex-r14 ::= INTEGER (0..maxSL-V2X-TxConfig-1-r14)
--ASN1STOP
```

In some embodiments, if the mode 4 terminal still has data to be transmitted, and if reconfiguration of transmission parameters is required due to a change in the "SL-V2X-ConfigDedicated" configuration received from the base station, the mode 4 terminal may maintain the grant currently being used for sidelink transmission until performing selection of resources after sensing a next shared resource pool, and may then transmit a V2X packet using a resource selected by applying the changed "SL-V2X-ConfigDedicated" configuration and the reconfigured transmission parameter values to the selection of the resource after sensing the shared resource pool to be performed subsequently. In other embodiments, if the mode 4 terminal still has data to be transmitted, and if reconfiguration of transmission parameters is required due to a change in "SL-V2X-ConfigDedicated" configuration received from the base station, the mode 4 terminal may perform reconfiguration, instead of maintaining the grant being used for sidelink transmission. In this case, the mode 4 terminal may transmit a V2X packet using a resource selected by applying the changed "SL-V2X-ConfigDedicated" configuration and the reconfigured transmission parameter values to the selection of the resource after sensing the shared resource pool to be performed.

In some embodiments, the base station may receive a report on the measured CBR values from the mode 4 terminal, and may ensure transmission reliability to respective terminals by allowing one or more retransmissions of HARQ to avoid resource selection collision that may occur when the CBR is high. In other embodiments, in the case where the base station increases the CBR of the shared resource pool due to preemption of resources for retransmission of HARQ by mode 4 terminals when operating the shared resource pool, the base station may configure the transmission parameters in order to preferentially guarantee transmission priority. In still other embodiments, when operating the shared resource pool, the base station may observe a tradeoff between an increase in the reliability due to retransmission of HARQ by the mode 4 terminals and an increase in the degree of congestion of the shared resource pool, and may adjust the transmission parameters.

Figure 13:
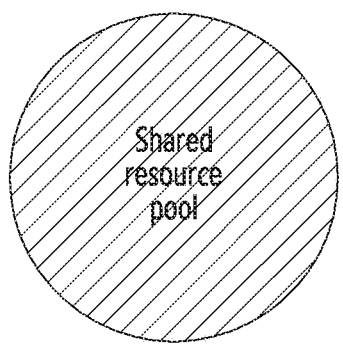
FIG. 13 illustrates an example of an operation of using all resources in a shared resource pool both in mode 3 and in mode 4 according to various embodiments of the disclosure.

FIG. 13 illustrates an example of an operation of using all resources in a shared resource pool both in mode 3 and in mode 4 according to various embodiments of the disclosure.

Referring to FIG. 13, the case in which all resources in the shared resource pool are shared between a mode 4 terminal 120 and a mode 3 terminal 130 may be illustrated as scenario 1.

In some embodiments, both the mode 4 terminal 120 and the mode 3 terminal 130 may use the whole of a single resource pool. An example of scenario 1 in which both the mode 4 terminal and the mode 3 terminal use the whole of a single resource pool may correspond to at least one of the following cases.

Sharing resource pool between Rel-15 mode 3 and Rel-15 mode 4;

Sharing resource pool between Rel-15 mode 3 and Rel-14 mode 4;

Sharing resource pool between Rel-14 mode 3 and Rel-15 mode 4;

Here, in order to obtain sharable resources, a Rel-15 terminal may sense resources to be shared with a Rel-14 terminal.

In an embodiment, a Rel-15 mode 3 terminal 130-1 or a Rel-15 mode 4 terminal 120-1 that is in the coverage of the base station 110 may identify the scenario in which the Rel-15 mode 3 terminal or the Rel-15 mode 4 terminal operates, among the examples of scenario 1, through a signal transmitted by the base station 110. The signal transmitted by the base station 110 may include at least one of a broadcast message for system information, such as SIB (system information block) 21, or a dedicated RRC (radio resource control) message (e.g., RRC reconfiguration).

Resource pool sharing information may be transmitted through "SL-V2X-ConfigDedicated-r14" or "SL-V2X-ConfigDedicated-r15" of the RRC reconfiguration.

"L-V2X-ConfigDedicated" may include "SL-CommResourcePoolV2X-r14" or "SL-CommResourcePoolV2X-r15".

The system information may transmit resource pool sharing information in "SL-CommResourcePoolV2X-r14" or "SL-CommResourcePoolV2X-r15".

In an embodiment, shared resource information provided to a terminal outside the coverage of the base station 110 (e.g., a terminal located in an area where the signaling of the base station 11 is not received or a terminal that fails to receive V2X information from the base station 110) may be preconfigured, and may then be provided. In some embodiments, the configuration of "SL-V2X-PreconfigFreqInfo ASN.1" may be defined as shown in Table 4 below.

TABLE 4

```
SL-V2X-PreconfigFreqInfo ::= SEQUENCE {
  ...
  v2x-CommTxPoolList SL-PreconfigV2X-TxPoolList,
  v2x-CommTxSharedPoolList SL-PreconfigV2X-TxPoolList,
  ...
}
SL-PreconfigV2X-TxPoolList ::= SEQUENCE (size (1..maxSL-V2X-
TxPoolPreconf)) OF SL-V2X-PreconfigCommPool
```

Here, "v2x-CommTxPoolList" may denote a list of resource pools to which sharing of a resource pool is not applied. The terminal may perform a sensing operation to obtain resources from the corresponding pool.

"v2x-CommTxSharedPoolList" may denote a list of resource pools to which sharing of a resource pool is applied. The terminal may perform a sensing operation to obtain resources from the corresponding pool.

Methods of utilizing RRC ASN.1 according to various embodiments of the disclosure may be as follows.

The shared resource (shared pool) information indicated to the terminal may be expressed as a Boolean value indicating whether or not the resource can be shared or a resource pool ID (identification) indicating shared resource pool index information.

Method of utilizing RRC ASN.1 for resource-sharing scenarios between mode 3 and mode 4 may be as follows.

Sharing between Rel-15 mode 3 and Rel-15 mode 4 may be indicated by a method of defining a new structure of Rel-15 or a method of including resource pool sharing information for Rel-15 in the existing Rel-14 structure (SL-CommResourcePoolV2X-r15).

Sharing between Rel-14 mode 3 and Rel-15 mode 4 may be indicated by a method of including resource pool sharing information for Rel-15 (mode 4) in "SL-CommResourcePoolV2X-r14" of Rel-14.

Sharing between Rel-15 mode 3 and Rel-14 mode 4 may be indicated by a method of including resource pool sharing information for Rel-15 (mode 3) in "SL-CommResourcePoolV2X-r14" of Rel-14.

Figure 14:
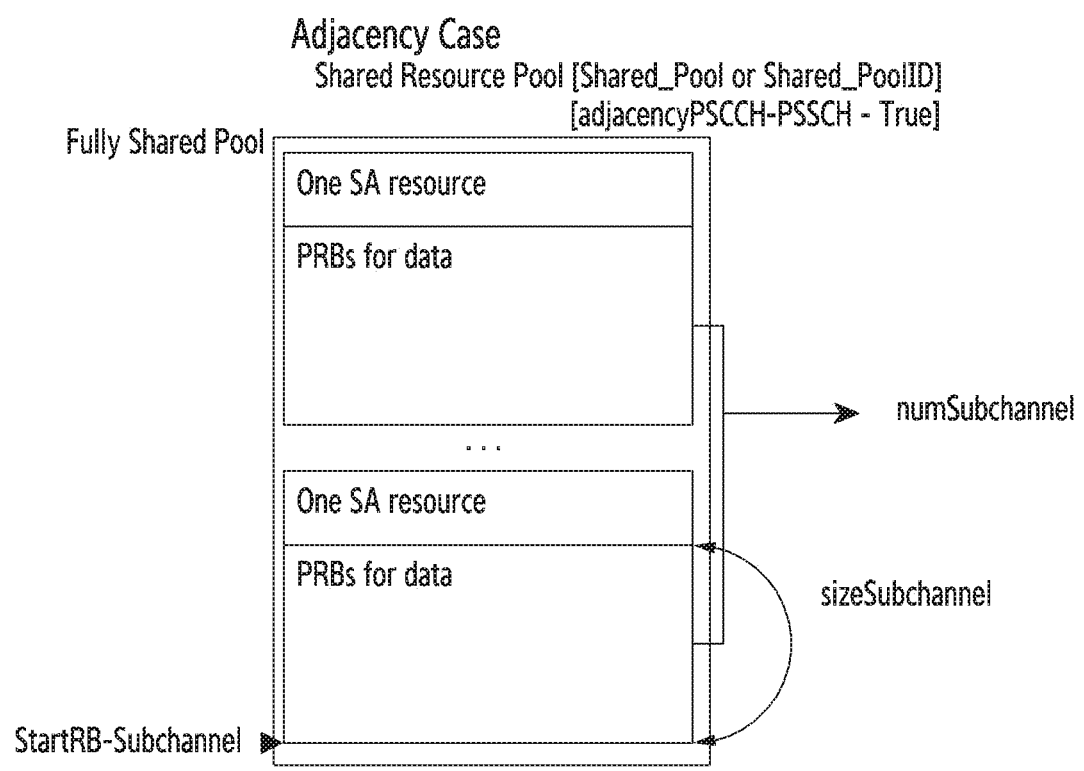
FIG. 14 illustrates an example in which a PSCCH (physical sidelink control channel) resource and a PSSCH (physical sidelink shared channel) resource are adjacent to each other according to various embodiments of the disclosure.

FIG. 14 illustrates an example in which a PSCCH (physical sidelink control channel) resource and a PSSCH (physical sidelink shared channel) resource are adjacent to each other according to various embodiments of the disclosure.

Referring to FIG. 14, FIG. 14 describes a specific embodiment of the case where a PSCCH resource and a PSSCH resource are adjacent in scenario 1 in FIG. 13. In this case, the resource pool structure may be as follows.

1) Resource pool structure shared between Rel-15 mode 3 and Rel-15 mode 4
2) Resource pool structure shared between Rel-15 mode 3 and Rel-14 mode 4
3) Resource pool structure shared between Rel-14 mode 3 and Rel-15 mode 4

In some embodiments, if all resources are shared, the terminal may identify whether or not the resources are shared.

In a first embodiment, the terminal may identify the shared status of resources (usage status of shared resources) through "Shared Pool-r15" (see Table 5 below). If "Shared Pool-r15" is "True", the terminal may identify that the shared resource pool is available. On the other hand, if "Shared Pool-r15" is "False", the terminal may identify that the shared resource pool is not available. In some embodiments, in the case of sharing resources between the Rel-14 terminal and the Rel-15 terminal, the configuration of RRC ASN.1 may be defined as shown in Table 5 below.

Here, "Shared Pool-r15" may indicate whether or not a resource is shared.

"adjacencyPSCCH-PSSCH-r14" may indicate whether or not a PSCCH resource and a PSSCH resource are adjacent to each other.

"StartRB-Subchannel-r14" may indicate the lowest RB (resource block) index of a subchannel.

"sizeSubchannel-r14" may indicate the number of PRBs (physical resource blocks) of each subchannel.

"numSubchannel-r14" may indicate the number of subchannels.

"SensingOperation-r15" may indicate the case in which the mode 3 terminal uses a resource shared with the mode 4 terminal, instead of using a dedicated resource. When the mode 3 terminal uses the shared resource, the mode 3 terminal may acquire the resource, based on sensing. If the parameter value is "False", the mode 3 terminal may use a dedicated resource. If the parameter value is "True", the mode 3 terminal may use a resource obtained as a result of sensing the shared resources.

In a second embodiment, the terminal may perform identification using "Shared_PoolID" (see Table 6 below).

The base station may provide a list of resource pools that can be shared.

The terminal may determine that sharing of resources is possible only for the resource pool included in "Shared_ PoolID-r15". If the base station provides "Shared_PoolID", excluding Pool ID1, while applying sharing of resources to Pool ID1, the terminal may stop sharing resources for Pool ID1.

In some embodiments, the configuration of RRC ASN.1 may be defined as shown in Table 6 below in the case of sharing resources between the Rel-14 terminal and the Rel-15 terminal.

TABLE 5

```
SL-CommResourcePoolV2X-r14 ::= SEQUENCE {
Shared_Pool-r15              BOOLEAN {TRUE, FALSE}
SensingOperation-r15     BOOLEAN {TRUE, FALSE} OPTIONAL, -- Need OR
sl-OffsetIndicator-r14       SL-OffsetIndicator-r12 OPTIONAL, -- Need OR
sl-Subframe-r14                  SubframeBitmapSL-r14,
adjacencyPSCCH-PSSCH-r14         BOOLEAN,
sizeSubchannel-r14           ENUMERATED {n4,..., spare1},
numSubchannel-r14             ENUMERATED {n1,..., spare1},
startRB-Subchannel-r14           INTEGER (0..99),
......
}
```

TABLE 6

```
SL-V2X-ConfigShared-r14 ::= SEQUENCE {
v2x-SharedTxPool-r15         SL-V2X-TxPoolIDList OPTIONAL, -- Need OR
v2x-CommTxPoolNormalShared-r14          SL-CommTxPoolListV2X-r14
OPTIONAL,-- Need OR
}
SL-V2X-TxPoolIDList-r15 ::=         SEQUENCE (SIZE (1..maxSL-V2X-
SharedTxPool-r15)) OF SL-V2X-TxPoolIdentity-r15
SL-CommTxPoolListV2X-r14 ::=        SEQUENCE (SIZE (1..maxSL-V2X-
TxPool-r14)) OF SL-CommResourcePoolV2X-r14
SL-CommResourcePoolV2X-r14 ::=      SEQUENCE {
Shared_PoolID-r15           SL-V2X-TxPoolIdentity-r15
SensingOperation-r15        BOOLEAN {TRUE, FALSE} OPTIONAL, -- Need
OR
sl-OffsetIndicator-r14      SL-OffsetIndicator-r12 OPTIONAL, -- Need OR
sl-Subframe-r14             SubframeBitmapSL-r14,
adjacencyPSCCH-PSSCH-r14              BOOLEAN,
sizeSubchannel-r14          ENUMERATED {n4,...., spare1},
numSubchannel-r14           ENUMERATED {n1, n3, n5, n8, n10, n15, n20,
spare1},
startRB-Subchannel-r15      INTEGER (0..99),
startRB-PSCCH-Pool-r15      INTEGER (0..99) OPTIONAL, -- Need OR
......
}
```

Here, "v2x-SharedTxPool-r15" may indicate a list of pool IDs that share resources.

"Shared_PoolID-r15" may indicate a list of resource pools in which resources can be shared.

"adjacencyPSCCH-PSSCH-r14" may indicate whether or not a PSCCH resource and a PSSCH resource are adjacent to each other.

"startRB-Subchannel-r14" may indicate the lowest RB index of a subchannel.

"sizeSubchannel-r14" may indicate the number of PRBs in each subchannel.

"numSubchannel-r14" may indicate the number of subchannels.

"SensingOperation-r15" may indicate the case in which the mode 3 terminal uses a resource shared with the mode 4 terminal, instead of using a dedicated resource. When using the shared resource, the mode 3 terminal may acquire the resource, based on sensing. If the parameter value is "False", the mode 3 terminal may use a dedicated resource. If the parameter value is "True", the mode 3 terminal may use a resource obtained as a result of sensing the shared resources.

adjacencyPSCCH-PSSCH-r15: This indicates whether or not a PSCCH resource and a PSSCH resource are adjacent to each other.

StartRB-Subchannel-r15: This indicates the lowest RB index of a subchannel.

sizeSubchannel-r15: This indicates the number of PRBs in each subchannel numSubchannel-r15: This indicates the number of sub-channels.

In some embodiments, in the case of sharing all resources, the terminal may identify whether or not the resources are shared.

In the first embodiment, the terminal may determine the shared status of resources (usage status of shared resources) through "Shared_Pool-r15". If "Shared_Pool-r15" is "True", the terminal may identify that the shared resource pool is available. On the other hand, if "Shared_Pool-r15" is "False", the terminal may identify that the shared resource pool is not available.

In some embodiments, in the case of sharing resources between Rel-15 terminals, the configuration of RRC ASN.1 may be defined as shown in Table 7 below.

TABLE 7

```
SL-CommResourcePoolV2X-r15 ::= SEQUENCE {
Shared_Pool-r15             BOOLEAN {TRUE, FALSE}
R15-SensingOperation        BOOLEAN {TRUE, FALSE} the OPTIONAL,
-- Need the OR
sl-OffsetIndicator-r15      SL-OffsetIndicator-r12 OPTIONAL, -- Need OR
sl-Subframe-r15             SubframeBitmapSL-r14,
adjacencyPSCCH-PSSCH-r15              BOOLEAN,
sizeSubchannel-r15          ENUMERATED {n4,...., spare1},
numSubchannel-r15           ENUMERATED {n1,..., spare1},
startRB-Subchannel-r15      INTEGER (0..99),
startRB-PSCCH-Pool-r15      INTEGER (0..99) OPTIONAL, -- Need OR
......
}
```

In the case of sharing resources between Rel-15 terminals, an embodiment for the configuration of RRC ASN.1 may be as described for the first embodiment and the second embodiment. Instead of reusing the Rel-14 parameter, a new Rel-15 parameter, which plays the same role as the Rel-14 parameter, may be defined. For example, the following parameters may be newly defined as Rel-15 parameters.

Here, "Shared_Pool-r15" may indicate whether or not a resource is shared.

"adjacencyPSCCH-PSSCH-r15" may indicate whether or not a PSCCH resource and a PSSCH resource are adjacent to each other.

"StartRB-Subchannel-r15" may indicate the lowest RB index of a subchannel.

"sizeSubchannel-r15" may indicate the number of PRBs in each subchannel.

"numSubchannel-r15" may indicate the number of subchannels.

"SensingOperation-r15" may indicate the case in which the mode 3 terminal uses a resource shared with the mode 4 terminal, instead of using a dedicated resource. When using the shared resource, the mode 3 terminal may acquire the resource, based on sensing. If the parameter value is "False", the mode 3 terminal may use a dedicated resource. If the parameter value is "True", the mode 3 terminal may use a resource obtained as a result of sensing the shared resources.

Using "Shared_PoolID" in the second embodiment (see Table 8 below)

The base station may provide a pool list in which sharing of a resource pool is possible.

The terminal may determine that sharing of resources is possible only for the pools included in the "Shared_PoolID". If the base station provides "Shared_PoolID", excluding Pool ID1, while applying sharing of resources to Pool ID1, the terminal may stop sharing resources for Pool ID1.

In some embodiments, the configuration of RRC ASN.1 may be defined as shown in Table 8 below in the case of sharing resources between the Rel-15 terminals.

terminal uses a resource shared with the mode 4 terminal, instead of using a dedicated resource. If the parameter value of SensingOperation-r15 is "False", the mode 3 terminal may use a dedicated resource. If the parameter value of SensingOperation-r15 is "True", the mode 3 terminal may use a resource obtained as a result of sensing the shared resources.

Figure 15:
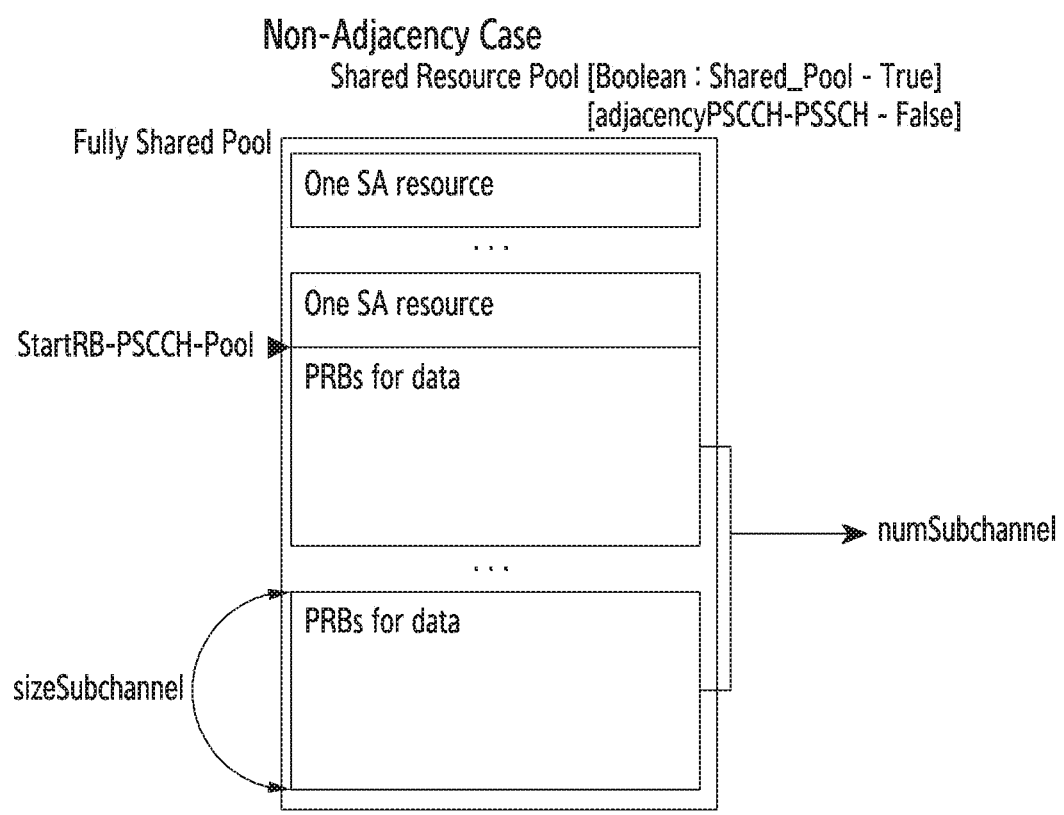
FIG. 15 illustrates an example in which a PSCCH resource and a PSSCH resource are not adjacent to each other according to various embodiments of the disclosure.

FIG. 15 illustrates an example in which a PSCCH resource and a PSSCH resource are not adjacent to each other according to various embodiments of the disclosure.

Referring to FIG. 15, FIG. 15 illustrates a specific embodiment of the case where a PSCCH resource and a PSSCH resource are not adjacent in scenario 1 in FIG. 13. In this case, the resource pool structure may be as follows.

1) Resource pool structure shared between Rel-15 mode 3 and Rel-15 mode 4

2) Resource pool structure shared between Rel-15 mode 3 and Rel-14 mode 4

3) Resource pool structure shared between Rel-14 mode 3 and Rel-15 mode 4

In some embodiments, if all resources are shared, the terminal may identify whether or not the resources are shared.

TABLE 8

```
SL-V2X-ConfigShared-r15 ::= SEQUENCE {
v2x-SharedTxPool-r15          SL-V2X-TxPoolIDList-r15 OPTIONAL, -- Need
OR
v2x-CommTxPoolNormalShared-r15          SL-CommTxPoolListV2X-r15
OPTIONAL, -- Need OR
}
SL-V2X-TxPoolIDList-r15 ::=          SEQUENCE (SIZE (1..maxSL-V2X-
SharedTxPool-r15)) OF SL-V2X-TxPoolIdentity-r15
SL-CommTxPoolListV2X-r15 ::=          SEQUENCE (SIZE (1..maxSL-V2X-
TxPool-r15)) OF SL-CommResourcePoolV2X-r15
SL-CommResourcePoolV2X-r15 ::=          SEQUENCE {
Shared_PoolID-r15               SL-V2X-TxPoolIdentity-r15
sl-OffsetIndicator-r15          SL-OffsetIndicator-r12 OPTIONAL, -- Need OR
sl-Subframe-r15                 SubframeBitmapSL-r14
adjacencyPSCCH-PSSCH-r15        BOOLEAN,
sizeSubchannel-r15              ENUMERATED {n4,..., spare1},
numSubchannel-r15               ENUMERATED {n1,..., spare1},
startRB-Subchannel-r15          INTEGER (0..99),
startRB-PSCCH-Pool-r15          INTEGER (0..99) OPTIONAL, -Need OR
......
}
```

Here, "v2x-SharedTxPool-r15" may indicate a list of pool IDs that share resources. "Shared_PoolID-r15" may indicate a list of resource pools in which resources can be shared. "startRB-Subchannel-r15" may indicate the lowest RB index of a subchannel. "sizeSubchannel-r15" may indicate the number of PRBs in each subchannel. "numSubchannel-r15" may indicate the number of subchannels. "SensingOperation-r15" may indicate the case in which the mode 3

In the first embodiment, the terminal may identify the shared status of resources (usage status of shared resources) through "Shared_Pool-r15".

In some embodiments, in the case of sharing resources between the Rel-14 terminal and the Rel-15 terminal, the configuration of RRC ASN.1 may be defined as shown in Table 9 below.

TABLE 9

```
SL-CommResourcePoolV2X-r14 ::=   SEQUENCE {
Shared_Pool-r15                  BOOLEAN {TRUE, FALSE}
SensingOperation-r15             BOOLEAN {TRUE, FALSE} OPTIONAL, -- Need
OR
sl-OffsetIndicator-r14           SL-OffsetIndicator-r12 OPTIONAL, -- Need OR
sl-Subframe-r14                  SubframeBitmapSL-r14,
adjacencyPSCCH-PSSCH-r14         BOOLEAN,
sizeSubchannel-r14               ENUMERATED {n4,..., spare1},
numSubchannel-r14                ENUMERATED {n1,..., spare1},
startRB-Subchannel-r14           INTEGER (0..99),
......
}
```

Here, "Shared_Pool-r15" may indicate whether or not a resource is shared. "adjacencyPSCCH-PSSCH-r14" may be set to "False" to indicate that a PSCCH resource and a PSSCH resource are not adjacent to each other. "startRB-PSCCH-Pool-r14" may indicate the lowest RB index of the PSCCH. "sizeSubchannel-r14" may indicate the number of PRBs in each subchannel. "numSubchannel-r14" may indicate the number of subchannels. "SensingOperation-r15" may indicate the case in which the mode 3 terminal uses a resource shared with the mode 4 terminal, instead of using a dedicated resource. When using the shared resource, the mode 3 terminal may acquire the resource, based on sensing.

In the second embodiment, the terminal may use "Shared_ PoolID" (see Table 10 below).

In some embodiments, in the case of sharing resources between the Rel-14 terminal and the Rel-15 terminal, the configuration of RRC ASN.1 may be defined as shown in Table 10 below.

TABLE 10

```
SL-V2X-ConfigShared-r14 ::=  SEQUENCE {
v2x-SharedTxPool-r15           SL-V2X-TxPoolIDList OPTIONAL, -- Need OR
v2x-CommTxPoolNormalShared-r14              SL-CommTxPoolListV2X-r14
OPTIONAL, -- Need OR
}
SL-V2X-TxPoolIDList-r15 ::=              SEQUENCE (SIZE (1..maxSL-V2X-
SharedTxPool-r15)) OF SL-V2X-TxPoolIdentity-r15
SL-CommTxPoolListV2X-r14 ::=              SEQUENCE (SIZE (1..maxSL-V2X-
TxPool-r14)) OF SL-CommResourcePoolV2X-r14
SL-CommResourcePoolV2X-r14 ::=  SEQUENCE {
Shared_PoolID-r15           SL-V2X-TxPoolIdentity-r15
SensingOperation-r15        BOOLEAN {TRUE, FALSE} OPTIONAL, -- Need
OR
sl-OffsetIndicator-r14      SL-OffsetIndicator-r12 OPTIONAL, -Need OR
sl-Subframe-r14             SubframeBitmapSL-r14,
adjacencyPSCCH-PSSCH-r14          BOOLEAN,
sizeSubchannel-r14             ENUMERATED {n4,..., spare1},
numSubchannel-r14              ENUMERATED {n1, n3, n5, n8, n10, n15, n20,
spare1},
startRB-Subchannel-r15          INTEGER (0..99),
startRB-PSCCH-Pool-r15          INTEGER (0..99) OPTIONAL, -- Need OR
......
}
```

Here, "v2x-SharedTxPool-r15" may indicate a list of pool IDs that share resources. "Shared_PoolID-r15" may indicate a list of resource pools in which resources can be shared. "adjacencyPSCCH-PSSCH-r14" may be set to "False" to indicate that a PSCCH resource and a PSSCH resource are not adjacent to each other. "startRB-PSCCH-Pool-r14" may indicate the lowest RB index of the PSCCH. "sizeSubchannel-r14" may indicate the number of PRBs in each subchannel. "numSubchannel-r14" may indicate the number of subchannels. "SensingOperation-r15" may indicate the case in which the mode 3 terminal uses a resource shared with the mode 4 terminal, instead of using a dedicated resource. If "SensingOperation-r15" is set to "True", the mode 3 terminal may acquire a resource based on sensing when using the shared resources.

In the case of sharing resources between Rel-15 terminals, an embodiment for the configuration of RRC ASN.1 may be as described for the first embodiment and the second embodiment. Instead of reusing the Rel-14 parameter, a new Rel-15 parameter, which plays the same role as the Rel-14 parameter, may be defined.

In some embodiments, if all resources are shared, the terminal may identify whether or not the resources are shared.

In some embodiments, in the case of sharing resources between the Rel-15 terminals, the configuration of RRC ASN.1 may be defined as shown in Table 11 below.

TABLE 11

```
SL-CommResourcePoolV2X-r15 ::=  SEQUENCE {
Shared_Pool-r15           BOOLEAN {TRUE, FALSE}
SensingOperation-r15      BOOLEAN {TRUE, FALSE} OPTIONAL, -- Need
OR
sl-OffsetIndicator-r15    SL-OffsetIndicator-r12 OPTIONAL, -- Need OR
sl-Subframe-r15           SubframeBitmapSL-r14,
```

TABLE 11-continued

```
adjacencyPSCCH-PSSCH-r15      BOOLEAN,
sizeSubchannel-r15            ENUMERATED {n4,..., spare1},
numSubchannel-r15             ENUMERATED {n1,..., spare1},
startRB-Subchannel-r15        INTEGER (0..99),
startRB-PSCCH-Pool-r15        INTEGER (0..99) OPTIONAL, -- Need OR
......
}
```

Here, "Shared_Pool-r15" may indicate whether or not a resource is shared. "adjacencyPSCCH-PSSCH-r15" may be set to "False" to indicate that a PSCCH resource and a PSSCH resource are not adjacent to each other. "startRB-PSCCH-Pool-r15" may indicate the lowest RB index of the PSCCH. "sizeSubchannel-r15" may indicate the number of PRBs in each subchannel. "numSubchannel-r15" may indicate the number of subchannels. "SensingOperation-r15" may indicate the case in which the mode 3 terminal uses a resource shared with the mode 4 terminal, instead of using a dedicated resource. If "SensingOperation-r15" is set to "True", the mode 3 terminal may acquire a resource based on sensing when using the shared resources.

Using "Shared_PoolID" in the second embodiment (see Table 12 below)

In some embodiments, in the case of sharing resources between the Rel-15 terminals, the configuration of RRC ASN.1 may be defined as shown in Table 12 below.

TABLE 12

```
SL-V2X-ConfigShared-r15 ::=   SEQUENCE {
v2x-SharedTxPool-r15          SL-V2X-TxPoolIDList-r15 OPTIONAL, -- Need
OR
v2x-CommTxPoolNormalShared-r15        SL-CommTxPoolListV2X-r15
OPTIONAL, -- Need OR
}
SL-V2X-TxPoolIDList-r15 ::=           SEQUENCE (SIZE (1..maxSL-V2X-
SharedTxPool-r15)) OF SL-V2X-TxPoolIdentity-r15
SL-CommTxPoolListV2X-r15 ::=          SEQUENCE (SIZE (1..maxSL-V2X-
TxPool-r15)) OF SL-CommResourcePoolV2X-r15
SL-CommResourcePoolV2X-r15 ::=        SEQUENCE {
Shared_PoolID-r15             SL-V2X-TxPoolIdentity-r15
sl-OffsetIndicator-r15        SL-OffsetIndicator-r12 OPTIONAL, -- Need OR
sl-Subframe-r15               SubframeBitmapSL-r14,
adjacencyPSCCH-PSSCH-r15      BOOLEAN,
sizeSubchannel-r15            ENUMERATED {n4,..., spare1},
numSubchannel-r15             ENUMERATED {n1,..., spare1},
startRB-Subchannel-r15        INTEGER (0..99),
startRB-PSCCH-Pool-r15        INTEGER (0..99) OPTIONAL, --Need OR
......
}
```

Here, "v2x-SharedTxPool-r15" may indicate a list of pool IDs that share resources. "Shared_PoolID-r15" may indicate a list of resource pools in which resources can be shared. "adjacencyPSCCH-PSSCH-r15" may be set to "False" to indicate that a PSCCH resource and a PSSCH resource are not adjacent to each other. "startRB-PSCCH-Pool-r15" may indicate the lowest RB index of the PSCCH. "sizeSubchannel-r15" may indicate the number of PRBs in each subchannel. "numSubchannel-r15" may indicate the number of subchannels. "SensingOperation-r15" may indicate the case in which the mode 3 terminal uses a resource shared with the mode 4 terminal, instead of using a dedicated resource. If "SensingOperation-r15" is set to "True", the mode 3 terminal may acquire a resource based on sensing when using the shared resources.

Figure 16:
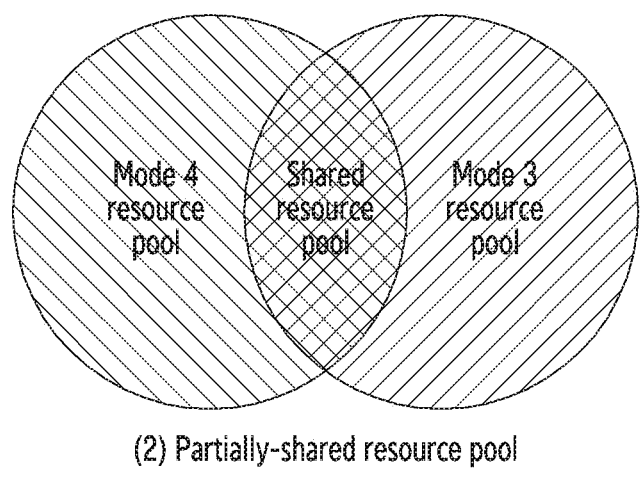
FIG. 16 illustrates an example of an operation in which only some resources are used both in mode 3 and in mode 4 in a shared resource pool according to various embodiments of the disclosure.

FIG. 16 illustrates an example of an operation in which only some resources are used both in mode 3 and in mode 4 in a shared resource pool according to various embodiments of the disclosure.

Referring to FIG. 16, the case in which some resources in the shared resource pool are shared between a mode 4 terminal 120 and a mode 3 terminal 130 may be illustrated as scenario 2.

In some embodiments, both the mode 4 terminal 120 and the mode 3 terminal 130 may use a portion of the resource pool. An example of scenario 1, in which the mode 4 terminal and the mode 3 terminal use some resources of a single resource pool, may correspond to at least one of the following cases.

Sharing resource pool between Rel-15 mode 3 and Rel-15 mode 4;

Sharing resource pool between Rel-15 mode 3 and Rel-14 mode 4;

Sharing resource pool between Rel-14 mode 3 and Rel-15 mode 4;

In this case, in order to obtain sharable resources, Rel-15 terminal may sense resources to be shared with Rel-14 terminal.

In an embodiment, a Rel-15 mode 3 terminal 130-1 or a Rel-15 mode 4 terminal 120-1 that is in the coverage of the base station 110 may identify the scenario in which the Rel-15 mode 3 terminal or the Rel-15 mode 4 terminal operates, among the examples of scenario 1, through a signal transmitted by the base station 110. The signal transmitted by the base station 110 may include at least one of a broadcast message for system information, such as SIB 21, or a dedicated RRC message.

The base station 110 may transmit "SL-V2X-ConfigDedicated-r14" or "SL-V2X-ConfigDedicated-r15" of the RRC reconfiguration.

"SL-V2X-ConfigDedicated" may include "SL-CommResourcePoolV2X-r14" or "SL-CommResourcePoolV2X-r15".

The system information may be transmitted through "SL-CommResourcePoolV2X-r14" or "SL-CommResourcePoolV2X-r15".

In an embodiment, shared resource information provided to a terminal outside the coverage of the base station 110 (e.g., a terminal located in an area where the signaling of the base station 11 is not received or a terminal that fails to receive V2X information from the base station 110) may be preconfigured, and may then be provided. In some embodiments, the configuration of "SL-V2X-PreconfigFreqInfo ASN.1" may be defined as shown in Table 13 below.

TABLE 13

```
SL-V2X-PreconfigFreqinfo ::= SEQUENCE {
...
v2x-CommTxPoolList              SL-PreconfigV2X-TxPoolList,
v2x-CommTxSharedPoolList        SL-PreconfigV2X-TxPoolList,
...
}
SL-PreconfigV2X-TxPoolList ::=      SEQUENCE (SIZE (1..maxSL-V2X-
TxPoolPreconf)) OF SL-V2X-PreconfigCommPool
```

Here, "v2x-CommTxPoolList" may denote a list of resource pools to which sharing of a resource pool is not applied. The terminal may perform a sensing operation to obtain resources from the corresponding pool.

"v2x-CommTxSharedPoolList" may denote a list of resource pools to which sharing of a resource pool is applied. The terminal may perform a sensing operation to obtain resources from the corresponding pool.

Methods of utilizing RRC ASN.1 according to various embodiments may be as follows.

The shared resource (shared pool) information indicated to the terminal may be expressed as a Boolean value indicating whether or not the resources can be shared or a resource pool ID (identification) indicating shared resource pool index information.

Methods of utilizing RRC ASN.1 for a resource-sharing scenario between mode 3 and mode 4 may be as follows.

In the case of sharing resources between Rel-15 mode 3 and Rel-15 mode 4, it is possible to define a new structure of Rel-15 (SL-CommResourcePoolV2X-r15) or to define resource pool sharing information for Rel-15 in the existing Rel-14 structure.

In the case of sharing resources between Rel-14 mode 3 and Rel-15 mode 4, it is possible to add a new parameter for sharing of a resource pool for Rel-15 (mode 4) to "SL-CommResourcePoolV2X-r14" of Rel-14.

In the case of sharing resources between Rel-15 mode 3 and Rel-14 mode 4, it is possible to add a new parameter for Rel-15 (mode 3) to "SL-CommResourcePoolV2X-r14" of Rel-14.

Figure 17:
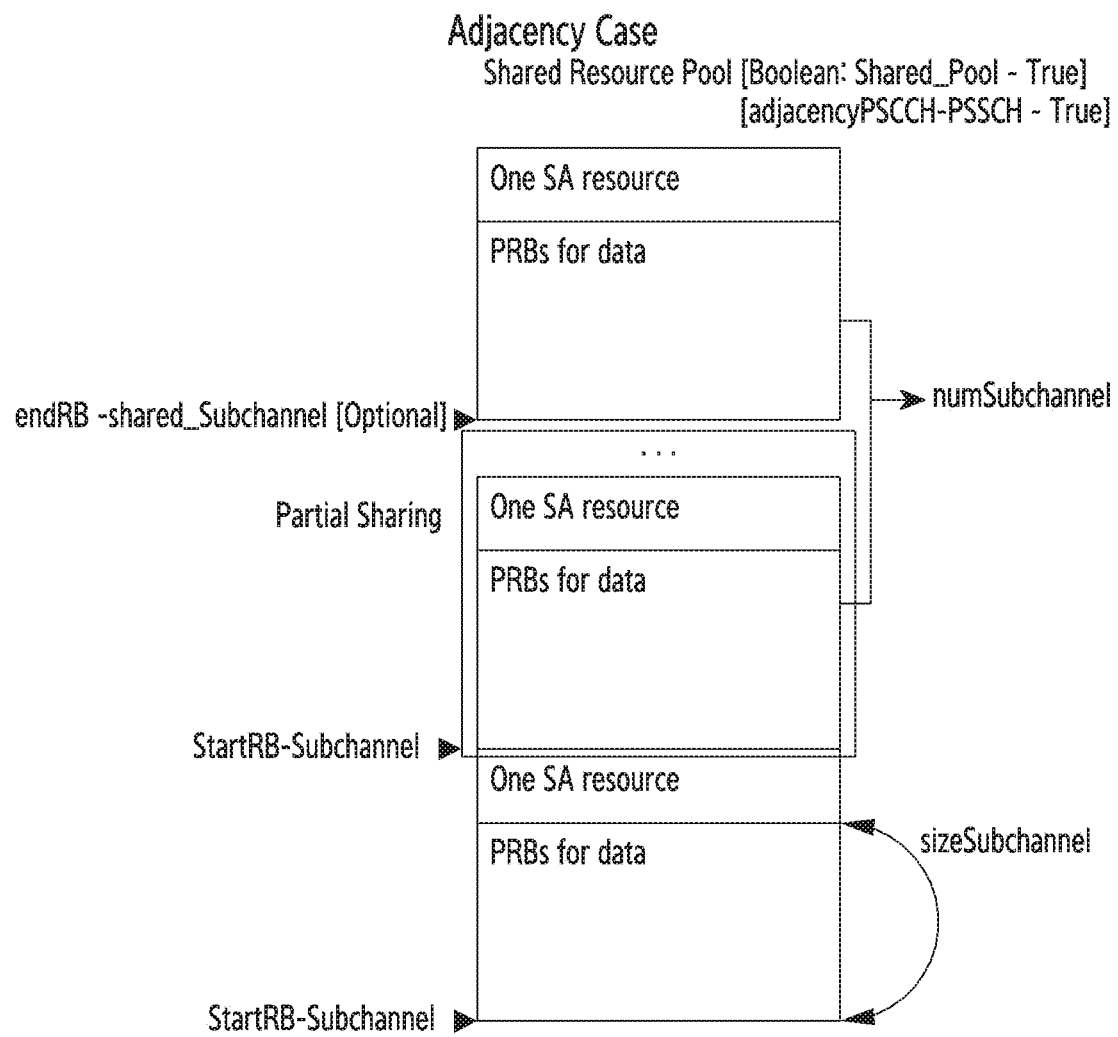
FIG. 17 illustrates an example in which a PSCCH resource and a PSSCH resource are adjacent to each other according to various embodiments of the disclosure.

FIG. 17 illustrates an example in which a PSCCH resource and a PSSCH resource are adjacent to each other according to various embodiments of the disclosure.

Referring to FIG. 17, FIG. 17 illustrates a specific embodiment of the case where a PSCCH resource and a PSSCH resource are adjacent in scenario 2 in FIG. 16.

In some embodiments, if some resources are shared, the terminal may identify whether or not a partially shared resource pool is available.

In the first embodiment, the terminal may identify whether or not a partially shared resource pool is available, based on whether or not information on sharing resources and "startRB-shared Subchannel" information are included through "Shared_Pool-r15". If "Shared_Pool-r15" is "True", the terminal may identify that the shared resource pool is available. On the other hand, if "Shared_Pool-r15" is "False", the terminal may identify that the shared resource pool is not available. If "Shared_Pool-r15" is "True", and if "StartRB-shared Subchannel" information is included, the terminal may identify that the partially shared resource pool is available.

In some embodiments, in the case of sharing resources between the Rel-14 terminal and the Rel-15 terminal, the configuration of RRC ASN.1 may be defined as shown in Table 14 below.

TABLE 14

```
SL-CommResourcePoolV2X-r14 ::=  SEQUENCE {
Shared_Pool-r15                 BOOLEAN {TRUE, FALSE}
SensingOperation-r15            BOOLEAN {TRUE, FALSE} OPTIONAL, --
Need OR
sl-OffsetIndicator-r14          SL-OffsetIndicator-r12 OPTIONAL, -- Need OR
sl-Subframe-r14                 SubframeBitmapSL-r14,
adjacencyPSCCH-PSSCH-r14            BOOLEAN,
sizeSubchannel-r14              ENUMERATED {n4,..., spare1},
numSubchannel-r14               ENUMERATED {n1,..., spare1},
startRB-Subchannel-r14          INTEGER (0..99),
stratRB_shared_Subchannel-r15         INTEGER (0..99) OPTIONAL, -- Need
OR
endRB_shared_Subchannel-r15           INTEGER (0..99) OPTIONAL, -- Need
OR
......
}
```

Here, "Shared_Pool-r15" may indicate whether or not a resource is shared.

"adjacencyPSCCH-PSSCH-r14" may indicate whether or not a PSCCH resource and a PSSCH resource are adjacent to each other.

"StartRB-Subchannel-r14" may indicate the lowest RB index of a subchannel.

"startRB-shared Subchannel-r15" may indicate the lowest RB index in the partially shared resource pool.

"endRB-shared Subchannel-r15" may indicate the last RB index in the partially shared resource pool. In the case where "endRB-shared Subchannel-r15" is not included, the terminal may determine the resources corresponding to the RB indicated by "startRB-shared Subchannel-r15" to the last RB (for example, the last RB may be derived through "sizeSubchannel-r14" x "numSubchannel-r14") to be partially sharable resources.

"sizeSubchannel-r14" may indicate the number of PRBs in each subchannel.

"numSubchannel-r14" may indicate the number of subchannels.

"SensingOperation-r15" may indicate the case in which the mode 3 terminal uses a resource shared with the mode 4 terminal, instead of using a dedicated resource. If the parameter value is "False", the mode 3 terminal may use a dedicated resource. If the parameter value is "True", the mode 3 terminal may use a resource obtained as a result of sensing the shared resources.

In the second embodiment, the terminal may determine sharing information of resources using "Shared_PoolID", and may determine the degree of sharing according to whether or not "startRB-shared Subchannel" information is included.

The base station may provide a list of resource pools that can be partially shared.

The terminal may determine that sharing of resources is possible only for the resource pool included in "Shared_PoolID-r15". In the case where "startRB-shared Subchannel" information is included, the terminal may determine the corresponding resource pool to be partially shared resources. If the base station provides "Shared_PoolID", excluding Pool ID1, while applying sharing of resources to Pool ID1, the terminal may stop sharing resources for Pool ID1.

In some embodiments, the configuration of RRC ASN.1 may be defined as shown in Table 15 below in the case of sharing resources between the Rel-14 terminal and the Rel-15 terminal.

Here, "v2x-SharedTxPool-r15" may indicate a list of pool IDs that share resources.

"Shared_PoolID-r15" may indicate a list of resource pools in which resources can be shared.

"adjacencyPSCCH-PSSCH-r14" may indicate whether or not a PSCCH resource and a PSSCH resource are adjacent to each other.

"startRB-Subchannel-r14" may indicate the lowest RB index of a subchannel.

"startRB-shared Subchannel-r15" may indicate the lowest RB index in the partially shared resource pool.

"endRB-shared Subchannel-r15" may indicate the last RB index in the partially shared resource pool. In the case where endRB-shared Subchannel-r15 is not included, the terminal may determine the resources corresponding to the RB indicated by "startRB-shared Subchannel-r15" to the last RB (for example, the last RB may be derived through "sizeSubchannel-r14" x "numSubchannel-r14") to be partially sharable resources.

"sizeSubchannel-r14" may indicate the number of PRBs in each subchannel.

"numSubchannel-r14" may indicate the number of subchannels.

"SensingOperation-r15" may indicate the case in which the mode 3 terminal uses a resource shared with the mode 4 terminal, instead of using a dedicated resource. If the parameter value is "False", the mode 3 terminal may use a dedicated resource. If the parameter value is "True", the mode 3 terminal may use a resource obtained as a result of sensing the shared resource.

If some resources are shared between Rel-15 terminals, the terminal may identify whether or not the resources are partially shared.

In the first embodiment, the terminal may determine the shared status of resources (usage status of shared resources) through "Shared_Pool-r15", and may determine whether or not the resources are partially shared according to whether or not "startRB-shared Subchannel" information is included.

If "Shared_Pool-r15" is "True", the terminal may identify that the partially shared resource pool is available. On the other hand, if "Shared_Pool-r15" is "False", the terminal may identify that the partially shared resource pool is not available.

TABLE 15

```
SL-V2X-ConfigShared-r14 ::=   SEQUENCE {
v2x-SharedTxPool-r15          SL-V2X-TxPoolIDList OPTIONAL, -- Need OR
v2x-CommTxPoolNormalShared-r14           SL-CommTxPoolListV2X-r14
OPTIONAL, -- Need OR
}
SL-V2X-TxPoolIDList-r15 ::=              SEQUENCE (SIZE (1..maxSL-V2X-
SharedTxPool-r15)) OF SL-V2X-TxPoolIdentity-r15
SL-CommTxPoolListV2X-r14 ::=             SEQUENCE (SIZE (1..maxSL-V2X-
TxPool-r14)) OF SL-CommResourcePoolV2X-r14
SL-CommResourcePoolV2X-r14 ::=           SEQUENCE {
Shared_PoolID-r15             SL-V2X-TxPoolIdentity-r15
SensingOperation-r15          BOOLEAN {TRUE, FALSE} OPTIONAL, -- Need
OR
sl-OffsetIndicator-r14        SL-OffsetIndicator-r12 OPTIONAL, -- Need OR
sl-Subframe-r14               SubframeBitmapSL-r14,
adjacencyPSCCH-PSSCH-r14               BOOLEAN,
sizeSubchannel-r14            ENUMERATED {n4,..., spare1},
numSubchannel-r14             ENUMERATED {n1,..., spare1},
startRB-Subchannel-r14        INTEGER (0..99),
startRB_shared_Subchannel-r15    INTEGER (0..99) OPTIONAL, -- Need OR
endRB_shared_Subchannel-r15      INTEGER (0..99) OPTIONAL, -Need OR
......
}
```

If "Shared_Pool-r15" is "True", and if StartRB-shared Subchannel information is included, the terminal may identify that the partially shared resource pool is available.

In some embodiments, in the case of sharing resources between the Rel-15 terminals, the configuration of RRC ASN.1 may be defined as shown in Table 16 below.

TABLE 16

```
SL-CommResourcePoolV2X-r15 ::=  SEQUENCE {
Shared_Pool-r15                 BOOLEAN {TRUE, FALSE}
SensingOperation-r15            BOOLEAN {TRUE, FALSE} OPTIONAL, -- Need OR
sl-OffsetIndicator-r15          SL-OffsetIndicator-r12 OPTIONAL, -- Need OR
sl-Subframe-r15                 SubframeBitmapSL-r14,
adjacencyPSCCH-PSSCH-r15        BOOLEAN,
sizeSubchannel-r15              ENUMERATED {n4,...., spare1},
numSubchannel-r15               ENUMERATED {n1,...., spare1},
startRB-Subchannel-r15          INTEGER (0..99),
startRB-PSCCH-Pool-r15          INTEGER (0..99) OPTIONAL, -- Need OR
stratRB_Shared_Subchannel-r15   INTEGER (0..99) OPTIONAL, -- Need OR
endRB_shared_Subchannel-r15     INTEGER (0..99) OPTIONAL, -- Need OR
......
}
```

Here, "Shared_Pool-r15" may indicate whether or not a resource is shared.

"adjacencyPSCCH-PSSCH-r15" may indicate whether or not a PSCCH resource and a PSSCH resource of Rel-15 are adjacent to each other.

"StartRB-Subchannel-r15" may indicate the lowest RB index of a subchannel of the resource of Rel-15.

"sizeSubchannel-r15" may indicate the number of PRBs in each subchannel of the resources of Rel-15.

"numSubchannel-r15" may indicate the number of subchannels of the resources of Rel-15.

"StartRB-shared Subchannel-r15" may indicate the lowest RB index in the partially shared resource pool.

"endRB-shared Subchannel-r15" may indicate the last RB index in the partially shared resource pool. In the case where "endRB-shared Subchannel-r15" is not included, the terminal may determine the RB corresponding to "startRB-shared Subchannel-r15" to the last RB (for example, the last RB may be derived through "sizeSubchannel-r15" x "numSubchannel-r15") to be the partially shared resource pool.

"SensingOperation-r15" may indicate the case in which the mode 3 terminal uses a resource shared with the mode 4 terminal, instead of using a dedicated resource. If the parameter value is "False", the mode 3 terminal may use a dedicated resource. If the parameter value is "True", the mode 3 terminal may use a resource obtained as a result of sensing the shared resources.

In the second embodiment, the terminal may determine sharing information of resources using "Shared_PoolID", and may determine the degree of sharing according to whether or not "startRB-shared Subchannel" information is included.

The base station may provide a list of resource pools that can be partially shared.

The terminal may determine that sharing of resources is possible only for the resource pool included in "Shared_PoolID". In the case where "startRB-shared Subchannel" information is included, the terminal may determine the corresponding resource pool to be partially shared resources. If the base station provides "Shared_PoolID", excluding Pool ID1, while applying sharing of resources to Pool ID1, the terminal may stop sharing resources for Pool ID1.

In some embodiments, the configuration of RRC ASN.1 may be defined as shown in Table 17 below in the case of sharing resources between the Rel-15 terminals.

TABLE 17

```
SL-V2X-ConfigShared-r 15 ::=  SEQUENCE {
v2x-SharedTxPool-r15          SL-V2X-TxPoolIDList-r15 OPTIONAL, -- Need OR
v2x-CommTxPoolNormalShared-r15            SL-CommTxPoolListV2X-r15 OPTIONAL, -- Need OR
}
SL-V2X-TxPoolIDList-r15 ::=               SEQUENCE (SIZE (1..maxSL-V2X-SharedTxPool-r15)) OF SL-V2X-TxPoolIdentity-r15
SL-CommTxPoolListV2X-r15 ::=              SEQUENCE (SIZE (1..maxSL-V2X-TxPool-r15)) OF SL-CommResourcePoolV2X-r15
SL-CommResourcePoolV2X-r15 ::=            SEQUENCE {
Shared_PoolID-r15             SL-V2X-TxPoolIdentity-r15
sl-OffsetIndicator-r15        SL-OffsetIndicator-r12 OPTIONAL, -- Need OR
sl-Subframe-r15               SubframeBitmapSL-r14,
adjacencyPSCCH-PSSCH-r15      BOOLEAN,
sizeSubchannel-r15            ENUMERATED {n4,..., spare1},
numSubchannel-r15             ENUMERATED {n1,..., spare1},
startRB-Subchannel-r15        INTEGER (0..99),
startRB-PSCCH-Pool-r15        INTEGER (0..99) OPTIONAL, --Need OR
stratRB_Shared_Subchannel-r15     INTEGER (0..99) OPTIONAL, -- Need OR
endRB_shared_Subchannel-r15       INTEGER (0..99) OPTIONAL, -- Need OR
......
}
```

Here, "v2x-SharedTxPool-r15" may indicate a list of pool IDs that share resources.

"Shared_PoolID-r15" may indicate a list of resource pools in which resources can be shared.

In some embodiments, in the case of sharing some resources between the Rel-14 terminal and the Rel-15 terminal, the configuration of RRC ASN.1 may be defined as shown in Table 18 below.

TABLE 18

```
SL-CommResourcePoolV2X-r14 ::= SEQUENCE {
Shared_Pool-r15              BOOLEAN {TRUE, FALSE}
SensingOperation-r15         BOOLEAN {TRUE, FALSE} OPTIONAL, -- Need OR
sl-OffsetIndicator-r14       SL-OffsetIndicator-r12 OPTIONAL, -- Need OR
sl-Subframe-r14              SubframeBitmapSL-r14,
adjacencyPSCCH-PSSCH-r14         BOOLEAN,
sizeSubchannel-r14           ENUMERATED {n4,..., spare1},
numSubchannel-r14            ENUMERATED {n1,..., spare1},
startRB-Subchannel-r14       INTEGER (0..99),
startRB_shared_Subchannel-r15    INTEGER (0..99) OPTIONAL, -- Need OR
endRB_shared_Subchannel-r15      INTEGER (0..99) OPTIONAL, -- Need OR
......
}
```

"adjacencyPSCCH-PSSCH-r15" may indicate whether or not a PSCCH resource and a PSSCH resource of Rel-15 are adjacent to each other.

"startRB-Subchannel-r15" may indicate the lowest RB index of a subchannel of the resources of Rel-15.

"sizeSubchannel-r15" may indicate the number of PRBs in each subchannel of the resources of Rel-15.

"numSubchannel-r15" may indicate the number of subchannels of Rel-15.

"startRB-shared_Subchannel-r15" may indicate the lowest RB index in the partially shared resource pool.

"endRB-shared_Subchannel-r15 may indicate the last RB index in the partially shared resource pool. In the case where "endRB-shared_Subchannel-r15" is not included, the terminal may determine the RB indicated by "startRB-shared_Subchannel-r15" to the last RB (e.g., the last RB may be derived through "sizeSubchannel-r15" x "numSubchannel-r15") to be partially shared resources.

"SensingOperation-r15" may indicate the case in which the mode 3 terminal uses a resource shared with the mode 4 terminal, instead of using a dedicated resource. If the parameter value is "False", the mode 3 terminal may use a dedicated resource. If the parameter value is "True", the mode 3 terminal may use a resource obtained as a result of sensing the shared resources.

Figure 18:
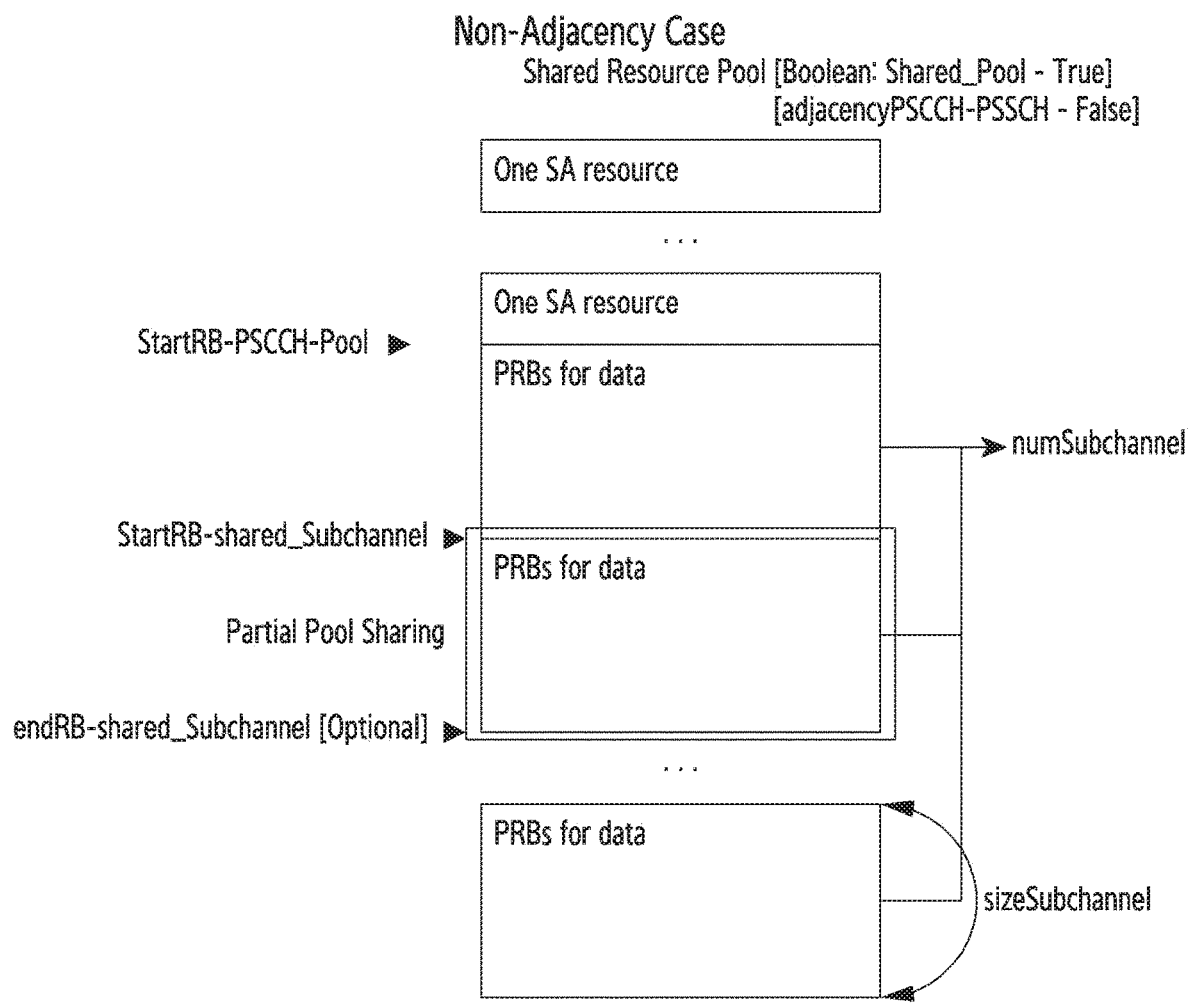
FIG. 18 illustrates an example in which a PSCCH resource and a PSSCH resource are not adjacent to each other according to various embodiments of the disclosure.

FIG. 18 illustrates an example in which a PSCCH resource and a PSSCH resource are not adjacent to each other according to various embodiments of the disclosure.

Referring to FIG. 18, FIG. 18 illustrates a specific embodiment of the case where a PSCCH resource and a PSSCH resource are not adjacent in scenario 2 in FIG. 16.

In some embodiments, if some resources are shared, the terminal may identify whether or not a partially shared resource pool is available.

In the first embodiment, the terminal may identify whether or not the partially shared resource pool is available, based on whether or not information on sharing resources and "startRB-shared_Subchannel" information are included through "Shared_Pool-r15". If "Shared_Pool-r15" is "True", the terminal may identify that the shared resource pool is available. On the other hand, if "Shared_Pool-r15" is "False", the terminal may identify that the shared resource pool is not available. If "Shared_Pool-r15" is "True", and if "StartRB-shared_Subchannel" information is included, the terminal may identify that the partially shared resource pool is available.

Here, "Shared_Pool-r15" may indicate whether or not a resource is shared.

"adjacencyPSCCH-PSSCH-r14" may indicate whether or not a PSCCH resource and a PSSCH resource are adjacent to each other.

"StartRB-Subchannel-r14" may indicate the lowest RB index of a subchannel.

"StartRB-shared_Subchannel-r15" may indicate the lowest RB index in the partially shared resource pool.

"endRB-shared_Subchannel-r15" may indicate the last RB index in the partially shared resource pool. In the case where "endRB-shared_Subchannel-r15" is not included, the terminal may determine the RB indicated by "startRB-shared_Subchannel-r15" to the last RB (e.g., the last RB may be derived through "sizeSubchannel-r14" x "numSubchannel-r14") to be the partially sharable resources.

"sizeSubchannel-r14" may indicate the number of PRBs in each subchannel.

"numSubchannel-r14" may indicate the number of subchannels.

"SensingOperation-r15" may indicate the case in which the mode 3 terminal uses a resource shared with the mode 4 terminal, instead of using a dedicated resource. If the parameter value is "False", the mode 3 terminal may use a dedicated resource. If the parameter value is "True", the mode 3 terminal may use a resource obtained as a result of sensing the shared resource.

In the second embodiment, the terminal may determine sharing information of resources using "Shared_PoolID" (i.e., a list of shared resource pools), and may determine the degree of sharing according to whether or not "startRB-shared_Subchannel" information is included.

The base station may provide a list of resource pools that can be partially shared.

The terminal may determine that sharing of resources is possible only for the resource pool included in "Shared_PoolID". In the case where "startRB-shared_Subchannel" information is included, the terminal may determine the corresponding resource pool to be partially shared resources. If the base station provides "Shared_PoolID", excluding Pool ID1, while applying sharing of resources to Pool ID1, the terminal may stop sharing resources for Pool ID1.

In some embodiments, the configuration of RRC ASN.1 may be defined as shown in Table 19 below in the case of sharing resources between the Rel-14 terminal and the Rel-15 terminal.

TABLE 19

```
SL-V2X-ConfigShared-r14 ::= SEQUENCE {
v2x-SharedTxPool-r15              SL-V2X-TxPoolIDList OPTIONAL, -- Need OR
v2x-CommTxPoolNormalShared-r14                SL-CommTxPoolListV2X-r14
OPTIONAL, -- Need OR
}
SL-V2X-TxPoolIDList-r15 ::=               SEQUENCE (SIZE (1..maxSL-V2X-
SharedTxPool-r15)) OF SL-V2X-TxPoolIdentity-r15
SL-CommTxPoolListV2X-r14 ::=              SEQUENCE (SIZE (1..maxSL-V2X-
TxPool-r14)) OF SL-CommResourcePoolV2X-r14
SL-CommResourcePoolV2X-r14 ::=            SEQUENCE {
Shared_PoolID-r15              SL-V2X-TxPoolIdentity-r15
SensingOperation-r15           BOOLEAN {TRUE, FALSE} OPTIONAL, -- Need
OR
sl-OffsetIndicator-r14         SL-OffsetIndicator-r12 OPTIONAL, -- Need OR
sl-Subframe-r14                SubframeBitmapSL-r14,
adjacencyPSCCH-PSSCH-r14              BOOLEAN,
sizeSubchannel-r14             ENUMERATED {n4,..., spare1},
numSubchannel-r14              ENUMERATED {n1,..., spare1},
startRB-Subchannel-r14              INTEGER (0..99),
startRB_shared_Subchannel-r15              INTEGER (0..99) OPTIONAL, -- Need OR
endRB_shared_Subchannel-r15                INTEGER (0..99) OPTIONAL, -- Need OR
......
}
```

Here, "v2x-SharedTxPool-r15" may indicate a list of pool IDs that share resources.

"Shared_PoolID-r15" may indicate a list of resource pools in which resources can be shared.

"adjacencyPSCCH-PSSCH-r14" may indicate whether or not a PSCCH resource and a PSSCH resource are adjacent to each other.

"startRB-Subchannel-r14" may indicate the lowest RB index of a subchannel.

"StartRB-shared_Subchannel-r15" may indicate the lowest RB index in the partially shared resource pool.

"endRB-shared_Subchannel-r15" may indicate the last RB index in the partially shared resource pool. In the case where "endRB-shared_Subchannel-r15" is not included, the terminal may determine the RB indicated by "startRB-shared_Subchannel-r15" to the last RB (e.g., the last RB may be derived through "sizeSubchannel-r14" x "numSubchannel-r14") to be partially sharable resources.

"sizeSubchannel-r14" may indicate the number of PRBs in each subchannel.

"numSubchannel-r14" may indicate the number of subchannels.

If some resources are shared between Rel-15 terminals, the terminal may identify whether or not the resources are partially shared.

In the first embodiment, the terminal may determine the shared status of resources (usage status of shared resources) through "Shared_Pool-r15", and may determine whether or not the resources are partially shared according to whether or not "startRB-shared_Subchannel" information is included.

If "Shared_Pool-r15" is "True", the terminal may identify that the shared resource pool is available. On the other hand, if "Shared_Pool-r15" is "False", the terminal may identify that the shared resource pool is not available.

If "Shared_Pool-r15" is "True", and if "StartRB-shared_Subchannel" information is included, the terminal may identify that the partially shared resource pool is available.

In some embodiments, in the case of sharing resources between the Rel-15 terminals, the configuration of RRC ASN.1 may be defined as shown in Table 20 below.

TABLE 20

```
SL-CommResourcePoolV2X-r15 ::= SEQUENCE {
Shared_Pool-r15                BOOLEAN {TRUE, FALSE}
SensingOperation-r15           BOOLEAN {TRUE, FALSE} OPTIONAL, -- Need
OR
sl-OffsetIndicator-r15         SL-OffsetIndicator-r12 OPTIONAL, -- Need OR
sl-Subframe-r15                SubframeBitmapSL-r14,
adjacencyPSCCH-PSSCH-r15              BOOLEAN,
sizeSubchannel-r15             ENUMERATED {n4,..., spare1},
numSubchannel-r15              ENUMERATED {n1,..., spare1},
startRB-Subchannel-r15              INTEGER (0..99),
startRB-PSCCH-Pool-r15              INTEGER (0..99) OPTIONAL, -- Need OR
stratRB_Shared_Subchannel-r15       INTEGER (0..99) OPTIONAL, -- Need OR
endRB_shared_Subchannel-r15         INTEGER (0..99) OPTIONAL, -- Need OR
......
}
```

"SensingOperation-r15" may indicate the case in which the mode 3 terminal uses a resource shared with the mode 4 terminal, instead of using a dedicated resource. If the parameter value is "False", the mode 3 terminal may use a dedicated resource. If the parameter value is "True", the mode 3 terminal may use a resource obtained as a result of sensing the shared resources.

Here, "Shared_Pool-r15" may indicate whether or not a resource is shared.

"adjacencyPSCCH-PSSCH-r15" may indicate whether or not a PSCCH resource and a PSSCH resource are adjacent to each other.

"startRB-PSCCH-Pool-r15" may indicate the lowest RB index of the PSCCH.

"endRB-shared_Subchannel-r15" may indicate the last RB index in the partially shared resource pool. In the case where "endRB-shared_Subchannel-r15" is not included, the terminal may determine the RB corresponding to "startRB-shared_Subchannel-r15" to the last RB (e.g., the last RB may be derived through "sizeSubchannel-r15" x "numSubchannel-r15") to be the partially shared resource pool.

"sizeSubchannel-r15" may indicate the number of PRBs in each subchannel of the resources of Rel-15.

"numSubchannel-r15" may indicate the number of subchannels of the resources of Rel-15.

"StartRB-shared_Subchannel-r15" may indicate the lowest RB index in the partially shared resource pool.

"SensingOperation-r15" may indicate the case in which the mode 3 terminal uses a resource shared with the mode 4 terminal, instead of using a dedicated resource. If the parameter value is "False", the mode 3 terminal may use a dedicated resource. If the parameter value is "True", the mode 3 terminal may use a resource obtained as a result of sensing the shared resources.

In the second embodiment, the terminal may determine sharing information of resources using "Shared_PoolID", and may determine the degree of sharing according to whether or not "startRB-shared_Subchannel" information is included.

The base station may provide a list of resource pools that can be partially shared.

The terminal may determine that sharing of resources is possible only for the resource pool included in "Shared_PoolID". In the case where "startRB-shared_Subchannel" information is included, the terminal may determine the corresponding resource pool to be partially shared resources. If the base station provides "Shared_PoolID", excluding Pool ID1, while applying sharing of resources to Pool ID1, the terminal may stop sharing resources for Pool ID1.

In some embodiments, the configuration of RRC ASN.1 may be defined as shown in Table 21 below in the case of sharing resources between the Rel-15 terminals.

"adjacencyPSCCH-PSSCH-r15" may indicate whether or not a PSCCH resource and a PSSCH resource of Rel-15 are adjacent to each other.

"startRB-PSCCH-Pool-r15" may indicate the lowest RB index of the PSCCH.

"StartRB-Subchannel-r15" may indicate the lowest RB index of a subchannel of the resources of Rel-15.

"sizeSubchannel-r15" may indicate the number of PRBs in each subchannel of the resources of Rel-15.

"numSubchannel-r15" may indicate the number of subchannels of Rel-15.

"endRB-shared_Subchannel-r15" may indicate the last RB index in the partially shared resource pool. In the case where "endRB-shared_Subchannel-r15" is not included, the terminal may determine the RB indicated by "startRB-shared_Subchannel-r15" to the last RB (e.g., the last RB may be derived through "sizeSubchannel-r15" x "numSubchannel-r15") to be the partially shared resources.

"startRB-Shared Subchannel-r15" may indicate the lowest RB index in the partially shared resource pool.

"SensingOperation-r15" may indicate the case in which the mode 3 terminal uses a resource shared with the mode 4 terminal, instead of using a dedicated resource. If the parameter value is "False", the mode 3 terminal may use a dedicated resource. If the parameter value is "True", the mode 3 terminal may use a resource obtained as a result of sensing the shared resources.

Figure 19:
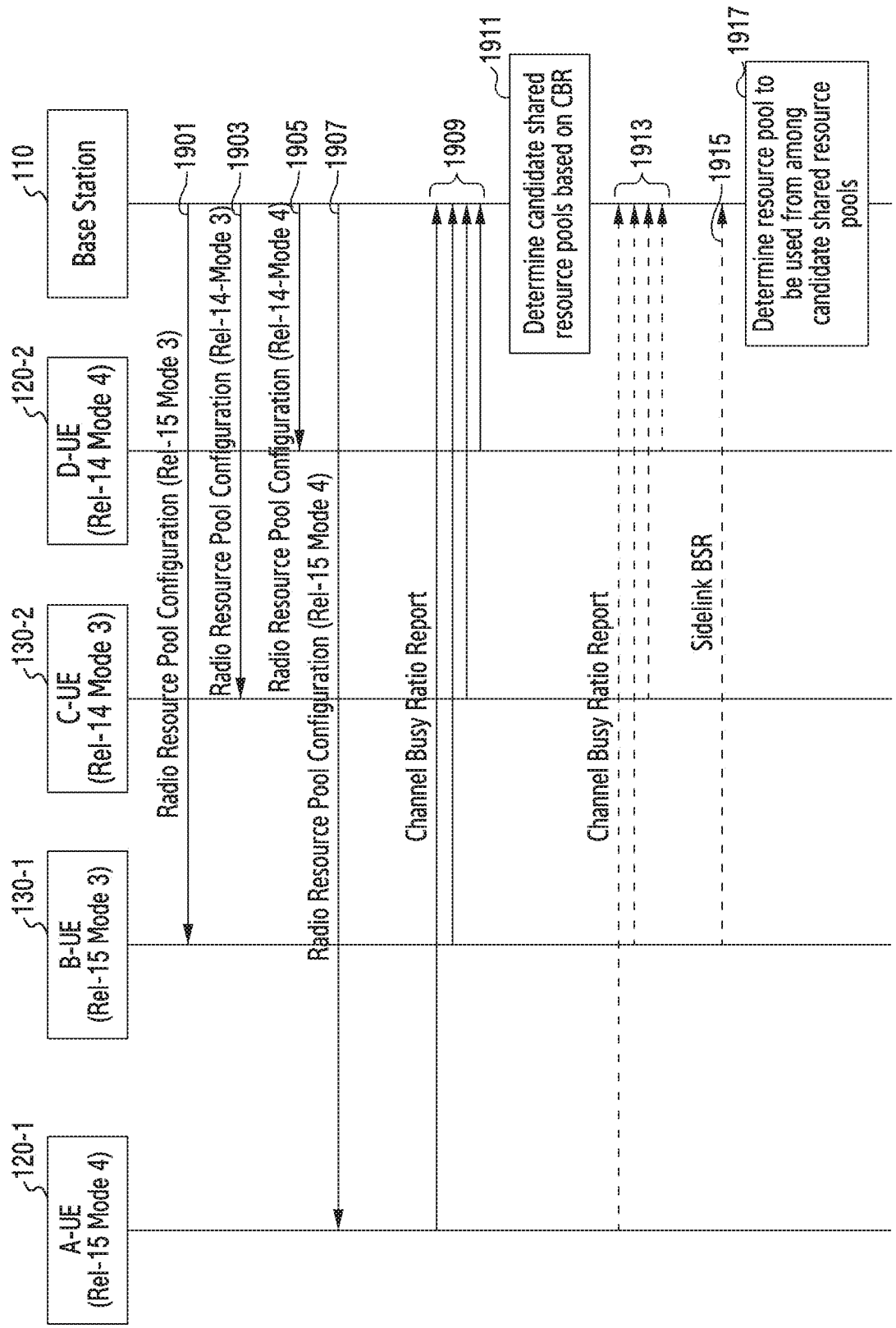
FIG. 19 illustrates signal exchange for using a shared resource pool according to various embodiments of the disclosure.

FIG. 19 illustrates signal exchange for using a shared resource pool according to various embodiments of the disclosure. FIG. 19 illustrates signal exchange between terminal A (Rel-15 mode 4 terminal) 120-1, terminal D (Rel-14 mode 4 terminal) 120-2, terminal B (Rel-15 mode 3 terminal) 130-1, or terminal C (Rel-14 mode 3 terminal) 130-2 and a base station 110.

Referring to FIG. 19, in steps 1901 to 1907, the base station may configure a radio resource pool configuration for the terminals in respective versions (Rel-14 and Rel-15) and respective modes (mode 3 and mode 4).

TABLE 21

```
SL-V2X-ConfigShared-r15 ::= SEQUENCE {
v2x-SharedTxPool-r15            SL-V2X-TxPoolIDList-r15 OPTIONAL, -- Need OR
v2x-CommTxPoolNormalShared-r15              SL-CommTxPoolListV2X-r15 OPTIONAL, -- Need OR
}
SL-V2X-TxPoolIDList-r15         ::=      SEQUENCE (SIZE (1..maxSL-V2X-SharedTxPool-r15)) OF SL-V2X-TxPoolIdentity-r15
SL-CommTxPoolListV2X-r15        ::=      SEQUENCE (SIZE (1..maxSL-V2X-TxPool-r15)) OF SL-CommResourcePoolV2X-r15
SL-CommResourcePoolV2X-r15 ::= SEQUENCE {
Shared_PoolID-r15               SL-V2X-TxPoolIdentity-r15
sl-OffsetIndicator-r15          SL-OffsetIndicator-r12 OPTIONAL, -- Need OR
sl-Subframe-r15                 SubframeBitmapSL-r14,
adjacencyPSCCH-PSSCH-r15              BOOLEAN,
sizeSubchannel-r15              ENUMERATED {n4,..., spare1},
numSubchannel-r15               ENUMERATED {n1,..., spare1},
startRB-Subchannel-r15          INTEGER (0..99),
startRB-PSCCH-Pool-r15          INTEGER (0..99) OPTIONAL, -- Need OR
startRB_Shared_Subchannel-r15         INTEGER (0..99) OPTIONAL, -- Need OR
endRB_shared_Subchannel-r15           INTEGER (0..99) OPTIONAL, -- Need OR
......
}
```

Here, "v2x-SharedTxPool-r15" may indicate a list of pool IDs that share resources.

"Shared_PoolID-r15" may indicate a list of resource pools in which resources can be shared.

Specifically, in step 1901, the base station transmits "v2x-schedulingPool" as a radio resource pool configuration that can be used by the Rel-15 mode 3 terminal. In step 1903, the base station transmits "v2x-schedulingPool" as a radio resource pool configuration that can be used by the Rel-14 mode 3 terminal. In step 1905, the base station transmits "v2x-CommTxPoolNormalCommon" as a radio resource pool configuration that can be used by the Rel-14 mode 4 terminal. In step 1907, the base station transmits "v2x-CommTxPoolNormalCommon" as a radio resource pool configuration that can be used by the Rel-15 mode 4 terminal.

"v2x-schedulingPool" and "v2x-CommTxPoolNormalCommon" may be used in order to configure shared resources as described in the embodiments in FIGS. 14 and 15.

In step 1909, the Rel-15 mode 4 terminal, the Rel-14 mode 4 terminal, the Rel-15 mode 3 terminal, and the Rel-14 mode 3 terminal may measure CBRs of the radio resource pools including or excluding the shared resource pool according to CBR configuration of the base station or CBR configuration of a V2X system, and may transmit the results of measuring the CBRs to the base station.

In step 1911, the base station may determine the CBR status for the radio resource pools including the shared resource pool or the radio resource pools excluding the shared resource pool using the measured CBR values received from the Rel-15 mode 4 terminal, the Rel-14 mode 4 terminal, the Rel-15 mode 3 terminal, and the Rel-14 mode 3 terminal. According to an embodiment of the disclosure, based on the result of the determination of the CBR status, the base station may determine candidate shared resource pools available to the Rel-15 mode 4 terminal, the Rel-14 mode 4 terminal, the Rel-15 mode 3 terminal, and the Rel-14 mode 3 terminal.

Method of determining candidate shared resource pools to be used when sharing resources between terminal A (the Rel-15 mode 4 terminal) and terminal B (the Rel-15 mode 3 terminal)

In Embodiment 1, the CBRs of the remaining resource pools for mode 3 (or mode 4) are lower than the CBR of the shared resource pool.

In Embodiment 2, the CBR of the shared resource pool is lower than a predetermined threshold, and the loads of the remaining mode 3 shared resource pools are lower than a predetermined threshold.

In Embodiment 3, the CBRs of the remaining resource pools for mode 3 (or mode 4) are higher than the CBR of the shared resource pool.

In Embodiment 4, the CBR of the shared resource pool is higher than a predetermined threshold, and the loads of the remaining mode 3 scheduling resource pools are lower than a predetermined threshold.

In Embodiment 5, the CBR of the shared resource pool is lower than a predetermined threshold, and the loads of the remaining mode 3 scheduling resource pools are higher than a predetermined threshold.

In Embodiment 6, the CBR of the shared resource pool is higher than a predetermined threshold, and the loads of the remaining mode 3 scheduling resource pools are higher than a predetermined threshold.

In Embodiment 7, the CBRs of the remaining mode 4 resource pools are higher than a predetermined threshold.

In Embodiment 8, the CBRs of the remaining mode 4 resource pools are lower than a predetermined threshold.

In Embodiment 9, the CBR of the shared resource pool is lower than a predetermined threshold.

In Embodiment 10, the CBR of the shared resource pool is higher than a predetermined threshold.

Methods of determining candidate shared resource pools to be used when sharing resources among terminal A (the Rel-15 mode 4 terminal), terminal B (the Rel-15 mode 3 terminal), and terminal C (the Rel-14 mode 3 terminal)

In Embodiment 1, the CBRs of the remaining scheduling resource pools for mode 3 of Rel-14 are lower than the CBR of the shared resource pool.

In Embodiment 2, the CBR of the shared resource pool is lower than a predetermined threshold, and the loads of the remaining Rel-14 mode 3 scheduling resource pools are lower than a predetermined threshold.

In Embodiment 3, the CBRs of the remaining scheduling resource pools for mode 3 of Rel-14 are higher than the CBR of the shared resource pool.

In Embodiment 4, the CBR of the shared resource pool is lower than a predetermined threshold, and the loads of the remaining Rel-14 mode 3 scheduling resource pools are higher than a predetermined threshold.

In Embodiment 5, the CBR of the shared resource pool is higher than a predetermined threshold, and the loads of the remaining Rel-14 mode 3 scheduling resource pools are lower than a predetermined threshold.

In Embodiment 6, the CBR of the shared resource pool is higher than a predetermined threshold, and the loads of the remaining Rel-14 mode 3 scheduling resource pools are higher than a predetermined threshold.

In Embodiment 7, the CBR of the shared resource pool is lower than a predetermined threshold.

In Embodiment 8, the CBRs of the remaining Rel-14 mode 3 resource pools are lower than a predetermined threshold.

In Embodiment 9, the CBR of the shared resource pool is higher than a predetermined threshold.

In Embodiment 10, the CBRs of the remaining Rel-14 mode 3 resource pools are higher than a predetermined threshold.

Methods of determining a shared resource pool to be used when sharing resources among terminal A (the Rel-15 mode 4 terminal), terminal B (the Rel-15 mode 3 terminal), and terminal D (the Rel-14 mode 4 terminal).

In Embodiment 1, the CBRs of the remaining resource pools for mode 4 of Rel-14 are lower than the CBR of the shared resource pool.

In Embodiment 2, the CBR of the shared resource pool is lower than a predetermined threshold.

In Embodiment 3, the CBRs of the remaining Rel-14 mode 4 resource pools are lower than a predetermined threshold.

In Embodiment 4, the CBRs of the remaining resource pools for mode 4 of Rel-14 are higher than the CBR of the shared resource pool.

In Embodiment 5, the CBR of the shared resource pool is higher than a predetermined threshold.

In Embodiment 6, the CBRs of the remaining Rel-14 mode 4 resource pools are higher than a predetermined threshold.

As an embodiment, if a condition for determining candidate shared resource pools is satisfied in the operation of step 1911 (if there is a high possibility of using the shared resource pool between the Rel-15 terminals or if there is a high possibility of using the shared resource pool between the Rel-14 terminal and the Rel-15 terminal), the base station may operate a CBR validation timer for an operation of verifying validity for applying the shared resource pool (verification of CBR validity as an embodiment).

Starting a CBR validation timer as a condition for determining candidate shared resource pools In step 1913, in an embodiment of operating a CBR validation timer, the base station may perform the operation in step 1911 again if terminal A, terminal B, terminal C, and terminal D transmit CBRs to the base station before the CBR validation timer expires. In the case where the candidate shared resource pools selected through the previous operation in step 1911 are required to be changed, the base station may reset the CBR validation timer, and may operate the CBR validation timer for the candidate shared resource pools that are newly selected.

In step 1915, in an embodiment of operating the CBR validation timer, in the case where terminal B or terminal C requests allocation of resources through a sidelink BSR before the CBR validation timer expires, if the base station determines to allocate sidelink resources to the terminal from the candidate shared resource pools, the base station releases the selected candidate shared resource pools. At this time, the CBR validation timer for the candidate shared resource pools is reset. As another embodiment, in the case where terminal B or terminal C requests allocation of resources through a sidelink BSR before the CBR validation timer expires, if the base station determines that sidelink resources can be allocated to the terminal from a resource pool other than the candidate shared resource pools, the base station may continue to operate the CBR validation timer for the candidate shared resource pools.

In step 1917, the base station may select one of the candidate shared resource pools, and may transmit radio resource pool information reflecting the selected shared resource pool information to terminal A, terminal B, terminal C, and terminal D. In the embodiment of operating the CBR validation timer, if the CBR validation timer expires, the base station may perform the operation in step 1917.

Figure 20:
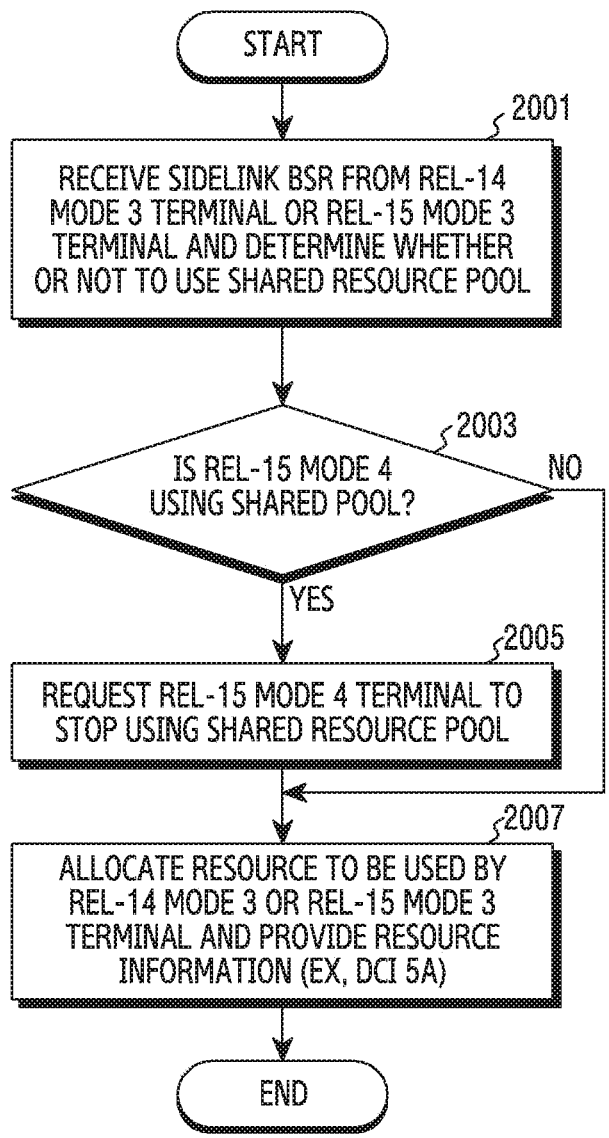
FIG. 20 is a flowchart of a base station according to various embodiments of the disclosure.

FIG. 20 is a flowchart of a base station according to various embodiments of the disclosure. FIG. 20 illustrates the operation of a base station 110. FIG. 20 is a diagram illustrating an embodiment of the operation of a base station for operating a shared resource pool or a candidate shared resource pool according to step 1915 (whether or not a sidelink BSR is received) in FIG. 19.

Referring to FIG. 20, in step 2001, if a sidelink BSR is received from the Rel-14 mode 3 terminal or the Rel-15 mode 3 terminal, the base station may determine whether or not to allocate resources of candidate shared resource pools (or a shared resource pool). In an embodiment, in the case where resources are to be allocated from the candidate shared resource pools, the candidate shared resource pools are excluded from the shared resources. In another embodiment, in the case where resources are to be allocated from the shared resource pool, the base station determines to stop sharing of the shared resource pool.

In step 2003, in the case where resources are to be allocated from the shared resource pool, the base station may determine whether or not the Rel-15 mode 4 terminal is using the shared resource pool. An embodiment of information used to determine whether or not the Rel-15 mode 4 terminal is using the shared resource pool may be as follows. If the value of "Shared_Pool-r15" is set to "True" in the case where "Shared_Pool-r15" is represented as a Boolean value, or if "Shared_PoolID-r15" is represented as a list of pools, the resource pool index of the corresponding shared resource pool may be included.

In step 2005, in the case where the Rel-15 mode 4 terminal is using the shared resource pool, the base station may instruct the Rel-15 mode 4 terminal to stop using the shared resource pool.

An example of a parameter used to indicate stoppage of use of the shared resource pool may be as follows. In the case where "Shared_Pool-r15" is represented as a Boolean value, if the value of "Shared_Pool-r15" is set to "False" or is represented as "Shared_PoolID-r15", "Shared_PoolID-r15" information may be configured, excluding the resource pool index.

In the case where resources are required to be allocated from the shared resource pool, if the base station determines that the Rel-15 mode 4 terminal does not use the shared resource pool, the base station may perform the operation in step 2007.

In step 2007, the base station may allocate, to the Rel-15 mode 3 terminal or the Rel-14 mode 3 terminal, resources to be used by the terminals from the shared resource pool. The resource allocation information may be indicated through, for example, DCI 5A.

Figure 21:
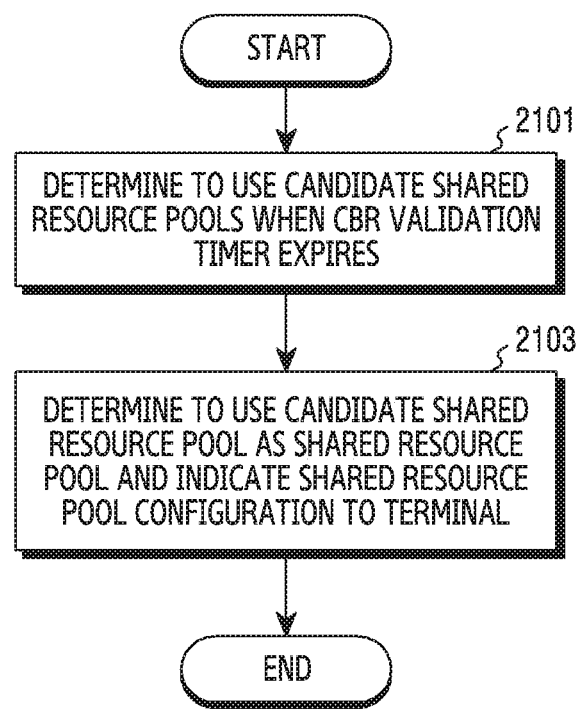
FIG. 21 is another flowchart of a base station according to various embodiments of the disclosure.

FIG. 21 is another flowchart of a base station according to various embodiments of the disclosure. FIG. 21 illustrates the operation of a base station 110. FIG. 21 is a diagram illustrating an embodiment of the operation of a base station for operating a CBR validation timer for a candidate shared resource pool in the operation of step 1911 in FIG. 19.

Referring to FIG. 21, in step 2101, the base station may determine the candidate shared resource pool to be a shared resource pool after the CBR validation timer expires.

In step 2103, the base station transmits, to the Rel-14 mode 3 terminal, the Rel-14 mode 4 terminal, the Rel-15 mode 3 terminal, and the Rel-15 mode 4 terminal, a radio resource pool configuration including information on the shared resource pool determined to be shared therebetween. The base station may transmit, to the Rel-15 mode 4 terminal, an indication of permission to use the shared resource pool determined to be shared.

In some embodiments, steps 1901 to 1907 in FIG. 19 may be performed as an embodiment of the radio resource pool configuration including the shared resource pool information.

Here, the base station may process the shared resource configuration of the Rel-15 mode 4 terminal and the Rel-15 mode 3 terminal and the resource configuration of the Rel-14 mode 4 terminal and the Rel-14 mode 3 terminal in consideration of shared resources according to an embodiment of the disclosure.

An embodiment of the information included in the radio resource pool information message may be as follows. The value of "Shared_Pool-r15" may be set to "True" in the case where "Shared_Pool-r15" is represented as a Boolean value, or "Shared_Pool-r15" may be represented by the Pool ID of the shared resource pool in the case where "Shared_Pool-r15" is represented as information on "Shared_PoolID-r15".

Figure 22:
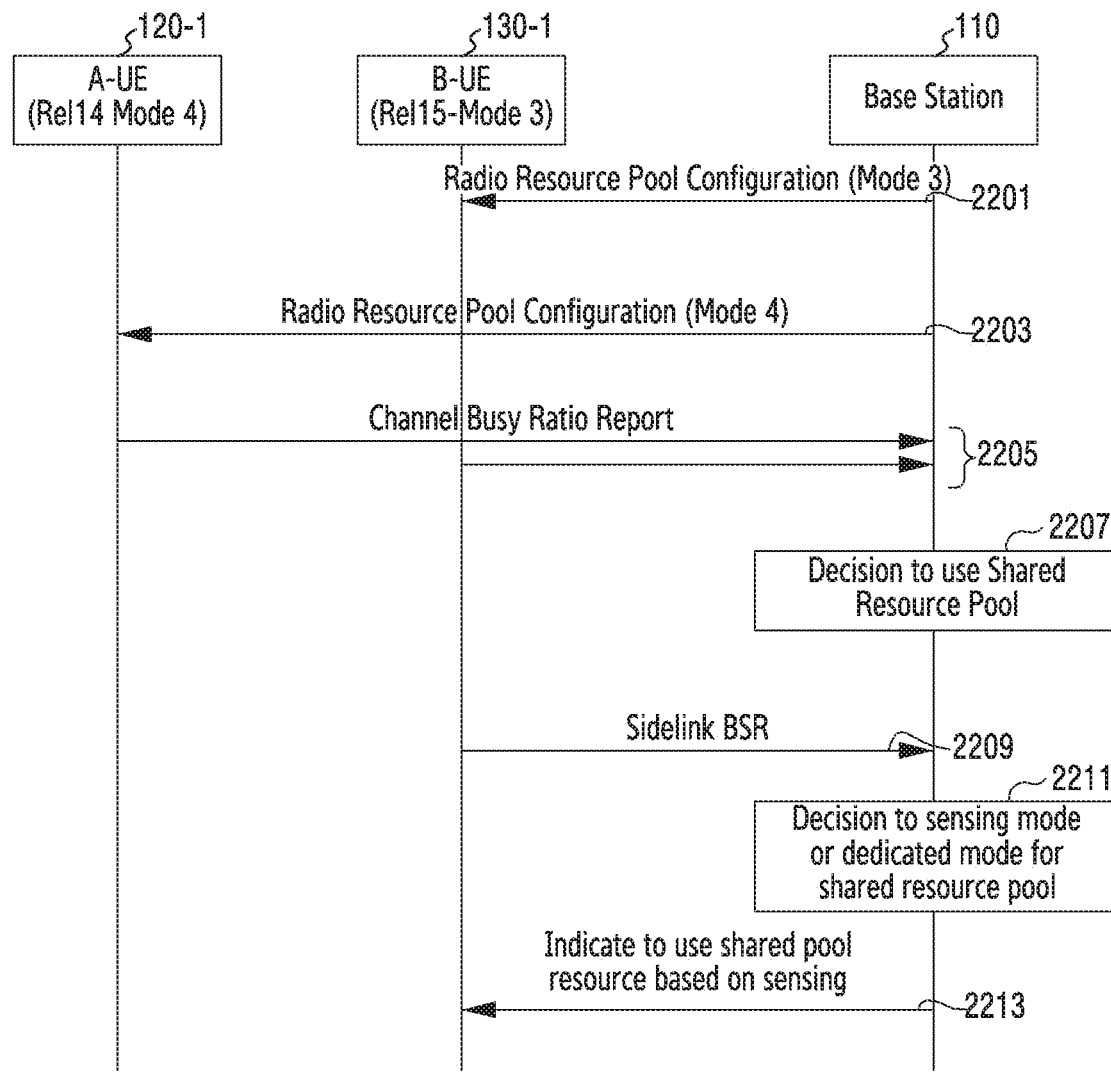
FIG. 22 illustrates signal exchange for indicating the use of shared resources according to various embodiments of the disclosure.

FIG. 22 illustrates signal exchange for indicating the use of shared resources according to various embodiments of the disclosure. FIG. 22 illustrates signal exchange between terminal A (Rel-14 mode 4 terminal) 120-2, terminal B (Rel-15 mode 3 terminal) 130-1, and a base station 110. FIG. 22 is a diagram showing another embodiment of allocating a shared resource pool to a Rel-15 mode 3 terminal and illustrating signal flow between a terminal and a base station for instructing usage of sensing-based shared resources.

FIG. 22 relates to an embodiment in which, in the case where the Rel-15 mode 3 terminal (B-UE) is capable of sharing and using the resource pool being used by the Rel-14 mode 4 terminal, the Rel-15 mode 3 terminal selects resources, based on sensing, instead of directly allocating the resource of the shared resource pool by the base station. A condition in which the base station determines to allow the Rel-15 mode 3 terminal to select resources of a shared resource pool, based on sensing, and use the same when the Rel-15 mode 3 terminal requests the resources may be based on the type of data (application or service) of the Rel-15 mode 3 terminal. That is, if the reliability or latency required for the type of data of the Rel-15 mode 3 terminal is low, the base station may instruct the Rel-15 mode 3 terminal to use a shared resource pool, based on sensing.

In some embodiments, steps 2201 to 2209 may be processed in the same manner as steps 1901 to 1909 in FIG. 19.

In step 2211, the base station determines whether to apply a dedicated resource allocation mode or a sensing-based resource selection mode to the terminal that transmitted the sidelink BSR.

In some embodiments, if it is determined that there are not enough dedicated schedulable resources, the base station may determine priority for transmission of data through PPPP (e.g., an LCG ID) of the sidelink BSR transmitted by terminal B. For example, PPPP may be represented as indexes 1 to 8, and a lower number indicates a higher priority. If the PPPP of the packet to be transmitted by terminal B is 5 or more, the base station may determine terminal B to operate in the shared pool based on sensing.

In step 2213, the base station may instruct terminal B to select shared pool resources, based on sensing and use the same.

In some embodiments, the indication information may be transmitted using a dedicated RRC message (RRC reconfiguration message).

For example, if "SensingOperation-r15" is set to "TRUE", it may be an indication to select sensing-based resources in the shared pool. If "SensingOperation-r15" is set to "FALSE", the base station may allocate, to the terminal, a dedicated resource, among the shared pool resources, or a dedicated resource, among non-shared pool resources, in response to the sidelink BSR of the terminal.

When the transmission of data is completed through the resources selected based on sensing the shared pool (e.g., if there is no more buffered data), terminal B may set "SensingOperation-r15" to a default value (=false).

Figure 23:
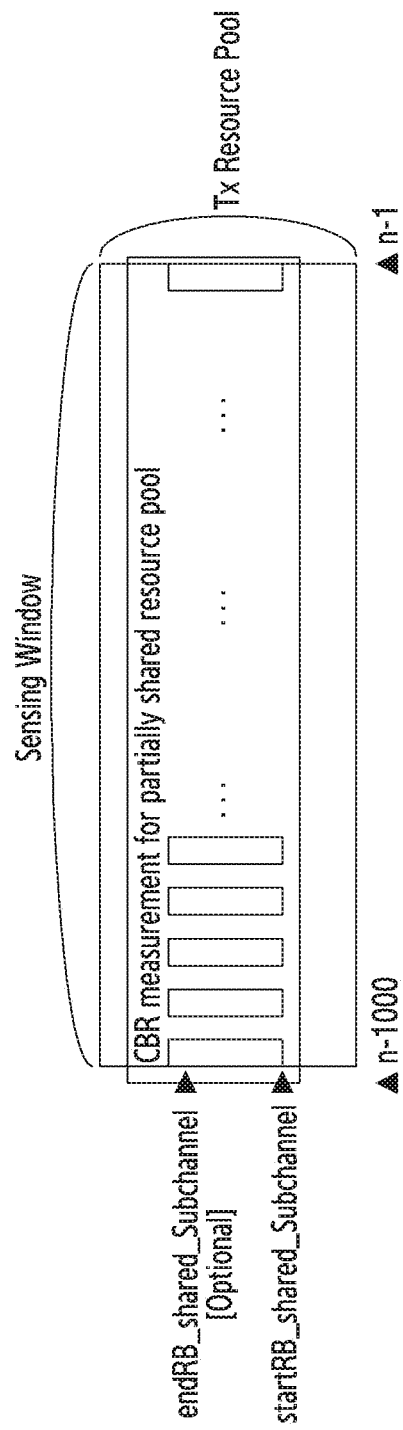
FIG. 23 illustrates information on resources for performing CBR measurement according to various embodiments of the disclosure.

FIG. 23 illustrates information on resources for performing CBR measurement according to various embodiments of the disclosure.

Referring to FIG. 23, FIG. 23 illustrates configuring information on the resources for performing CBR measurement in a terminal when the terminal performs sensing and CBR measurement operations on a partially shared resource pool.

In some embodiments, the CBR measurement operation of an LTE-V2X (rel-14) terminal may be applied to the whole of a Tx resource pool (in frequency) and the entire interval of the Tx resource pool from n−1000 to n−1 (in time).

In some embodiments, with regard to information on the positions of the partially shared resources in FIG. 17 or 18, the base station may indicate the shared resource information to the terminal, or the terminal may preconfigure the shared resource information therein.

In some embodiments, the terminal may obtain resource position information on the partially shared resources using the shared resource information.

According to some embodiments, in various embodiments of the disclosure, if the terminal is capable of sensing the partially shared resource pool and measuring CBRs thereof, the terminal may perform a CBR measurement operation using at least one of partially shared resource pool information, "startRB shared subchannel", and "endRB shared subchannel". The terminal may configure CBR measurement on the partially shared resource pool.

In some embodiments, the terminal may transmit CBR result values (e.g., cbr-PSSCH-r15 or cbr-PSCCH-r15) measured in the partially shared resource pool to the base station using the partially shared resource pool information.

An embodiment of RRC ASN.1 in which the base station instructs the terminal to report the CBR measurement for the partially shared resource pool may be defined as follows.

Embodiment 1

This is the case in which resource information includes a partially shared resource pool report ID (see Table 22).

TABLE 22

SL-CommResourcePoolV2X-r14 ::= SEQUENCE {
...
poolReportId-r14 SL-V2X-TxPoolReportIdentity-r14 OPTIONAL, -- Need OR
partialPoolReportId-r15 SL-V2X-TxPoolReportIdentity-r14 OPTIONAL, -- Need OR
...
}

Meanwhile, the base station may use pool ID information in order to instruct the terminal to report the measurement on the resource pool including the partially shared resource pool. An embodiment of RRC ASN.1 in the case of instructing measurement reporting on the resource pool including the partially shared resource pool using the pool ID may be defined as follows.

In the case where "partialPoolReportId-r15" is included in "Tx-ResourcePoolMeasList-r14", "TxPoolReportIdentity-14" may include information of "partialPoolPeportID-r15" (see Table 23 below).

TABLE 23

MeasObjectEUTRA ::= SEQUENCE {
...
Tx-ResourcePoolMeasList-r14 ::= SEQUENCE (SIZE (1..maxSL-PoolToMeasure-r14)) OF SL-V2X-TxPoolReportIdentity-r14
}

Embodiment 1-1

Embodiment of RRC ASN.1 for CBR report signaling of a terminal in Embodiment 1 (see Table 24 below)

TABLE 24

```
MeasResultCBR-r14 ::=  SEQUENCE {
   poolIdentity-r14       SL-V2X-TxPoolReportIdentity-r14,
   cbr-PSSCH-r14          SL-CBR-r14,
   cbr-PSCCH-r14          SL-CBR-r14 OPTIONAL
}
```

The existing "Rel-14 MeasResultCBR" may be reused.

"poolIdentity-r14" may indicate an index of the partially shared resource pool of which the base station and the terminal are aware according to an embodiment of the disclosure.

Embodiment 1-2

Embodiment of RRC ASN.1 for CBR report signaling of a terminal in Embodiment 1 (see Table 25 below)

TABLE 25

```
MeasResultCBR-r14 ::=  SEQUENCE {
   poolIdentity-r14         SL-V2X-TxPoolReportIdentity-r14,
   partialPoolIdentity-r15  SL-V2X-TxPoolReportIdentity-r14, OPTIONAL
   cbr-PSSCH-r14            SL-CBR-r14,
   cbr-PSCCH-r14            SL-CBR-r14 OPTIONAL
   cbr-partial-PSSCH-r15    SL-CBR-r14 OPTIONAL
   cbr-partial-PSCCH-r15    SL-CBR-r14 OPTIONAL
}
```

"partialPoolIdentity-r15", "cbr-partial-PSSCH-r15", and "cbr-partial-PSCCH-r15" may be newly defined.

"partialPoolIdentity-r15" may indicate an index of the partially shared resource pool of which the base station and the terminal are aware according to an embodiment of the disclosure.

Embodiment 2

This is the case in which resource information includes information for indication of CBR measurement on the partially shared resource pool (see Table 26 below).

TABLE 26

```
SL-CommResourcePoolV2X-r14 ::=  SEQUENCE {
...
poolReportId-r14 SL-V2X-TxPoolReportIdentity-r14 OPTIONAL, -- Need OR
partialCBR       BOOLEAN OPTIONAL, -- Need OR
...
}
```

The base station may instruct the terminal to measure CBRs of a partially shared resource pool and report the same by setting "partialCBR" to "True".

Embodiment 2-1

Embodiment of RRC ASN.1 for CBR report signaling of a terminal in Embodiment 2 (see Table 27 below)

TABLE 27

```
MeasResultCBR-r14 ::=  SEQUENCE {
   poolIdentity-r14       SL-V2X-TxPoolReportIdentity-r14,
```

TABLE 27-continued

```
   cbr-PSSCH-r14          SL-CBR-r14,
   cbr-PSCCH-r14          SL-CBR-r14 OPTIONAL
}
```

The CBR results of the resources in the partially shared resource pool may be reported by reusing existing "LTE MeasResultCBR".

"poolIdentity-r14" may indicate an index of the partially shared resource pool of which the base station and the terminal are aware according to an embodiment of the disclosure.

Embodiment 2-2

Embodiment of RRC ASN.1 for CBR report signaling of a terminal in Embodiment 2 (see Table 28 below)

TABLE 28

```
MeasResultCBR-r14 ::=  SEQUENCE {
   poolIdentity-r14         SL-V2X-TxPoolReportIdentity-r14,
   partialPoolIdentity-r15  SL-V2X-TxPoolReportIdentity-r14, OPTIONAL
   cbr-PSSCH-r14            SL-CBR-r14,
   cbr-PSCCH-r14            SL-CBR-r14 OPTIONAL
   cbr-partial-PSSCH-r15    SL-CBR-r14 OPTIONAL
   cbr-partial-PSCCH-r15    SL-CBR-r14 OPTIONAL
}
```

The CBR results of the resources in the partially shared resource pool may be reported by newly defining "cbr-partial-PSSCH-r15" and "cbr-partial-PSCCH-r15".

"partialPoolIdentity-r15" may indicate an index of the partially shared resource pool of which the base station and the terminal are aware according to an embodiment of the disclosure.

Figure 24:
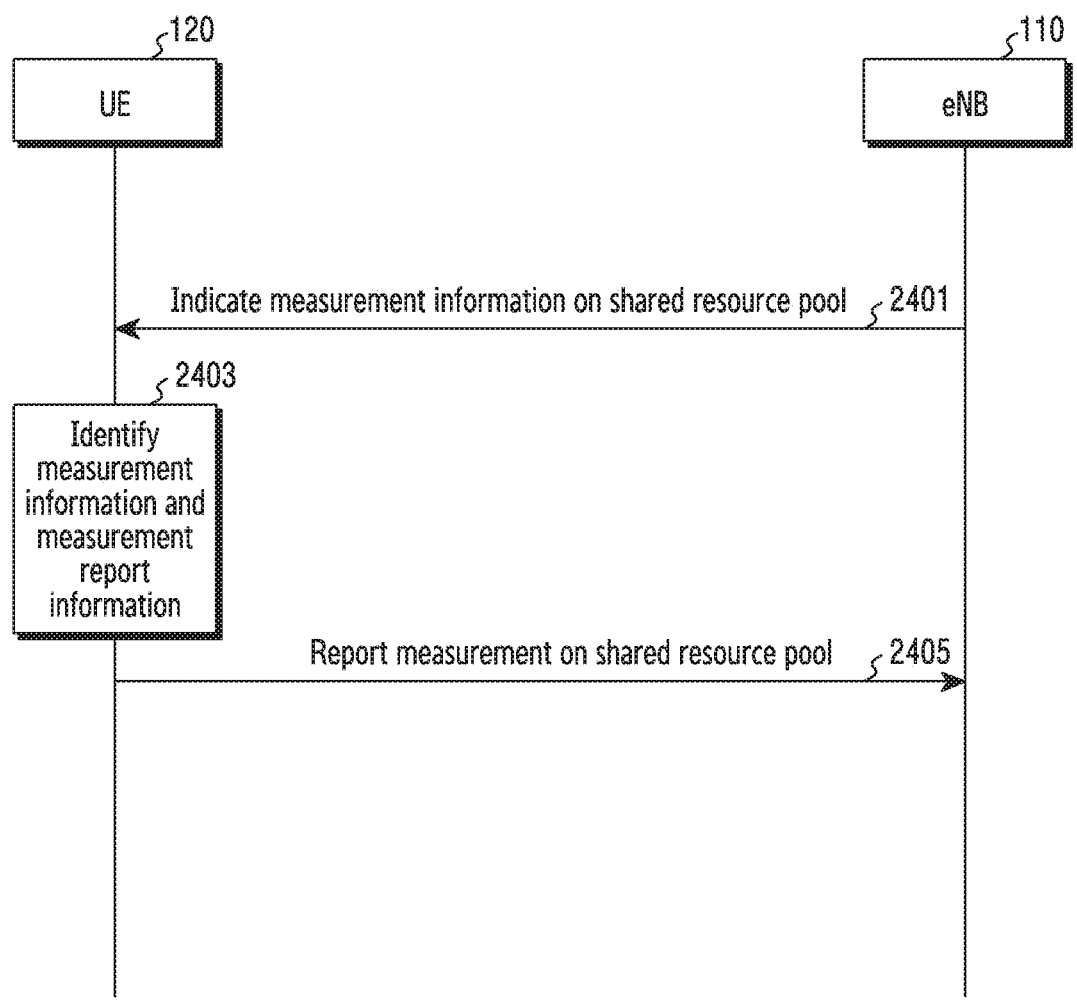
FIG. 24 illustrates signal exchange for measuring resources in a resource pool and reporting the same for sharing resources according to various embodiments of the disclosure.
Figure 25A:
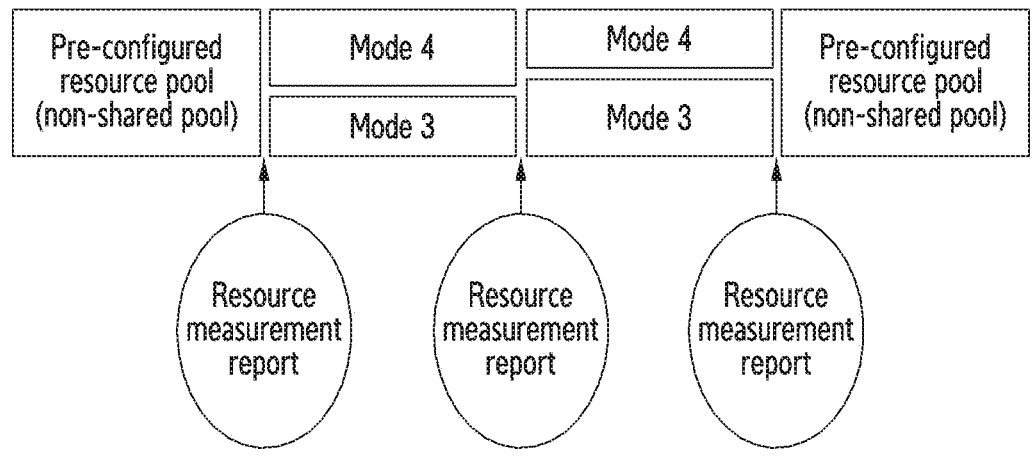
FIGS. 25A and 25B illustrate examples of sharing a preconfigured resource pool according to various embodiments of the disclosure.
Figure 25B:
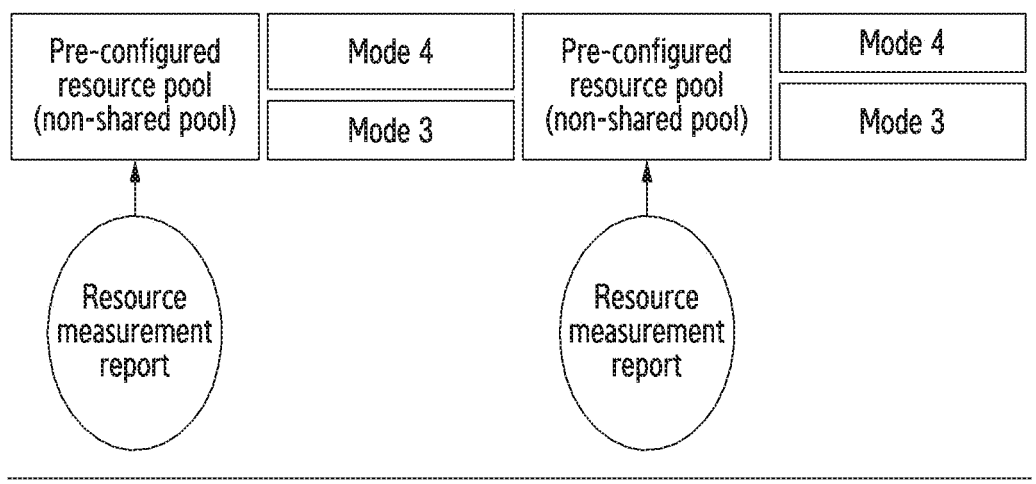
Figure 26:
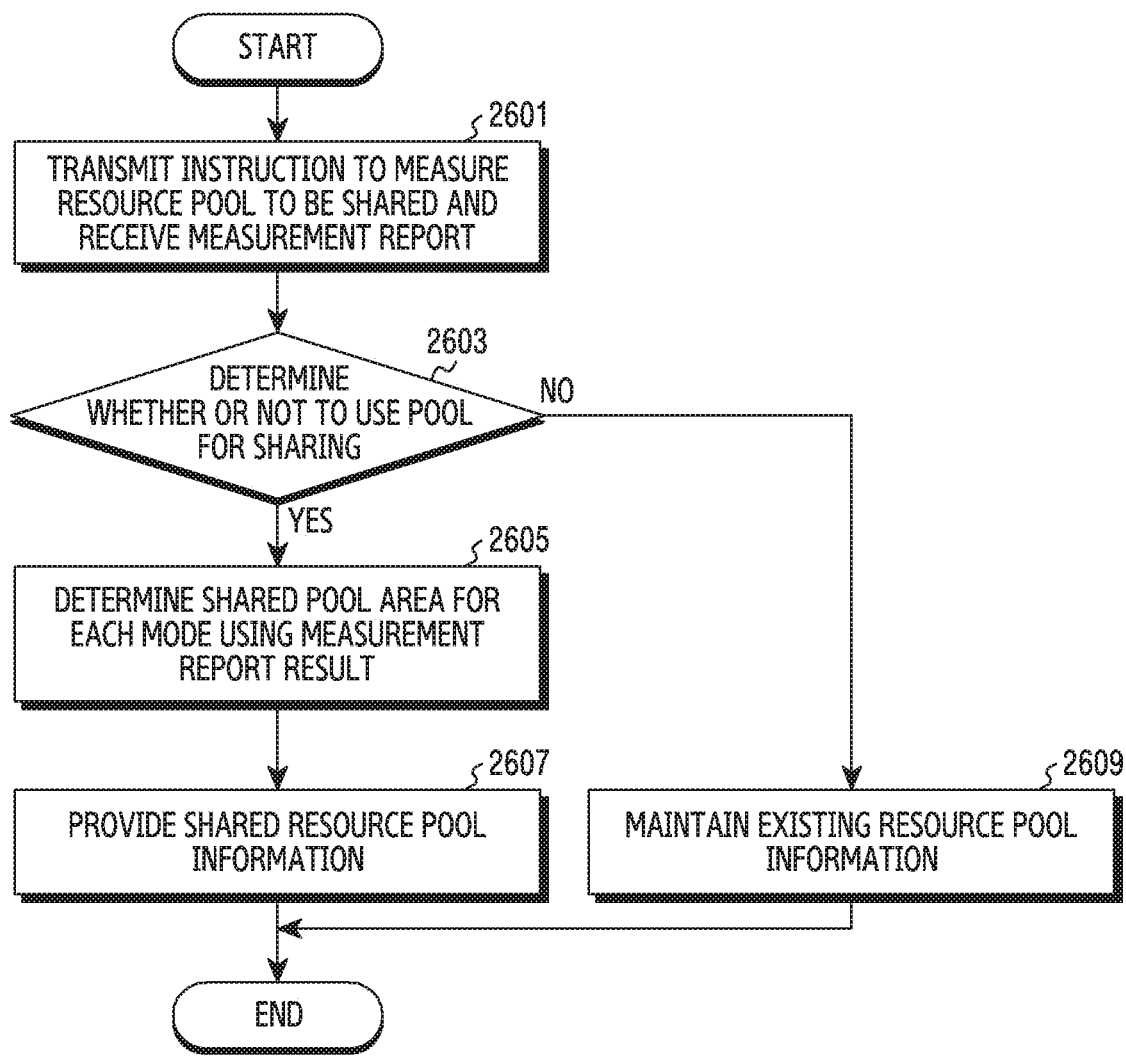
FIG. 26 is a flowchart of a base station for processing a resource status report necessary for operating a shared resource pool according to various embodiments of the disclosure.

FIGS. 24 to 26 illustrate operations of measuring resources in a resource pool for sharing resources and reporting the same according to various embodiments of the disclosure.

As an embodiment of measuring resources in the resource pool for sharing resources according to an embodiment of the disclosure, the base station may configure a resource pool for mode 3 or mode 4, and may allocate IDs for measuring the resource pool and a resource pool ID. The resource pool for mode 4 may include a normal resource pool or a preconfigured resource pool. The mode 3 or mode 4 resource pool may be used so as to be shared or so as not to be shared between terminals operating in different modes.

The resource pool ID for the preconfigured resource pool may be defined separately from the normal mode 3 resource pool ID or the normal mode 4 resource pool ID.

Embodiments in FIGS. 24 to 26 will describe an example in which a mode 4 pool, in particular, a preconfigured resource pool is used so as to be shared with a mode 3 terminal.

According to an embodiment of the disclosure, a first scenario of sharing a preconfigured resource pool is as follows.

The preconfigured resource pool may be managed so as to be shared in units of some resources (e.g., subchannels). In order to configure resources to be shared, among the resources of the preconfigured resource pool, the base station may receive a measurement report on the entire pool or some resources of the pool (e.g., some subchannels) from the terminal. For example, the measured and reported information may include a CR (channel occupancy ratio) or a CBR (channel busy ratio) of a resource.

FIG. 25A illustrates an example of sharing a preconfigured resource pool according to various embodiments of the disclosure.

Referring to FIG. 25A, in order to operate sharing of a pool in a first scenario, the base station may need resource status information on a preconfigured resource pool. The resource status information may indicate the amount of resource pool used by a mode 4 terminal that is configured to use the preconfigured resource pool. The base station may perform configuration such that a mode 3 terminal is capable of sharing and using the preconfigured resource pool according to the resource status information. In the case where the mode 3 terminal and the mode 4 terminal share the preconfigured resource pool, the preconfigured resource pool may be independently operated such that a predetermined portion of the resource pool is used for the mode 3 terminal and another predetermined portion thereof is used for the mode 4 terminal. The mode 3 terminal or the mode 4 terminal may refer to the resource status information when using the resources by dividing the same. With regard to the resource status information, the base station may transmit resource status measurement and report configuration information to the mode 3 terminal or the mode 4 terminal, and may receive a resource status measurement report from the terminal. According to the first scenario, the resource status measurement and reporting may be applied to the whole of the preconfigured resource pool, a partial resource area divided for mode 3 (a subchannel), and a partial resource area divided for mode 4 (e.g., a subchannel). The base station may adjust the ratio of division of the resource area for mode 3 and the resource area for mode 4 in consideration of measurement reports (e.g., measurement reports reported as CRs or CBRs) of the resource areas for the respective modes (e.g., subchannels). According to this, it is possible to adaptively adjust congestion of the mode 3 terminal and the mode 4 terminal sharing the same pool. Although it has been described in the example of the first scenario that the resources are continuously divided and operated for mode 3 and mode 4, the resources for mode 3 and mode 4 may be discontinuously divided and operated in the same pool. A separate resource ID and a measurement ID may be operated for each of the resources for mode 3 and mode 4, and the terminal may perform measurement reporting on the resource using the resource ID and the measurement ID.

The preconfigured resource pool may be shared for a predetermined time. The base station may receive a measurement report to set the time during which the preconfigured resource pool resources are shared. For example, the measurement reporting information may include a CR (channel occupancy ratio) or a CBR (channel busy ratio) of the resource.

FIG. 25B illustrates an example of sharing a preconfigured resource pool according to various embodiments of the disclosure.

Referring to FIG. 25B, in order to allow a mode 3 terminal or a mode 4 terminal to share and use a preconfigured resource pool in a second scenario, the base station may refer to resource status information on the resource pool. The resource status information may indicate the amount of resource pool used by a mode 4 terminal that is configured to use the preconfigured resource pool. The base station may perform configuration such that a mode 3 terminal is capable of sharing and using the preconfigured resource pool according to the resource status information. In the case where the mode 3 terminal and the mode 4 terminal share the preconfigured resource pool, the preconfigured resource pool may be independently operated such that a predetermined portion of the resource pool is used for the mode 3 terminal and another predetermined portion thereof is used for the mode 4 terminal.

The resource status information on the resource pool may be determined through an operation in which the terminal reports usage status of the resources (for example, it may be represented as a CR or a CBR), based on resource configuration and measurement report configuration information indicated by the base station. Based on the resource status information on the resource pool, the base station may determine sharing of the preconfigured resource pool for mode 3 and mode 4, and a resource ratio for each mode. In the second scenario, it is assumed that reporting on the resource status is performed in units of preconfigured resource pools. The base station may recognize resource status information on the pool, but it is difficult for the base station to recognize resource status information on the resource area (e.g., a subchannel) that is used for mode 3 or mode 4. In order to recognize the status of mode 4 configured to use the preconfigured resource pool, the pool may be operated separately for a resource sharing time and a resource non-sharing time. That is, if it is determined that the pool is not congested for the resource non-sharing time as a result of measurement by the terminal, the base station may operate the resource area for mode 3 by extending the same. If it is determined that the pool is congested for the resource non-sharing time as a result of measurement by the terminal, the base station may reduce the resource area for mode 3, or may stop sharing resources. When the pool is used as shared resources, the resource sharing time and the resource non-sharing time may be periodically operated, which may be indicated by the base station. In order to operate measurement report in the second scenario, the resource area for mode 3 or the resource area for mode 4 does not need to be distinguished by separate IDs, and may be operated based on the pool ID. Although it has been described in the example of the second scenario that the resources are continuously divided and operated for mode 3 and mode 4, the resources for mode 3 and mode 4 may be discontinuously divided and operated in the same pool.

Although the preconfigured resource pool has been described in the above embodiment, the embodiment may be applied to the case in which a normal pool for mode 3 or a normal pool for mode 4 is used as a shared resource pool.

FIG. 24 illustrates signal exchange for measuring resources in a resource pool and reporting the same for sharing resources according to various embodiments of the disclosure. FIG. 24 illustrates signal exchange between a terminal 120 and a base station 110.

Referring to FIG. 24, in step 2401, the base station may transmit measurement configuration information on a resource pool to the terminal. The terminal may be a mode 3 terminal or a mode 4 terminal. The measurement configuration information on the resource pool may be indicated through RRC dedicated signaling or SIB 21 signaling. The measurement configuration information on the resource pool may include at least one piece of resource pool information, information on the resource pool to be measured, or measurement report configuration information. According to an embodiment of the disclosure, the information may include measurement configuration information about a preconfigured resource pool.

An embodiment including preconfigured resource pool information in step 2401 is as follows.

In some embodiments, an embodiment of the configuration of resources of the preconfigured resource pool, among the information included in the measurement configuration information of the resource pool, may include "sizeSubchannel", "numSubchannel", "startRB-Subchannel", and "startRB-PSCCH-Pool", which indicate position information of the resource pool, and "preConfigpoolReportId" indicating an ID of the resource pool.

In some embodiments, information about the entire resource pool may be configured as shown in Table 29 below. "pool-sharing-timer" information may be used to periodically operate sharing of resources and non-sharing of resources as in the second scenario.

TABLE 29

```
SL-V2X-PreconfigCommPool-r15 ::=         SEQUENCE {
-- This IE is same as SL-CommResourcePoolV2X with rxParametersNCell
absent
...
        adjacencyPSCCH-PSSCH-r14        BOOLEAN,
        sizeSubchannel-r14              ENUMERATED {n4, n5, ... ,spare2,
spare1},
        numSubchannel-r14               ENUMERATED {n1, n3, n5,
n8, n10, n15, n20, spare1},
        startRB-Subchannel-r14          INTEGER (0..99),
        startRB-PSCCH-Pool-r14          INTEGER (0..99) OPTIONAL,
...
        preConfigpoolReportId-r15       SL-V2X-PreConfg-TxPoolReportId-
r15    OPTIONAL, -- Need OR
        pool-sharing-timer-r15          INTEGER (0.. 1000)
        OPTIONAL, -- Need OR
...
}
SL-V2X-PreConfig-TxPoolReportId-r15::=   INTEGER  (1..maxSL-
preconfigPoolToMeasure-r15)
```

In some embodiments, information on a partial area of the resource pool may be configured as shown in Table 30 below. This corresponds to resource information on a single partial area. The following information may be configured for a plurality of partial areas (e.g., areas for mode 3 and mode 4). "pool-sharing-timer" information may be used to periodically operate sharing of resources and non-sharing of resources as in the second scenario.

TABLE 30

```
SL-V2X-PreconfigCommPool-r15 ::=         SEQUENCE {
-- This IE is same as SL-CommResourcePoolV2X with rxParametersNCell
absent
...
    adjacencyPSCCH-PSSCH-r14            BOOLEAN,
    sizeSubchannel-r14                  ENUMERATED {n4, n5, ... ,spare2,
spare1},
    numSubchannel-r14                   ENUMERATED {n1, n3, n5,
n8, n10, nl5, n20, spare1},
    startRB-Subchannel-r14              INTEGER (0..99),
    startRB-shared_Subchannel-r15       INTEGER (0..99)  OPTIONAL, --
Need OR
    endRB-shared-Subchannel-r15         INTEGER (0..99)  OPTIONAL, --
Need OR
    preConfigpoolReportId-r15           SL-V2X-PreConfg-
TxPoolReportId-r15 OPTIONAL, -- Need OR
    pool-sharing-timer-r15              INTEGER (0..1000) OPTIONAL, --
Need OR
...
}
SL-V2X-PreConfig-TxPoolReportId-r15::=   INTEGER  (1..maxSL-
preconfigPoolToMeasure-r15)
```

In some embodiments, measurement configuration, among the information included in the measurement configuration information on the resource pool, may include a pool ID (e.g., SL-V2X-PreConfg-TxPoolReportId) for indicating the preconfigured resource pool in which measurement is to be performed (see Table 31 below). The pool ID may be a pool ID corresponding to a partial resource area for each mode or a pool ID corresponding to the entire resource pool. The pool ID corresponding to a partial resource area for each mode may be used in the first scenario. The pool ID corresponding to the entire resource pool may be used in the second scenario.

TABLE 31

```
MeasObjectEUTRA ::=    SEQUENCE {
...
Tx-ResourcePoolMeasList-r14 ::=SEQUENCE     (SIZE  (1..maxSL-
PoolToMeasure-r14)) OF SL-V2X-TxPoolReportIdentity-r14
Tx-PreConfigResourcePoolMeasList-r15 ::=  SEQUENCE      (SIZE
(1..maxSL-preconfigPoolToMeasure-r15))     OF    SL-V2X-PreConfg-
TxPoolReportId-r15
}
```

In some embodiments, report configuration, among the information included in the measurement configuration information on the resource pool, may include information indicating a condition for transmitting a measurement result (e.g., periodically or based on an event) (see Table 32 below)

TABLE 32

| ReportConfigEUTRA ::= | SEQUENCE { |
|---|---|
| triggerType | CHOICE { |
| event | SEQUENCE { |
| ...... | |
| } | |
| periodical | SEQUENCE{ |
| ...... | |
| } | |
| } | |

In step 2403, the terminal may obtain shared resource pool information using the pool ID information of the resource configuration included in the measurement configuration information on the resource pool and a pool ID required to be measured, which is indicated by the measurement configuration, and may measure the resource status on the indicated resource pool. According to an embodiment of the disclosure, the measurement of the resource status may be performed for the entire shared resource pool or the measurement of the resource status may be performed for some resource areas of the corresponding pool. Measurement values of the resource status may correspond to CRs to CBRs.

In step 2405, if a condition for transmitting the measurement result included in the measurement configuration information on the resource pool is satisfied (for example, if a CBR measurement result is higher or lower than a threshold), the terminal may transmit a measurement report to the base station. The terminal may periodically transmit the measurement result included in the measurement configuration information on the resource pool.

An embodiment of the measurement report transmitted by the terminal is as follows. In an embodiment, the terminal may report a resource status result (e.g., a CBR result) of the resource pool through "MeasResultCBR". In another embodiment, in the case where a measurement result for the preconfigured resource pool is separately defined, the terminal may transmit the same through "PreconfigMeasResultCBR".

"poolIdentity" information indicated in the measurement result may correspond to a pool ID indicating a partial pool area in the first scenario or a pool ID indicating the entire pool area in the second scenario according to an embodiment of the disclosure.

TABLE 33

| MeasResultCBR-r14 ::= | SEQUENCE { |
|---|---|
| poolIdentity-r14 | SL-V2X-TxPoolReportIdentity-r14, |
| cbr-PSSCH-r14 | SL-CBR-r14, |
| cbr-PSCCH-r14 | SL-CBR-r14 OPTIONAL |
| } | |

TABLE 34

| MeasResultCBR-r14 ::= | SEQUENCE { |
|---|---|
| poolIdentity-r14 | SL-V2X-TxPoolReportIdentity-r14, |
| cbr-PSSCH-r14 | SL-CBR-r14, |
| cbr-PSCCH-r14 | SL-CBR-r14 OPTIONAL |
| } | |

TABLE 34-continued

| PreconfigMeasResultCBR | SEQUENCE{ |
|---|---|
| poolIdentity-r15 | SL-V2X-PreConfg-TxPoolReportId-r15, |
| cbr-PSSCH-r15 | SL-CBR-r14, |
| cbr-PSCCH-r15 | SL-CBR-r14 OPTIONAL |
| } | |

FIG. 26 is a flowchart of a base station for processing a resource status report necessary for operating a shared resource pool according to various embodiments of the disclosure. FIG. 26 may illustrate the operation of a base station 110.

Referring to FIG. 26, in step 2601, the base station may transmit configuration for the resource pool to be shared and configuration information for measuring the resource status and reporting the same, and may receive a measurement report on the configured resource pool from the terminal. The configuration information may be transmitted through an RRC dedicated signal or an SIB signal. The configuration information may include measurement configuration information on the resource pool in FIG. 24 according to an embodiment of the disclosure. The base station may receive a result of measuring the resource status from terminals in the cell or from a specific terminal (the terminal appointed to measure the shared resource pool by the base station). The resource status measurement value may be represented as a CR or a CBR. The resource status measurement value may be transmitted using a measurement report on the resource pool in FIG. 24. The base station may receive resource status measurement values for a partial resource area for each mode according to the first scenario. The base station may receive resource status measurement values for the entire pool according to the second scenario.

In step 2603, the base station may determine whether or not to allow sharing of the resource pool between the mode 3 terminal and the mode 4 terminal, based on the resource status information on the resource pool received from the terminal. The resource pool may be a resource pool that is being shared between the mode 3 terminal and the mode 4 terminal, or may be a resource pool that is to be shared therebetween.

The base station may determine whether or not to allow the resource pool to be shared between the mode 3 terminal and the mode 4 terminal according to the resource status measurement values (e.g., CR or CBR results) of the resource pool, the mode 3 resource area, and the mode 4 resource area, which are received from the terminal in step 2601.

For example, according to the first scenario, if the CBR result of the resource area being used by the mode 4 terminal in a specific resource pool is higher than a specific threshold, the base station may reduce or may not allocate the resource area to be shared and used by the mode 3 terminal. According to the first scenario, if the CBR result of the resource area being used by the mode 4 terminal in a specific resource pool is lower than a specific threshold, the base station may increase the resource area to be shared and used by the mode 3 terminal. According to the first scenario, if the CBR result of the resource area being used by the mode 3 terminal in a specific resource pool is higher than a specific threshold, the base station may reduce or may not allocate the resource area to be shared and used by the mode 4 terminal. According to the first scenario, if the CBR result of the resource area being used by the mode 3 terminal in a specific resource pool is lower than a specific threshold, the base station may increase the resource area to be shared and used by the mode 4 terminal.

As another example, according to the second scenario, if the CBR result of a specific shared resource pool is higher than a specific threshold, the base station may reduce the resource area to be used by the mode 3 terminal, or may not allow sharing in the next resource sharing period. According to the second scenario, if the CBR result of a specific shared resource pool is lower than a specific threshold, the base station may increase the resource area to be used by the mode 3 terminal, or may allow sharing in the next resource sharing period. According to the second scenario, if the CBR result of a specific shared resource pool is higher than a specific threshold, the base station may reduce the resource area to be used by the mode 4 terminal, or may not allow sharing in the next resource sharing period. According to the second scenario, if the CBR result of a specific shared resource pool is lower than a specific threshold, the base station may increase the resource area to be used by the mode 4 terminal, or may allow the sharing in the next resource sharing period.

For example, the base station may compare CBR results of the resource pool for mode 3 (CBR_Mode3_A, CBR_Mode3_B, or the like), CBR results of the resource pool for mode 4 (CBR_Mode4_A, CBR_Mode4_B, or the like), and CBR results of the preconfigured resource pools (e.g., CBR_PreConfig_A or CBR_PreConfig_B) with each other.

In an embodiment, if at least one preconfigured resource pool of CBR_PreConfig_A or CBR_PreConfig_B has a lower CBR value than a mode 3 resource pool, a mode 4 resource pool, or a mode 3 resource pool and a mode 4 resource pool, the preconfigured resource pool having the lower CBR value may be used as the shared resource pool.

If the base station determines to use a specific resource pool as a shared resource pool according to the determination in step 2603, the base station may perform resource configuration for sharing and using the resource pool in step 2605.

In an embodiment, assuming that "Pre-Configuration Tx Resource pool" includes 8 resource pools, the base station may allocate a resource pool having a lower CBR value than a specific CBR threshold (e.g., a CBR reference value for determining the shared resource pool), among the resource pools in Pre-Configuration, for the resource pool for mode 3. If there are one or more resource pools having lower CBR values, the base station may select the pools in descending order of CBR value or in an arbitrary order, and may allocate the same for the resource pools for mode 3.

In another embodiment, assuming that "Pre-Configuration Tx Resource pool" includes one resource pool, the base station may allocate a resource pool having a lower CBR value than a specific CBR threshold (e.g., a CBR reference value for determining the shared resource pool) for the resource pool to be shared for mode 3 and mode 4.

In another embodiment, assuming that "Pre-Configuration Tx Resource pool" includes 8 resource pools, if there is no resource pool having a lower CBR value than a specific CBR threshold (e.g., a CBR reference value for determining the shared resource pool), among the resource pools, the base station may select the resource pool having the lowest CBR value as the shared resource pool of the mode 3 terminal and the mode 4 terminal.

In the case where the base station determines the shared resource pool and the resource area through the method in step 2605, the base station may transmit the shared resource pool, shared resource area information (pool positions, pool Ids, etc.), measurement configuration information, report configuration information, and the like to the terminal that is to use the shared resources. The base station may transmit a shared resource usage period or a valid time thereof according to the second scenario. If the sharing of a specific pool is released according to the shared resource usage period or the valid time, the configuration of the specific pool may be set to an initial configuration value at the time at which the resources are not shared.

In step 2607, the base station may transfer a pool ID of a partial resource area of the resource pool to the mode 3 terminal or the mode 4 terminal according to the first scenario.

If the base station determines not to use a specific resource pool as the shared resources, the base station configures and maintains the original resource pool information in step 2609.

According to the second scenario, in the case where the terminal receives a resource pool sharing valid time (or a resource sharing period) according to the operation of the base station in step 2607 in FIG. 26, the shared resource pool may be used during the resource pool sharing valid time.

The base station may perform the operations shown in FIG. 26 on a specific pool continuously, periodically, or according to resource status information.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method performed by a terminal in a wireless communication system, the method comprising:
receiving, from a base station, a message including resource information on a resource pool for vehicle communication and information related to a T2 value of a time interval, wherein the information related to the T2 value is used for user equipment (UE) autonomous resource selection in the resource pool;
identifying candidate resources of the resource pool within the time interval, based on the information related to the T2 value; and
transmitting, to another terminal, data using at least one resource among the candidate resources,
wherein the T2 value is used to indicate a maximum value of the time interval.

2. The method of claim 1, wherein the T2 value is selected by the terminal in order to satisfy a latency requirement of transmission of data.

3. The method of claim 1, further comprising:
if a value randomly generated by the terminal is greater than a probability that the terminal maintains the at least one resource, determining to reselect another resource for transmitting next data; and
if a value randomly generated by the terminal is less than the probability that the terminal maintains the at least one resource, determining to maintain the at least one resource for transmitting next data.

4. The method of claim 1, further comprising:
transmitting, to the base station, a message including at least one of traffic pattern information or a transmission delay budget report.

5. The method of claim 1, further comprising:
performing a channel busy ratio (CBR) measurement on the resource pool; and
transmitting, to the base station, a report including a result of the CBR measurement.

6. The method of claim 1, wherein the message is received through a radio resource control (RRC) signaling.

7. A method performed by a base station in a wireless communication system, the method comprising:
transmitting, to a terminal, a message including resource information on a resource pool for vehicle communication and information related to a T2 value of a time interval,
wherein the T2 value is used to indicate a maximum value of the time interval,
wherein the information related to the T2 value is used for user equipment (UE) autonomous resource selection in the resource pool to identify candidate resources, and
wherein at least one resource is used for data transmission from the terminal to another terminal among the candidate resources.

8. The method of claim 7, further comprising:
receiving, from the terminal, a message including at least one of traffic pattern information or a transmission delay budget report.

9. The method of claim 7, further comprising:
receiving, from the terminal, a report including a result of a channel busy ratio (CBR) measurement on the resource pool.

10. The method of claim 7, wherein the message is transmitted through a radio resource control (RRC) signaling.

11. A device of a terminal in a wireless communication system, the device comprising:
a transceiver; and
at least one processor operably connected to the transceiver,
wherein the at least one processor is configured to:
receive, from a base station, a message including resource information on a resource pool for vehicle communication and information related to a T2 value of a time interval, wherein the information related to the T2 value is used for user equipment (UE) autonomous resource selection in the resource pool,
identify candidate resources of the resource pool, based on the information related to the T2 value, and
transmit, to another terminal, data using at least one resource among the candidate resources,
wherein the T2 value is used to indicate a maximum value of the time interval.

12. The device of claim 11, wherein the T2 value is selected by the terminal in order to satisfy a latency requirement of transmission of data.

13. The device of claim 11, wherein the at least one processor is further configured to:
if a value randomly generated by the terminal is greater than a probability that the terminal maintains the at least one resource, determine to reselect another resource for transmitting next data; and
if a value randomly generated by the terminal is less than the probability that the terminal maintains the at least one resource, determine to maintain the at least one resource for transmitting next data.

14. The device of claim 11, wherein the at least one processor is further configured to:
transmit, to the base station, a message including at least one of traffic pattern information or a transmission delay budget report.

15. The device of claim 11, wherein the at least one processor is further configured to:
performing a channel busy ratio (CBR) measurement on the resource pool, and
transmit, to the base station, a report including a result of the CBR measurement.

16. The device of claim 11, wherein the message is received through a radio resource control (RRC) signaling.

* * * * *